United States Patent
Okamoto et al.

(10) Patent No.: US 9,257,720 B2
(45) Date of Patent: *Feb. 9, 2016

(54) NONAQUEOUS ELECTROLYTE SOLUTION AND NONAQUEOUS ELECTROLYTE BATTERY USING SAME

(75) Inventors: Kuniaki Okamoto, Tokorozawa (JP); Motoshige Sumino, Fujimino (JP); Tsutomu Watahiki, Kawagoe (JP); Kouki Ohkubo, Niiza (JP); Tatsuko Ikeda, Shiki (JP)

(73) Assignee: WAKO PURE CHEMICAL INDUSTRIES, LTD., Osaka (JP)

( * ) Notice: Subject to any disclaimer, the term of this patent is extended or adjusted under 35 U.S.C. 154(b) by 372 days.

This patent is subject to a terminal disclaimer.

(21) Appl. No.: 13/814,299

(22) PCT Filed: Aug. 2, 2011

(86) PCT No.: PCT/JP2011/067632
§ 371 (c)(1),
(2), (4) Date: Feb. 5, 2013

(87) PCT Pub. No.: WO2012/017999
PCT Pub. Date: Feb. 9, 2012

(65) Prior Publication Data
US 2013/0130128 A1    May 23, 2013

(30) Foreign Application Priority Data
Aug. 5, 2010  (JP) .................................. 2010-176280

(51) Int. Cl.
| | |
|---|---|
| *H01M 10/056* | (2010.01) |
| *H01M 10/0567* | (2010.01) |
| *H01M 10/0569* | (2010.01) |
| H01M 10/0566 | (2010.01) |
| H01M 10/0525 | (2010.01) |

(52) U.S. Cl.
CPC ........ *H01M 10/0569* (2013.01); *H01M 10/056* (2013.01); *H01M 10/0567* (2013.01); *H01M 10/0525* (2013.01); *H01M 10/0566* (2013.01); *H01M 2300/0025* (2013.01); *H01M 2300/0028* (2013.01); *Y02T 10/7011* (2013.01)

(58) Field of Classification Search
None
See application file for complete search history.

(56) References Cited

U.S. PATENT DOCUMENTS

| 5,626,981 | A | 5/1997 | Simon et al. |
|---|---|---|---|
| 6,436,582 | B1 | 8/2002 | Hamamoto et al. |
| 6,919,145 | B1 | 7/2005 | Kotato et al. |
| 2005/0118512 | A1 | 6/2005 | Onuki et al. |
| 2005/0255385 | A1 | 11/2005 | Harrup et al. |
| 2007/0172730 | A1 | 7/2007 | Iwanaga et al. |
| 2007/0238025 | A1 | 10/2007 | Onuki et al. |
| 2008/0138715 | A1 | 6/2008 | Ihara et al. |
| 2008/0311478 | A1 | 12/2008 | Onuki et al. |
| 2010/0021823 | A1 | 1/2010 | Onuki et al. |
| 2010/0092872 | A1 | 4/2010 | Abe et al. |
| 2010/0221604 | A1 | 9/2010 | Wakita et al. |
| 2010/0227226 | A1 | 9/2010 | Onuki et al. |
| 2011/0159380 | A1 | 6/2011 | Onuki et al. |
| 2011/0168558 | A1 | 7/2011 | Fransaer et al. |
| 2011/0183199 | A1 | 7/2011 | Abe |
| 2011/0229771 | A1 | 9/2011 | Onuki et al. |
| 2012/0088162 | A1 | 4/2012 | Harrup et al. |
| 2012/0130107 | A1 | 5/2012 | Okamoto et al. |
| 2012/0189919 | A1 | 7/2012 | Abe et al. |
| 2012/0189920 | A1 | 7/2012 | Li et al. |
| 2012/0328954 | A1 | 12/2012 | Okabe et al. |

(Continued)

FOREIGN PATENT DOCUMENTS

| JP | 8-045545 | 2/1996 |
|---|---|---|
| JP | 10-27625 | 1/1998 |

(Continued)

OTHER PUBLICATIONS

Takeshi Abe: "Lithium-Ion Battery These 15 Years and Emerging Technology"; CMC Publishing Co., Ltd., Dec. 25, 2008, the first print publication, Chapter 2, p. 54, lines 1-8 (resubmitted with English translation -13 pages).

*Primary Examiner* — Edu E Enin-Okut
*Assistant Examiner* — Haroon S Sheikh
(74) *Attorney, Agent, or Firm* — Hamre, Schumann, Mueller & Larson, P.C.

(57) ABSTRACT

The present invention provides a non-aqueous electrolytic solution including a methylenebissulfonate derivative and improving initial irreversible capacity and other characteristics of a battery such as a cycle characteristics, electric capacity, and storage characteristics; a method for producing thereof; and a battery using the electrolytic solution. The non-aqueous electrolytic solution includes: (1) a non-aqueous solvent comprising at least one selected from a cyclic carbonate ester, a straight chained carbonate ester and/or a cyclic carboxylic acid ester, (2) a lithium salt which may be dissolved in the non-aqueous solvent, as an electrolyte salt, and (3) a methylenebissulfonate derivative of formula [1]:

[1]

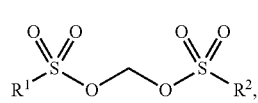

The method includes steps of dissolving a lithium salt in a non-aqueous solvent, and then dissolving the methylenebissulfonate derivative. The non-aqueous electrolytic solution battery includes (i) the non-aqueous electrolytic solution, (ii) a negative electrode, (iii) a positive electrode, and (iv) a separator.

12 Claims, No Drawings

(56) References Cited

U.S. PATENT DOCUMENTS

| | | |
|---|---|---|
| 2013/0029218 A1 | 1/2013 | Waki et al. |
| 2013/0143129 A1 | 6/2013 | Okamoto et al. |

FOREIGN PATENT DOCUMENTS

| | | |
|---|---|---|
| JP | 10-50342 | 2/1998 |
| JP | 2000-133304 | 5/2000 |
| JP | 2001-6729 | 1/2001 |
| JP | 2001-313071 | 11/2001 |
| JP | 2003-217654 | 7/2003 |
| JP | 2003-331920 | 11/2003 |
| JP | 2006-206515 | 8/2006 |
| JP | 2006-339020 | 12/2006 |
| JP | 2007-080620 | 3/2007 |
| JP | 2007-095380 | 4/2007 |
| JP | 2008-153118 | 7/2008 |
| JP | 2008-169162 | 7/2008 |
| JP | 2008-218425 | 9/2008 |
| JP | 2008218425 A * | 9/2008 |
| JP | 2010-103052 | 5/2010 |
| KR | 10-2009-0040214 | 4/2009 |
| KR | 2009-0040214 | 4/2009 |
| WO | 2008/133112 | 11/2008 |

* cited by examiner

NONAQUEOUS ELECTROLYTE SOLUTION AND NONAQUEOUS ELECTROLYTE BATTERY USING SAME

TECHNICAL FIELD

The present invention relates to a novel non-aqueous electrolytic solution, using a methylenebissulfonate derivative, having decreased initial irreversible capacity of a battery, and further improved battery characteristics such as cycle characteristics, electric capacity, storage characteristics, a method for producing the same and a non-aqueous electrolytic solution battery using the electrolytic solution.

BACKGROUND ART

In recent years, with the spread of various compact-type mobile electronic devices such as a mobile electronic terminal represented by a mobile phone, a notebook-type PC or the like, a secondary battery has fulfilled an important role as a power source thereof.

A lithium secondary battery is widely used as a power source of electronic devices of, for example, a mobile phone, a notebook-type PC or the like, a power source for an electric automobile or a power storage, or the like, and is mainly composed of a positive electrode, a non-aqueous electrolytic solution and a negative electrode.

As the positive electrode composing a lithium secondary battery, for example, $LiCoO_2$, $LiMn_2O_4$, $LiNiO_2$, $LiFePO_4$ or the like has been known. It has been reported that, in the lithium secondary battery using these, when it becomes high temperature in a charged state, since a non-aqueous solvent in the non-aqueous electrolytic solution is locally subjected to oxidative decomposition partially at the interface between a positive electrode material and the non-aqueous electrolytic solution, a decomposed substance or gas generated by this decomposition inhibits an original electrochemical reaction of a battery, and as a result, battery performance such as cycle characteristics is decreased.

In addition, as the negative electrode, for example, metallic lithium, a metallic compound being able to store and discharge lithium (for example, a metal elementary substance, an oxide, an alloy with lithium or the like), a carbon material, or the like has been known, and particularly, a lithium secondary battery using a carbon material such as coke, artificial graphite, natural graphite, which is able to store and discharge lithium, has practically been used widely.

It has been reported that the lithium secondary battery using a highly crystallized carbon material of, for example, artificial graphite, natural graphite or the like, as a negative electrode material, decreases cycle characteristics, because a non-aqueous solvent in the non-aqueous electrolytic solution is reductively decomposed at a negative electrode surface in charging, and a decomposed substance or gas generated thereby inhibits an original electrochemical reaction of a battery. In addition, it has been known that the lithium secondary battery using, for example, a lithium metal or an alloy thereof, a metal elementary substance or an oxide using tin, silicon or the like, as a negative electrode material, has high initial capacity, however, because the negative electrode material becomes fine powder in cycle, reductive decomposition of the non-aqueous solvent occurs at an accelerated rate, as compared with a negative electrode made of the carbon material, resulting in decrease in charge-discharge efficiency at the first cycle accompanied with increase in initial irreversible capacity of a battery, and large decrease in battery performance such as battery capacity or cycle characteristics, accompanying therewith.

In this way, generation of fine powder of the negative electrode material or accumulation of a decomposed substance of the non-aqueous solvent inhibits smooth storage and discharge of lithium to the negative electrode, and as a result, has a problem of significant decrease in battery characteristics such as cycle characteristics.

As described above, a usual lithium secondary battery had a cause of decreasing battery performance, by inhibiting transfer of a lithium ion, or blistering the battery, by a decomposed substance or gas generated in decomposition of the non-aqueous electrolytic solution on the positive electrode or the negative electrode.

On the other hand, a tendency for multi-functionalization of electronic devices mounted with a lithium secondary battery has been progressing more and more, and it is now in a tendency of increasing power consumption amount. Accompanied with it, change to higher capacity of a lithium secondary battery has also been progressing more and more, and it has been a problem that volume occupied by the non-aqueous electrolytic solution inside a battery becomes smaller, for example, by improvement of increasing density of an electrode, decreasing useless space volume and dead space inside a battery or the like, and thus decomposition of a small amount of the non-aqueous electrolytic solution influences largely on decrease in battery performance.

Still more, in recent years, as new power source for an electric automobile or a hybrid electric automobile, there has been performed development of an electrical storage device, called an electric double layer capacitor using an activated carbon or the like for an electrode, in view of output density; called a hybrid capacitor (which utilizes both capacity by storage and discharge of lithium, and electric double layer capacity) combining principle of electricity accumulation of a lithium ion secondary battery and the electric double layer capacitor, in view of satisfying both energy density and output density, and it is a present state that enhancement of cycle characteristics or the like is required.

To enhance characteristics of the non-aqueous electrolytic solution battery, it has been required to enhance not only characteristics of a negative electrode or a positive electrode, but also characteristics of the non-aqueous electrolytic solution which takes a role of transfer of a lithium ion.

As the non-aqueous electrolytic solution of the non-aqueous electrolytic solution-type secondary battery at present, a non-aqueous solution is used, where a lithium salt (an electrolyte salt) of, for example, $LiBF_4$, $LiPF_6$, $LiClO_4$, $LiN(SO_2CF_3)_2$, $LiN(SO_2CF_2CF_3)_2$ or the like, is mixed into a non-proton organic solvent.

The non-aqueous electrolytic solution, where for example, $LiBF_4$, $LiPF_6$ or the like is dissolved into a non-aqueous solvent, has been known to be stable in high voltage, because of, for example, having high electrical conductivity, which exhibits transfer of the lithium ion, and high oxidative decomposition voltage of $LiBF_4$ or $LiPF_6$. Therefore, such the non-aqueous electrolytic solution-type secondary battery contributes to bring out features of having high voltage and high energy density (PATENT LITERATURE 1).

However, the non-aqueous electrolytic solution composed of a non-aqueous solvent dissolved with $LiBF_4$ or $LiPF_6$ as a lithium salt, has a problem of generation of hydrogen fluoride (HF) caused by decomposition of the lithium salt at a high temperature environment of 60° C. or higher, due to inferior thermal stability of these electrolytes. This hydrogen fluoride causes a phenomenon of decomposition of, for example, a carbon material of a negative electrode in a battery or the like, therefore had a problem of not only decrease in battery capacity caused by decrease in charge-discharge efficiency at the first cycle or the like, accompanied with increase in initial irreversible capacity of a secondary battery provided with such the non-aqueous electrolytic solution, but also increase in internal resistance of a battery under high temperature environment, and significant decrease in battery performance such as charge-discharge cycle life.

In addition, as the non-proton organic solvent to dissolve the lithium salt in the non-aqueous electrolytic solution, for example, carbonates such as ethylene carbonate, propylene carbonate, and dimethyl carbonate are mainly used, and among them, a mixed solvent combining a high dielectric constant solvent, having high solubility of an electrolyte, and a low viscosity solvent is preferable. It is because the high dielectric constant solvent has high viscosity and very slow ion transportation, and is thus required to decrease viscosity thereof to increase ion transportation and increase ionic conductivity. Specifically a mixed solvent composed of a cyclic carbonate ester of, for example, ethylene carbonate, propylene carbonate or the like, as the high dielectric constant solvent, and a straight chained carbonate ester of, for example, dimethyl carbonate, diethyl carbonate, ethylmethyl carbonate or the like, as the low viscosity solvent, is used, and an electrolytic solution comprising this provides high ionic conductivity.

However, in the case of using the mixed solvent composed of the cyclic carbonate ester such as ethylene carbonate, and the straight chained carbonate ester such as dimethyl carbonate or ethylmethyl carbonate, an ester exchange reaction brings about on the electrode, by the straight chained carbonate ester, which generates an alkoxide radical such as a methoxy group or an ethoxy group, as an intermediate thereof. Since these radicals generated by this ester exchange are strong nucleophilic agents, they promote ring-opening/decomposition of ethylene carbonate, propylene carbonate or the like, which is a cyclic carbonate ester, and generate gas, or dissolve a metal of the positive electrode active material and destroy a crystal structure, and as a result, it has a problem of increasing initial irreversible capacity of a battery, and decreasing battery characteristics such as battery capacity or cycle characteristics accompanying therewith.

For example, at the graphite negative electrode, potential for a lithium ion to be inserted is at the vicinity of 0.3 V (vs. Li$^+$/Li), and at this potential, most of organic solvents are decomposed. Therefore, a reductive decomposition reaction of an electrolytic solution using ethylene carbonate or the like is generated at the vicinity of 1.0 V, in initial charging. Because a decomposed product of the electrolytic solution forms a surface coating on the graphite negative electrode, and suppresses the reductive decomposition of the electrolytic solution at or subsequent to the second cycle, charge-discharge efficiency at or subsequent to the second cycle becomes nearly 100%. However, because of generation of irreversible capacity caused by formation of the surface coating in the initial charging, research and development aiming at decreasing the above irreversible capacity of a battery by optimizing the electrolytic solution has been competed (NON-PATENT LITERATURE 1).

As described above, the non-aqueous electrolytic solution-type secondary battery has a problem of decrease in initial charge-discharge efficiency accompanied with increase in initial irreversible capacity of a battery, as well as a problem of decrease in electric capacity or increase in internal resistance, by storage at high temperature or repeated charge-discharge, and thus various additives have been proposed to enhance stability or various battery characteristics of the non-aqueous electrolytic solution-type secondary battery.

For example, in a secondary battery using a negative electrode made of graphite having high crystallinity, there have been proposed, for example, a non-aqueous electrolytic solution containing vinylene carbonate, vinylethylene carbonate or the like (PATENT LITERATURE 2 and PATENT LITERATURE 3), a non-aqueous electrolytic solution containing 1,3-propanesultone and butanesultone, for example, in a secondary battery using a carbon negative electrode (PATENT LITERATURE 4).

Because an electrolytic solution containing a cyclic carbonate compound having an unsaturated group such as vinylene carbonate, vinylethylene carbonate, or a sultone compound such as 1,3-propanesultone or butanesultone, forms a stable coating which suppresses reductive decomposition of the electrolytic solution at the negative electrode surface, by polymerization/reductive decomposition of these additives at the negative electrode surface, a side reaction such as decomposition of a solvent, which has been occurred at the negative electrode surface can be suppressed by covering the negative electrode surface with this reactive coating layer, resulting in improvement of a problem of decrease or the like in charge-discharge efficiency at the first cycle, accompanied with increase in initial irreversible capacity of a battery. Therefore, the electrolytic solution containing these additives provides certain degree of effect, even in the case of using any negative electrode, however, in particular, for a negative electrode made of highly crystalline natural graphite or artificial graphite, vinylene carbonate exhibits effect of peeling suppression of a graphite layer, therefore it has been used widely as additives for the electrolytic solution of a battery having these as a negative electrode.

On the other hand, additives forming a coating on a negative electrode have been reported, other than the above sultone compound or the cyclic carbonate compound having an unsaturated group. There are included an electrolytic solution containing, as additives, a disulfonate ester derivative such as, for example, propylene glycol dimethanesulfonate, 1,4-butanediol dimethanesulfonate (PATENT LITERATURE 5, PATENT LITERATURE 6, PATENT LITERATURE 7 and PATENT LITERATURE 8); an electrolytic solution containing, for example, both a disulfonate ester derivative such as ethylene glycol dimethanesulfonate and a sulfonate ester derivative such as methyl methanesulfonate (PATENT LITERATURE 9 and PATENT LITERATURE 10); an electrolytic solution containing, for example, a fluorine-containing sulfonate compound (PATENT LITERATURE 11 and PATENT LITERATURE 12); or the like.

However, for example, the above disulfonate ester derivative, the sulfonate ester derivative, the fluorine-containing sulfonate compound or the like have not sufficient coating forming ability on the negative electrode, and has a problem of not forming a coating sufficient to suppress reductive decomposition of the non-aqueous electrolytic solution, as well as has not sufficient durability of the coating. As a result, initial irreversible capacity increases, to generate a problem of decrease in charge-discharge efficiency at the first cycle. Even by adding the disulfonate ester derivative in excess into the non-aqueous electrolytic solution to improve this point, resistance of a coating component generated at the negative electrode surface increases, which, to the contrary, raises a problem of leading to decrease in battery performance. Threfore, the addition of these additives to the electrolytic solution was not sufficient to enhance total balance of battery characteristics and cost of the non-aqueous electrolytic solution, as well as environmental aspect, production step or the like.

In addition, in preparing the non-aqueous electrolytic solution, there was a problem that a lithium salt in the non-aqueous electrolytic solution reacts with moisture inside a system and decomposes to generate a free acid such as hydrogen fluoride (HF), because of temperature increase of the non-aqueous electrolytic solution itself due to heat generation in dissolving and concocting the above lithium salt. In particular, in the case of concocting the non-aqueous electrolytic solution containing the above sultone compound or the disulfonate ester derivative or the like, there was a problem of increase in a free acid in the non-aqueous electrolytic solution, as a result of promotion of the above side reaction by increase in temperature in concocting, or decomposition or the like of the sultone compound or the disulfonate ester derivative or the fluorine-containing sulfonate compound itself, and thus it was necessary to prevent temperature increase of the non-aqueous electrolytic solution, and prevent deterioration of the non-aqueous electrolytic solution.

As for an electrolytic solution comprising a sulfonate-type compound, there has been disclosed the one using a sulfonate-type compound with two or more sulfonate groups having an alkenyl group as a substitution group, for example, in PATENT LITERATURE 13 (KR-A-10-2009-0040214). A compound to be used practically by being synthesized in Example of this LITERATURE is a plurality of sulfonate groups bound by a hydrocarbon chain having two or more carbon atoms, such as, for example, bis(allylsulfonyl)ethane, bis(2-butenylsulfonyl)ethane, 1,1,1-tris(allylsulfonylmethyl)propane, tetrakis(allylsulfonyl)neopentane.

However, a lithium battery prepared by using an electrolytic solution containing such a sulfonate-type compound had a problem that initial characteristics such as charge-discharge efficiency at the first cycle is not improved so much as compared with the case of no addition of additives.

Under these circumstances, investigation has been performed on the non-aqueous electrolytic solution satisfying both the problem relating to the above lithium salt, and the problem relating to the non-aqueous solvent, and investigation is now being undertaken on a preferable combination that makes difficult to appear the effect of respective negative side of composition element of the non-aqueous electrolytic solution (a non-aqueous solvent, a lithium salt, additives or the like), use of novel additives, prescription using them or the like.

PRIOR ART LITERATURES

Patent Literature

PATENT LITERATURE 1: JP-A-10-27625
PATENT LITERATURE 2: JP-A-8-045545
PATENT LITERATURE 3: JP-A-2001-6729
PATENT LITERATURE 4: JP-A-10-50342
PATENT LITERATURE 5: JP-A-2001-313071
PATENT LITERATURE 6: JP-A-2008-218425
PATENT LITERATURE 7: JP-A-2003-217654
PATENT LITERATURE 8: WO 2008/133112
PATENT LITERATURE 9: JP-A-2007-080620
PATENT LITERATURE 10: JP-A-2007-095380
PATENT LITERATURE 11: JP-A-2003-331920
PATENT LITERATURE 12: JP-A-2006-339020
PATENT LITERATURE 13: KR-A-10-2009-0040214

Non Patent Literature

NON PATENT LITERATURE 1: "Lithium ion battery, these 15 years and future technology", CMC publishing, Dec. 25, 2008, 1st copy issue, Page 54, line 1 to 8.

DISCLOSURE OF INVENTION

Technical Problem

The present invention has been proposed in view of the above circumstances, and it is an object of the present invention to provide a non-aqueous electrolytic solution comprising a methylenebissulfonate derivative, which enhances charge-discharge efficiency of a battery at the first cycle, initial characteristics, cycle characteristics, storage characteristics at high temperature; a method for producing the same; and the non-aqueous electrolytic solution battery.

Technical Solution

The present invention encompasses <1> a non-aqueous electrolytic solution comprising the following (1) to (3):
(1) a non-aqueous solvent comprising at least one selected from a cyclic carbonate ester, a straight chained carbonate ester and a cyclic carboxylic acid ester,
(2) a lithium salt which enables to dissolve in the non-aqueous solvent as an electrolyte salt,
(3) a methylenebissulfonate derivative represented by the following general formula [1];

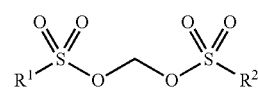

[1]

(wherein $R^1$ and $R^2$ each independently represent an alkyl group having 1 to 6 carbon atoms, which may have a substitution group, a haloalkyl group having 1 to 6 carbon atoms, an alkenyl group having 2 to 8 carbon atoms, which may have a substitution group, an alkynyl group having 2 to 8 carbon atoms, an alkoxy group having 1 to 6 carbon atoms, an aralkyl group having 7 to 15 carbon atoms or a hetero cycle group, which may have a substitution group):
<2> a method for producing a non-aqueous electrolytic solution, characterized by dissolving a lithium salt in a non-aqueous solvent, and then by dissolving the methylenebissulfonate derivative represented by the above general formula [I]: and
<3> a non-aqueous electrolytic solution battery provided with (i) the non-aqueous electrolytic solution according to the above <1>, (ii) a negative electrode, (iii) a positive electrode and (iv) a separator.

Advantageous Effects

Because the non-aqueous electrolytic solution of the present invention enables to suppress reductive decomposition of the electrolytic solution and has good coating formation effect, thus reducing initial irreversible capacity, it provides good charge-discharge efficiency of a battery at the first cycle, initial characteristics and stability at high temperature. Accordingly, using this as the non-aqueous electrolytic solution for a lithium secondary battery enables to provide the non-aqueous electrolytic solution battery having not only good storage characteristics at high temperature but also being able to suppress gas generation inside a battery. Further, because of being able to maintain initial capacity in battery production, even by repeating charge-discharge cycle, it enables to provide the non-aqueous electrolytic solution having good cycle characteristics.

The production method for the non-aqueous electrolytic solution of the present invention enables to provide a good non-aqueous electrolytic solution, because of suppressing generation of a free acid, and preventing deterioration of the non-aqueous electrolytic solution, thus maintaining quality thereof.

DESCRIPTION OF EMBODIMENTS

First, explanation will be given on the non-aqueous electrolytic solution of the present invention.
1. A Methylenebissulfonate Derivative The methylenebissulfonate derivative to be used in the present invention is the one represented by the following general formula [1] (hereafter it may be abbreviated as the methylenebissulfonate derivative relevant to the present invention):

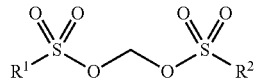

[1]

(wherein $R^1$ and $R^2$ each independently represent an alkyl group having 1 to 6 carbon atoms, which may have a substitution group, a haloalkyl group having 1 to 6 carbon atoms, an alkenyl group having 2 to 8 carbon atoms, which may have a substitution group, an alkynyl group having 2 to 8 carbon atoms, an alkoxy group having 1 to 6 carbon atoms, an aralkyl group having 7 to 15 carbon atoms or a hetero cycle group, which may have a substitution group).

The alkyl group having 1 to 6 carbon atoms, which may have a substitution group, represented by $R^1$ and $R^2$, in the general formula [1], may be any of a straight chained, a branched or a cyclic one, and a straight chained one or a cyclic one is preferable, among them, includes the one having carbon atoms of usually 1 to 6 and preferably 1 to 4, and specifically includes, for example, a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a 1-methylpentyl group, a n-hexyl group, an isohexyl group, a sec-hexyl group, a tert-hexyl group, a neohexyl group, a cyclopropyl group, a cyclobutyl group, a cyclopentyl group, a cyclohexyl group or the like, and among them a methyl group, an ethyl group, a n-propyl group, a n-butyl group, a cyclopropyl group, or the like is more preferable.

As a substitution group of the alkyl group having 1 to 6 carbon atoms, which may have a substitution group, there are included, for example, an acyl group, an alkoxy group, a cyano group, a nitro group, an aryloxy group, an acyloxy group or the like.

As the acyl group, which is included as a substitution group of the alkyl group having 1 to 6 carbon atoms, which have a substitution group, there is included the one having usually 2 to 6 carbon atoms, and specifically there are included, for example, an acetyl group, a propionyl group, a butyryl group, an isobutyryl group, a valeryl group, an isovaleryl group, a pivaloyl group or the like.

The alkoxy group, which is included as a substitution group of the alkyl group having 1 to 6 carbon atoms, which have a substitution group, may be any of a straight chained, a branched or a cyclic one, includes the one having carbon atoms of usually 1 to 4, and specifically includes, for example, a methoxy group, an ethoxy group, a n-propoxy group, an isopropoxy group, a n-butoxy group, an isobutoxy group, a sec-butoxy group, a tert-butoxygroup or the like.

As the aryloxy group, which is included as a substitution group of the alkyl group having 1 to 6 carbon atoms, which have a substitution group, there is included the one having carbon atoms of usually 6 to 10, and specifically there are included, for example, a phenyloxy group, a naphthyloxy group or the like.

The acyloxy group, which is included as a substitution group of the alkyl group having 1 to 6 carbon atoms, which have a substitution group, may be any of a straight chained, a branched or a cyclic one, includes the one derived from a carboxylic acid having carbon atoms of usually 2 to 6 and preferably 2 to 3, and specifically includes, for example, a group derived from an aliphatic saturated carboxylic acid, for example, an acetyloxy group, a propionyloxy group, a butyryloxy group, an isobutyryloxy group, a valeryloxy group, an isovaleryloxy group, a pivaloyloxy group or the like; a group derived from an aliphatic unsaturated carboxylic acid, for example, an acryloyloxy group, a propioloyloxy group, a methacryloyloxy group, a crotonyloxy group, an isocrotonyloxy group, a pentenoyloxy group, a hexenoyloxy group or the like.

As a preferable specific example of the alkyl group having 1 to 6 carbon atoms, which have a substitution group, there are included, for example, a cyanomethyl group, a 2-cyanoethyl group, a methoxymethyl group, a 2-methoxyethyl group or the like.

The haloalkyl group having 1 to 6 carbon atoms, represented by $R^1$ and $R^2$, may be any of a straight chained, a branched or a cyclic one, includes the one where a part of or all of hydrogen atoms of the alkyl group having carbon atoms of usually 1 to 6, preferably 1 to 4 and more preferably 1 to 2, is substituted with a halogen atom (for example, a fluorine atom, a chlorine atom, a bromine atom, an iodine atom or the like), and specifically includes, for example, a fluoromethyl group, a trifluoromethyl group, a 2-fluoroethyl group, a pentafluoroethyl group, a 3-fluoropropyl group, a trifluoropropyl group, a di(trifluoromethyl)methyl group, a heptafluoropropyl group, a 4-fluorobutyl group, a nonafluorobutyl group, a 5-fluoropentyl group, a 2,2,3,3,4,4,5,5-octafluoropentyl group (—$CH_2(CF_2)_4H$), a perfluoropentylgroup, a 6-fluorohexylgroup, a perfluorohexylgroup, a perfluoroheptyl group, a perfluorooctyl group, a chloromethyl group, a trichloromethyl group, a 2-chloroethyl group, a pentachloroethyl group, a 3-chloropropyl group, a trichloropropyl group, a di(trichloromethyl)methyl group, a heptachloropropyl group, a 4-chlorobutyl group, a nonachlorobutyl group, a 5-chloropentyl group, a 2,2,3,3,4,4,5,5-octachloropentyl group (—$CH_2(CCl_2)_4H$), a perchloropentyl group, a 6-chlorohexyl group, a perchlorohexyl group, a perchloroheptyl group, a perchlorooctyl group, a bromomethyl group, a tribromomethyl group, a 2-bromoethyl group, a pentabromoethyl group, a 3-bromopropyl group, a tribromopropyl group, a di(tribromomethyl)methyl group, a heptabromopropyl group, a 4-bromobutyl group, a nonabromobutyl group, a 5-bromopentyl group, a 2,2,3,3,4,4,5,5-octabromopentyl group (—$CH_2(CBr_2)_4H$), a perbromopentyl group, a 6-bromohexyl group, a perbromohexyl group, a perbromoheptyl group, a perbromooctyl group, a iodomethyl group, a triiodomethyl group, a 2-iodoethyl group, a pentaiodoethyl group, a 3-iodopropyl group, a triiodopropyl group, a di(triiodomethyl)methyl group, a heptaiodopropyl group, a 4-iodobutyl group, a non-aiodobutyl group, a 5-iodopentyl group, a 2,2,3,3,4,4,5,5-octaiodopentyl group ($-CH_2(Cl_2)_4H$), a periodopentyl group, a 6-iodohexyl group, a periodohexyl group, a periodoheptyl group, a periodooctyl group, and among them, a trifluoromethyl group is preferable.

The alkoxy group having 1 to 6 carbon atoms, represented by $R^1$ and $R^2$, may be any of a straight chained, a branched or a cyclic one, includes the one having carbon atoms of usually 1 to 6, preferably 1 to 4 and more preferably 1 to 2, and specifically includes, for example, a methoxy group, an ethoxy group, a n-propoxy group, an isopropoxy group, a n-butoxy group, an isobutoxy group, a sec-butoxy group, a tert-butoxy group, a n-pentyloxy group, an isopentyloxy group, a sec-pentyloxy group, a tert-pentyloxy group, a neo-pentyloxy group, a n-hexyloxy group, an isohexyloxy group, a sec-hexyloxy group, a tert-hexyloxy group, a neohexyloxy group, a cyclopropoxy group, a cyclobutoxy group, a cyclopentyloxy group, a cyclohexyloxy group or the like, and among them, a methoxy group and an ethoxy group and the like are preferable.

An alkenyl group of the alkenyl group having 2 to 8 carbon atoms, which may have a substitution group, represented by $R^1$ and $R^2$, may be any of a straight chained, a branched or a cyclic one, includes the one having carbon atoms of usually 2 to 8 and preferably 2 to 4, and specifically includes, for example, a vinyl group, an allyl group, a 1-propenyl group, an isopropenyl group, a 1-butenyl group, a 2-butenyl group, a 2-methylallyl group, a 1-pentenyl group, a 2-pentenyl group, a 2-methyl-2-butenyl group, a 1-hexenyl group, a 2-hexenyl group, a 3-hexenyl group, a 2-methyl-2-pentenyl group, a 1-heptenyl group, a 2-heptenyl group, a 3-heptenyl group, a 1-octenyl group, a 2-octenyl group, a 3-octenyl group, a 4-octenyl group, a 1-cyclobutenyl group, a 1-cyclopentenyl group, a 1-cyclohexenyl group or the like, and among them, a vinyl group and an allyl group and the like are preferable.

As a substitution group of the alkenyl group having 2 to 8 carbon atoms, which may have a substitution group, there are included, for example, an alkyl group, an aryl group, an acyl group, an alkoxy group, a cyano group, a nitro group, an aryloxy group, and an acyloxy group.

An alkyl group, which is included as a substitution group of the alkenyl group having 2 to 8 carbon atoms, which a substitution group, is the one having carbon atoms of 1 to 6, preferably 1 to 4 and more preferably 1 to 2, and there is included a same one as an exemplification of alkyl group of the alkyl group having 1 to 6 carbon atoms, which may have a substitution group, represented by $R^1$ and $R^2$ in the general formula [1].

As an aryl group, which is included as a substitution group of the alkenyl group having 2 to 8 carbon atoms, which have a substitution group, there is included the one having carbon atoms of 6 to 10, and specifically there are included, for example, a phenyl group, a naphthyl group, or the like.

As the acyl group, the alkoxy group, the aryloxy group, and the acyloxy group, which are included as substitution groups of the alkenyl group having 2 to 8 carbon atoms, which have a substitution group, there is included a same one as an exemplification of the acyl group, the alkoxy group, the aryloxy group, and the acyloxy group included as substitution groups of the alkyl group having 1 to 6 carbon atoms, which may have a substitution group, represented by $R^1$ and $R^2$ in the general formula [1].

As a preferable specific example of the alkenyl group having 2 to 8 carbon atoms, which have a substitution group, there are included, for example, a 2-methylallyl group, a 3-methyl-2-butenyl group, a cinnamyl group (3-phenyl-2-propenyl group) or the like.

The alkynyl group having 2 to 8 carbon atoms, represented by $R^1$ and $R^2$, may be any of a straight chained, a branched or a cyclic one, includes the one having carbon atoms of usually 2 to 8 and preferably 2 to 4, and specifically includes, for example, an ethynyl group, a 1-propynyl group, a 2-propynyl group, a 1-butynyl group, a 2-butynyl group, a 1-methyl-2-propynyl group, a 1-pentynyl group, a 2-pentynyl group, a 1-methyl-3-butynyl group, a 1-hexynyl group, a 2-hexynyl group, a 3-hexynyl group, a 2-methyl-4-heptynyl group, a 1-heptynyl group, a 2-heptynyl group, a 3-heptynyl group, a 1-octynyl group, a 2-octynyl group, a 3-octynyl group, a 4-octynyl group or the like, and among them, a 2-propynyl group is preferable.

As the aralkyl group represented by $R^1$ and $R^2$, there is included the one having carbon atoms of usually 7 to 15 and preferably 7 to 10, and specifically there are included, for example, a benzyl group, a phenethyl group, a 1-phenylethyl group, a 2-phenylpropyl group, a 3-phenylpropyl group, a phenylbutyl group, a 1-methyl-3-phenylpropyl group, a naphthylmethyl group or the like, and among them, a benzyl group is preferable.

As a hetero cycle group of the hetero cycle group, which may have a substitution group, represented by $R^1$ and $R^2$ is, for example, a 5-membered cycle or a 6-membered cycle, there is included the one containing one to three hetero atoms, for example, nitrogen atom(s), oxygen atom(s), sulfur atom(s) and the like, and specifically there are included, an aliphatic hetero cycle group, for example, a thienyl group, a pyrrolyl group or the like.

As a substitution group of the hetero cycle group with a substitution group, there are included an alkyl group and an ethylenedioxy group, and the alkyl group may be any of a straight chained, a branched or a cyclic one, includes the one having carbon atoms of usually 1 to 3, and specifically includes, for example, a methyl group, an ethyl group, a n-propyl group, an isopropyl group or the like.

As a preferable specific example of the hetero cycle group with a substitution group, there are included, for example, a 4-methyl-2-thienyl group, a 3,4-ethylenedioxythienyl group or the like.

A methylenebissulfonate derivative relevant to the present invention is preferably the one represented by the following general formula [1a]:

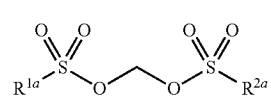

(wherein $R^{1a}$ and $R^{2a}$ each independently represent an alkyl group having 1 to 6 carbon atoms, an alkyl group having 1 to 6 carbon atoms with an alkoxy group having 1 to 4 carbon atoms, an alkyl group having 1 to 6 carbon atoms with a cyano group, an haloalkyl group having 1 to 6 carbon atoms, an alkenyl group having 2 to 8 carbon atoms, an alkenyl group having 2 to 8 carbon atoms with an alkyl group having 1 to 6 carbon atoms, an alkenyl group having 2 to 8 carbon atoms with an aryl group having 6 to 10 carbon atoms, an alkynyl group having 2 to 8 carbon atoms, an alkoxy group having 1 to 6 carbon atoms, an aralkyl group having 7 to 15 carbon atoms, a 5 to 6-membered hetero cycle group containing a nitrogen atom and/or a sulfur atom or a 5 to 6-membered hetero cycle group containing a nitrogen atom and/or a sulfur atom).

A methylenebissulfonate derivative relevant to the present invention is preferably the one represented by the following general formula [1b]:

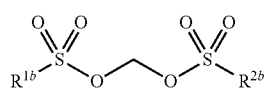

(wherein $R^{1b}$ and $R^{2b}$ each independently represent an alkyl group having 1 to 6 carbon atoms, an haloalkyl group having 1 to 6 carbon atoms, an alkenyl group having 2 to 8 carbon atoms, an alkenyl group having 2 to 8 carbon atoms with an alkyl group having 1 to 6 carbon atoms, an alkenyl group having 2 to 8 carbon atoms with an aryl group having 6 to 10 carbon atoms, an aralkyl group having 7 to 15 carbon atoms or a 5 to 6-membered hetero cycle group containing a sulfur atom).

The alkyl group having 1 to 6 carbon atoms represented by $R^{1a}$, $R^{2a}$, $R^{1b}$ and $R^{2b}$ in the above general formula, an alkyl group of the alkyl group having 1 to 6 carbon atoms with the alkoxy group having 1 to 4 carbon atoms represented by $R^{1a}$ and $R^{2a}$, and an alkyl group of the alkyl group having 1 to 6 carbon atoms with the cyano group represented by $R^{1a}$ and $R^{2a}$, may be any of a straight chained, a branched or a cyclic one, and among them, a straight chained or a cyclic one is preferable, includes the one having carbon atoms of usually 1 to 6 and preferably 1 to 4, and there is included a same one as an exemplification of the alkyl group of the alkyl group having 1 to 6 carbon atoms, which may have a substitution group, represented by $R^1$ and $R^2$.

An alkoxy group of the alkyl group having 1 to 6 carbon atoms with the alkoxy group having 1 to 4 carbon atoms may be any of a straight chained, a branched or a cyclic one, includes the one having carbon atoms of usually 1 to 4, and specifically includes, for example, a methoxy group, an ethoxy group, a n-propoxy group, an isopropoxy group, a n-butoxy group, an isobutoxy group, a sec-butoxy group, a tert-butoxy group, or the like. As a preferable specific example of the alkyl group having 1 to 6 carbon atoms with the alkoxy group having 1 to 4 carbon atoms, there are included, for example, a methoxymethyl group, a 2-methoxyethyl group, or the like.

The haloalkyl group having 1 to 6 carbon atoms, represented by $R^{1a}$, $R^{2a}$, $R^{1b}$ and $R^{2b}$, may be any of a straight chained, a branched or a cyclic one, includes the one where a part of or all of hydrogen atoms of the alkyl group having carbon atoms of usually 1 to 6, preferably 1 to 4 and more preferably 1 to 2, is substituted with a halogen atom (for example, a fluorine atom, a chlorine atom, a bromine atom, an iodine atom or the like), and the same one is exemplified as the haloalkyl group having 1 to 6 carbon atoms, represented by $R^1$ and $R^2$.

The alkoxy group having 1 to 4 carbon atoms, represented by $R^{1a}$ and $R^{2a}$, may be any of a straight chained, a branched or a cyclic one, includes the one having carbon atoms of usually 1 to 6, preferably 1 to 4 and more preferably 1 to 2, and there is included a same one as an exemplification of the alkoxy group having 1 to 6 carbon atoms, represented by $R^1$ and $R^2$.

The alkenyl group having 2 to 8 carbon atoms, represented by $R^{1a}$, $R^{2a}$, $R^{1b}$ and $R^{2b}$, an alkenyl group of the alkenyl group having 2 to 8 carbon atoms, with the alkyl group having 1 to 6 carbon atoms, represented by $R^{1a}$, $R^{2a}$, $R^{1b}$ and $R^{2b}$, and an alkenyl group of the alkenyl group having 2 to 8 carbon atoms, with the aryl group having 6 to 10 carbon atoms, represented by $R^{1a}$, $R^{2a}$, $R^{1b}$ and $R^{2b}$, may be any of a straight chained, a branched or a cyclic one, and among them, a straight chained, or a cyclic one is preferable, includes the one having carbon atoms of usually 2 to 8 and preferably 2 to 4, and there is included a same one as an exemplification of the alkenyl group of the alkenyl group having 2 to 8 carbon atoms, which may have a substitution group, represented by $R^1$ and $R^2$.

An alkyl group of the alkenyl group having 2 to 8 carbon atoms, which have 1 to 6 carbon atoms, is the one having carbon atoms of preferably 1 to 4, more preferably 1 to 2, and includes a same one as an exemplification of alkyl group of the alkyl group having 1 to 6 carbon atoms, which may have a substitution group, represented by $R^1$ and $R^2$ in the general formula [1]. As a preferable specific example of the alkenyl group having 2 to 8 carbon atoms with the alkyl group having 1 to 6 carbon atoms, there are included, for example, a 2-methylallyl group, a 3-methyl-2-butenyl group, or the like.

As an aryl group of the alkenyl group having 2 to 8 carbon atoms with the aryl group having 6 to 10 carbon atoms, there is included the one having carbon atoms of 6 to 10, and specifically there are included, for example, a phenyl group, and a naphthyl group or the like. As a preferable specific example of the alkenyl group having 2 to 8 carbon atoms with an aryl group of 6 to 10 carbon atoms, there is included, for example, a cinnamyl group (3-phenyl-2-propenyl group) or the like.

The alkynyl group having 2 to 8 carbon atoms, represented by $R^1$ and $R^2$, may be any of a straight chained, a branched or a cyclic one, includes the one having carbon atoms of usually 2 to 8 and preferably 2 to 4, and there is included a same one as an exemplification of the alkynyl group having 2 to 8 carbon atoms, represented by $R^1$ and $R^2$.

As the aralkyl group having 7 to 15 carbon atoms, represented by $R^{1a}$, $R^{2a}$, $R^{1b}$ and $R^{2b}$, there is included the one having carbon atoms of usually 7 to 15 and preferably 7 to 10, and there is included a same one as an exemplification of the aralkyl group represented by $R^1$ and $R^2$.

As the 5 to 6-membered hetero cycle group containing a nitrogen atom and/or a sulfur atom, represented by $R^{1a}$ and $R^{2a}$, a hetero cycle group of the 5 to 6-membered hetero cycle group containing a nitrogen atom and/or a sulfur atom, with the alkyl group having 1 to 3 carbon atoms, and a hetero cycle group of the 5 to 6-membered hetero cycle group containing a nitrogen atom and/or a sulfur atom, with an ethylenedioxy group, there is included the one containing, for example, hetero atoms of 1 to 3 nitrogen atom(s) and/or sulfur atom(s), as hetero atoms, and specifically there are included an aliphatic hetero cycle group, for example, a thienyl group, a pyrrolyl group or the like.

An alkyl group of the 5 to 6-membered hetero cycle group, containing a nitrogen atom and/or a sulfur atom, having the alkyl group of 1 to 3 carbon atoms represented by $R^{1a}$ and $R^{2a}$, may be any of a straight chained, a branched or a cyclic one, includes the one having carbon atoms of usually 1 to 3, and specifically includes, for example, a methyl group, an ethyl group, a n-propyl group, an isopropyl group or the like. As a preferable specific example of the 5 to 6-membered hetero cycle group, containing a nitrogen atom and/or a sulfur atom, having an alkyl group of 1 to 3 carbon atoms, there is included, for example, a 4-methyl-2-thienyl group or the like.

As a preferable specific example of the 5 to 6-membered hetero cycle group, containing a nitrogen atom and/or a sulfur atom, with the ethylenedioxy group represented by $R^{1a}$ and $R^{2a}$, there is included, for example, a 3,4-ethylenedioxythienyl group or the like.

As the 5 to 6-membered hetero cycle group containing a sulfur atom, represented by $R^{1b}$ and $R^{2b}$, there is included the one containing 1 to 3 sulfur atom(s), as hetero atoms, and specifically there is included an aliphatic hetero cycle group such as, for example, a thienyl group.

The methylenebissulfonate derivative relevant to the present invention (a compound represented by the general formulae [1], [1a] and [1b]) is preferably the one having a bilateral symmetry structure.

As a specific example of the methylenebissulfonate derivative represented by the general formula [1], there are included, for example, methylenebis-(methanesulfonate), methylenebis(ethanesulfonate), methylenebis(n-propanesulfonate), methylenebis(n-butanesulfonate), methylenebis(cyclopropane-sulfonate), methylenebis(trifluoromethanesulfonate), methylenebis(vinylsulfonate), methylenebis(2-propynylsulfonate), methylenebis(2-cyanoethanesulfonate), methylenebis(methoxysulfonate), methylenebis(ethoxysulfonate), methylenebis-(allylsulfonate), methylenebis(2-methylallylsulfonate), methylenebis(3-methyl-2-butenylsulfonate), methylenebis(cinnamylsulfonate), methylenebis(benzyl-sulfonate), methylenebis(2-thienylsulfonate), methylenebis(4-methyl-2-thienyl-sulfonate), methylenebis(3,4-ethylenedioxythienylsulfonate), methylenebis-(2-pyrrolylsulfonate) or the like.

As a preferable specific example of the general formula [1], there are included, for example, the following compounds No. 1 to 20 or the like. In addition, the methylenebissulfonate derivative to be used in the present invention should not be limited by the following exemplifications.

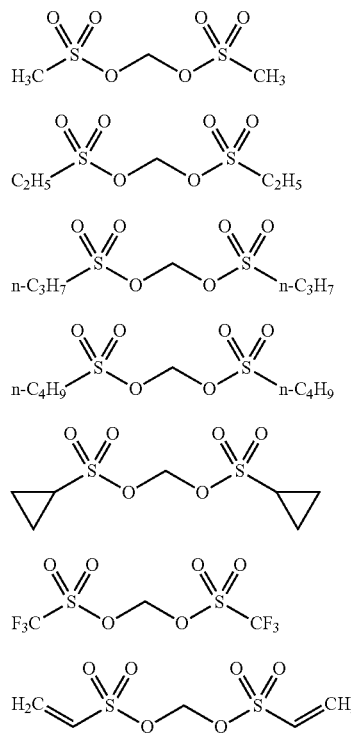

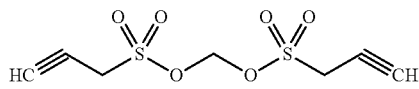
[No.8]

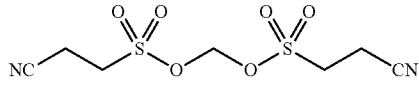
[No.9]

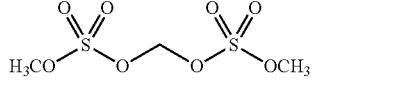
[No.10]

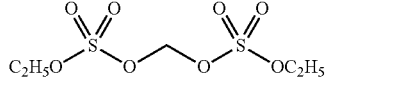
[No.11]

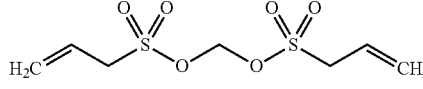
[No.12]

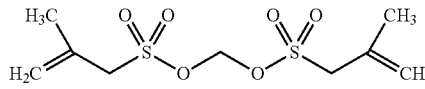
[No.13]

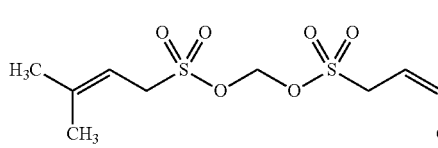
[No.14]

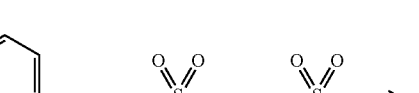
[No.15]

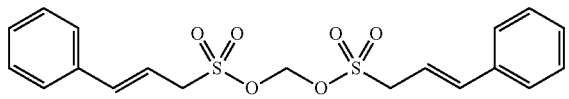
[No.16]

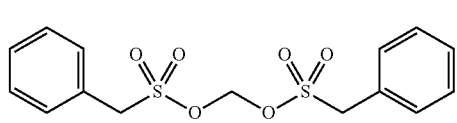
[No.17]

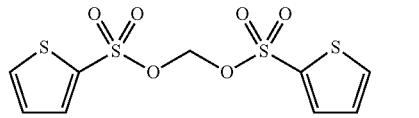
[No.18]

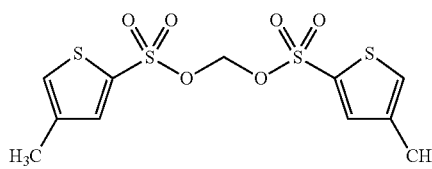
[No.19]

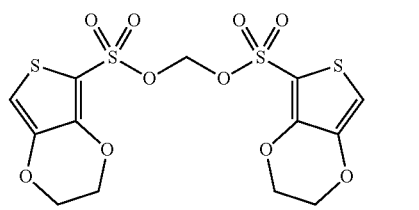

[No.20]

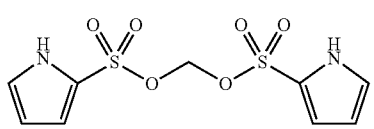

Among these compounds, compounds No. 1, 2, 4, 7, 12, 13, 15 and 17 are more preferable. The methylenebissulfonate derivative represented by the general formula [1] may be enough to use at least one, and two or more kinds may be combined as appropriate.

As for the methylenebissulfonate derivative relevant to the present invention to be dissolved in the non-aqueous electrolytic solution of the present invention, in any case of using alone or as a mixture, concentration thereof is in arrange of usually 0.01 to 2% by weight, and preferably 0.05 to 1% by weight, relative to the non-aqueous electrolytic solution. On the other hand, the concentration of the methylenebissulfonate derivative below 0.01% by weight may occur the case where improvement effect of charge-discharge characteristics or the like, in particular, improvement effect of cycle characteristics become not sufficient, while the concentration over 2% by weight may occur the case where battery characteristics significantly decreases, when temperature of the battery is as high as 85° C. or higher in a full charged state of 4.2 V, as well as blister is generated caused by gas generation inside the battery at such high temperature.

2. A Non-aqueous Solvent

As the non-aqueous solvent to be used in the present invention, there is included at least one selected from a cyclic carbonate ester, a straight chained carbonate ester and a cyclic carboxylic acid ester (hereafter it may be abbreviated as the non-aqueous solvent relevant to the present invention), and among them, the one containing at least one cyclic carbonate ester, or the one containing at least one straight chained carbonate ester is preferable and, in particular, the one containing at least one cyclic carbonate ester is more preferable.

As the cyclic carbonate ester, there are included, for example, a cyclic carbonate ester such as ethylene carbonate, propylene carbonate, butylene carbonate, and among them, ethylene carbonate and propylene carbonate are preferable, and particularly ethylene carbonate is more preferable. These may be used alone or by mixing two or more kinds as appropriate.

As the chained carbonate ester, there is included, for example, a chained carbonate having 3 to 9 carbon atoms, specifically there are included dimethyl carbonate, diethyl carbonate, ethylmethyl carbonate, di-n-propyl carbonate, diisopropyl carbonate, n-propyl isopropyl carbonate, di-n-butyl carbonate, di-tert-butyl carbonate, n-butylisobutyl carbonate, n-butyl-tert-butyl carbonate, isobutyl-tert-butyl carbonate, ethylmethyl carbonate, methyl-n-propyl carbonate, n-butylmethyl carbonate, isobutylmethyl carbonate, tert-butylmethyl carbonate, ethyl-n-propyl carbonate, n-butylethyl carbonate, isobutylethyl carbonate, tert-butylethyl carbonate, n-butyl-n-propyl carbonate, isobutyl-n-propyl carbonate, tert-butyl-n-propyl carbonate, n-butyl isopropyl carbonate, isobutylisopropyl carbonate, tert-butylisopropyl carbonate, or the like, and among them, for example, dimethyl carbonate, diethyl carbonate, ethylmethyl carbonate or the like are preferable. These may be used alone or by mixing two or more kinds as appropriate.

As the cyclic carboxylic acid ester, there is included a lactone compound having 3 to 9 carbon atoms, specifically there are included, for example, γ-butyrolactone, γ-valerolactone, γ-caprolactone, ε-caprolactone, or the like, and among them, γ-butyrolactone or γ-valerolactone is preferable. These may be used alone or by mixing two or more kinds as appropriate.

The non-aqueous solvent relevant to the present invention may be used alone or may be used in combination of two or more kinds as appropriate, and above all it is more preferable to use in combination of two or more kinds of the non-aqueous solvents.

As a preferable combination in the case of using the non-aqueous solvent relevant to the present invention in combination of two or more kinds, there is included a combination of, for example, at least one cyclic carbonate ester and "Other non-aqueous solvent".

As "Other non-aqueous solvent" to be combined with at least one cyclic carbonate ester, there are included, for example, a cyclic carbonate ester other than the cyclic carbonate ester, a straight chained carbonate ester, a cyclic carboxylic acid ester, and other non-aqueous solvent or the like.

As "Other non-aqueous solvent", there are included, for example, a straight chained ester having 3 to 9 carbon atoms, a straight chained ether having 3 to 6 carbon atoms, benzonitrile, acetonitrile, tetrahydrofuran, 2-methyltetrahydrofuran, dioxolane, 4-methyldioxolane, N,N-dimethylformamide, dimethylacetamide, dimethylsulfoxide, dioxane, sulfolane, dichloroethane, chlorobenzene, nitrobenzene, or the like.

As the straight chained ester having 3 to 9 carbon atoms, there is included, the one having usually 3 to 9 carbon atoms and preferably, 4 to 5 carbon atoms, and specifically there are included, for example, methyl acetate, ethyl acetate, n-propyl acetate, isopropyl acetate, n-butyl acetate, isobutyl acetate, tert-butyl acetate, methyl propionate, ethyl propionate, n-propyl propionate, isopropyl propionate, n-butyl propionate, isobutyl propionate, tert-butyl propionate, or the like, and among them, for example, ethyl acetate, methyl propionate, ethyl propionate, or the like are preferable.

As the straight chained ether, there is included the one having usually 3 to 6 carbon atoms and preferably 4 to 6 carbon atoms, specifically there are included, for example, dimethoxymethane, dimethoxyethane, diethoxymethane, diethoxyethane, ethoxymethoxymethane, ethoxymethoxyethane, or the like, and among them, dimethoxyethane or diethoxyethane is preferable.

As a preferable combination of the non-aqueous solvent relevant to the present invention, there is included two kinds of non-aqueous mixed solvents, such as, for example, a combination of a cyclic carbonate ester and a straight chained carbonate ester, a combination of a cyclic carbonate ester and a cyclic carboxylic acid ester; three kinds of non-aqueous mixed solvents, such as, for example, a combination of a cyclic carbonate ester, a straight chained carbonate ester and a cyclic ester, or the like.

Among these, the combination of a cyclic carbonate ester and a straight chained carbonate ester is preferable due to enhancing cycle characteristics at low temperature, and a combination of a cyclic carbonate ester and a cyclic carboxylic acid ester is preferable due to enhancing discharge characteristics at low temperature. Among them, the combination of a cyclic carbonate ester and a straight chained carbonate ester is more preferable.

As for each content of a cyclic carbonate ester and a straight chained carbonate ester, which is a preferable combination of the non-aqueous solvent, the cyclic carbonate ester:the straight chained carbonate ester (volume ratio) is usually 10:90 to 40:60, preferably 15:85 to 35:65, and more preferably 20:80 to 30:70.

As for each content of a cyclic carbonate ester and a cyclic carboxylic acid ester, which is a preferable combination of the non-aqueous solvent, the cyclic carbonate ester:the cyclic carboxylic acid ester (volume ratio) is usually 10:90 to 40:60, preferably 20:80 to 35:65, and more preferably 25:85 to 30:70.

Still more, as for each content of a cyclic carbonate ester, a straight chained carbonate ester and a cyclic carboxylic acid ester, which is a preferable combination of the non-aqueous solvent, the cyclic carbonate ester:the straight chained carbonate ester:the cyclic carboxylic acid ester (volume ratio) is usually 10:89:1 to 40:55:5, and preferably 15:84:1 to 35:62:3.

The non-aqueous solvent relevant to the present invention may further includes other non-aqueous solvent, and in that case, it is preferable that content of at least one selected from the cyclic carbonate ester, the straight chained carbonate ester and the cyclic carboxylic acid ester, in total non-aqueous solvents, is usually 80% by volume or higher. In addition, content of the cyclic carbonate ester in the non-aqueous solvent relevant to the present invention, contained in total non-aqueous solvents, is usually 10% by volume or higher, preferably 15% by volume or higher and more preferably 20% by volume or higher, as the lower limit; and usually 60% by volume or lower, preferably 50% by volume or lower and more preferably 40% by volume or lower, as the upper limit; relative to the total non-aqueous solvents.

For example, a preferable example of each content, in the case where the non-aqueous solvent relevant to the present invention (here, a combination of the cyclic carbonate ester and the straight chained carbonate ester is taken as an example) and a straight chained ester, as other non-aqueous solvent, are combined, is shown below. That is, the cyclic carbonate ester:the straight chained carbonate ester:the straight chained ester (volume ratio) is usually 10:89:1 to 40:55:5, and preferably 15:84:1 to 35:62:3.

In addition, in the case of using the one containing at least one cyclic carbonate ester, as the non-aqueous solvent relevant to the present invention, weight ratio of the methylenebissulfonate derivative represented by the general formula [1] relevant to the present invention, relative to the cyclic carbonate ester (ratio of the methylenebissulfonate derivative/the cyclic carbonate ester) is in a range of usually 0.0005 to 0.07, and preferably 0.001 to 0.05. The ratio over this upper limit may promote a side reaction, and thus caution is required.

3. An Electrolyte Salt (A Lithium Salt)

As the electrolyte salt to be used in the non-aqueous electrolytic solution of the present invention, a lithium salt is used (hereafter, it may be abbreviated as the electrolyte salt relevant to the present invention), and it is not especially limited, as long as it is the one usable by being dissolved in the non-aqueous solvent relevant to the present invention, as an electrolyte, and a specific example includes, for example, an inorganic lithium salt, an organic lithium salt, other lithium salt, or the like.

As the inorganic lithium salt, there are included, for example, an inorganic fluoride salt such as $LiPF_6$, $LiAsF_6$, $LiBF_4$, for example, a perhalogenic acid salt such as $LiClO_4$, $LiBrO_4$, $LiIO_4$, and among them, the inorganic fluoride is preferable, and particularly, LiPF6, LiBF4 are more preferable.

As the organic lithium salt, there are included, an organic sulfonic acid salt such as, for example, $LiCF_3SO_3$; a perfluoroalkyl group substituted fluorine-containing organic lithium salt, such as perfluoroalkyl sulfonic acid imide salt such as, for example, $LiN(CF_3SO_2)_2$, $LiN(C_2F_6SO_2)_2$, $LiN(CF_3SO_2)(C_2F_6SO_2)$, $LiN(CF_3SO_2)(C_4F_9SO_2)$; a perfluoroalkylsulfonic acid methide salt such as, for example, $LiC(CF_3SO_2)_3$; a perfluoroalkyl group substituted fluorophosphate salt such as, for example, $LiPF(CF_3)_5$, $LiPF_2(CF_3)_4$, $LiPF_3(CF_3)_3$, $LiPF_2(C_2F_5)_4$, $LiPF_3(C_2F_5)_3$, $LiPF(n-C_3F_7)_5$, $LiPF_2(n-C_3F_7)_4$, $LiPF_3(n-C_3F_7)_3$, $LiPF(iso-C_3F_7)_5$, $LiPF_2(iso-C_3F_7)_4$, $LiPF_3(iso-C_3F_7)_3$; a perfluoroalkyl group substituted fluoroborate such as, for example, $LiB(CF_3)_4$, $LiBF(CF_3)_3$, $LiBF_2(CF_3)_2$, $LiBF_3(CF_3)$, $LiB(C_2F_5)_4$, $LiBF(C_2F_5)_3$, $LiBF_2(C_2F_5)_2$, $LiBF_3(C_2F_5)$, $LiB(n-C_3F_7)_4$, $LiBF(n-C_3F_7)_3$, $LiBF_2(n-C_3F_7)_2$, $LiBF_3(n-C_3F_7)$, $LiB(iso-C_3F_7)_4$, $LiBF(iso-C_3F_7)_3$, $LiBF_2(iso-C_3F_7)_2$, $LiBF_3(iso-C_3F_7)$; and among them, the organic sulfonic acid salt, the perfluoroalkyl sulfonic acid imide salt are preferable, and particularly, $LiCF_3SO_3$, $LiN(CF_3SO_2)_2$, $LiN(C_2F_6SO_2)_2$, $LiN(CF_3SO_2)(C_2F_6SO_2)$, $LiN(CF_3SO_2)(C_4F_9SO_2)$ are more preferable.

As the other lithium salt, there are included, for example, a cyclo alkylene chain-containing lithium salt such as, for example, $(CF_2)_2(SO_2)_2NLi$, $(CF_2)_3(SO_2)_2NLi$; an oxalate complex anion-containing lithium salt such as, for example, bis[oxalate-O,O']lithium borate, difluoro[oxalate-O,O']lithium borate, and among them, $(CF_2)_2(SO_2)_2NLi$, $(CF_2)_3(SO_2)_2NLi$, bis[oxalate-O,O']lithium borate, difluoro[oxalate-O,O']lithium borate are preferable.

Among the electrolyte salts relevant to the present invention, as a particularly preferable electrolyte salt, there are included, for example, $LiPF_6$, $LiBF_4$, $LiN(CF_3SO_2)_2$, $LiN(C_2F_5SO_2)_2$, bis[oxalate-O,O']lithium borate, difluoro[oxalate-O,O']lithium borate, or the like, and most preferable electrolyte salts include $LiPF_6$, $LiBF_4$, $LiN(CF_3SO_2)_2$, bis[oxalate-O,O']lithium borate. These electrolyte salts may be used alone or may be used in combination of two or more kinds as appropriate.

As a suitable combination of these electrolyte salts, there is included a combination of at least one selected from, for example, $LiBF_4$, $LiN(CF_3SO_2)_2$, $LiN(C_2F_5SO_2)_2$, bis[oxalate-O,O']lithium borate, or difluoro[oxalate-O,O']lithium borate, and $LiPF_6$, and among them, a combination of $LiPF_6$ and $LiBF_4$, a combination of $LiPF_6$ and $LiN(SO_2CF_3)_2$, a combination of $LiPF_6$ and bis[oxalate-O,O']lithium borate, or the like is more preferable.

In the use case by mixing $LiPF_6$ and at least one selected from $LiBF_4$, $LiN(CF_3SO_2)_2$, $LiN(C_2F_5SO_2)_2$, bis[oxalate-O,O']lithium borate, or difluoro[oxalate-O,O']lithium borate, as the electrolyte salts, mixing ratio (molar ratio) is in a range of usually 70:30 to 99:1, and preferably 80:20 to 98:2. Use of electrolyte salts combined in such the ratio provides further enhancement effect of various battery characteristics. On the other hand, the case where the ratio of $LiPF_6$ is lower than 70:30 may decrease cycle characteristics at low temperature.

In addition, in the use case by mixing two or more kinds of the electrolytes, molar concentration of total lithium salts of a solute in the non-aqueous electrolytic solution is usually 0.5 to 3 mol/L, preferably 0.7 to 2.5 mol/L, and more preferably 0.7 to 1.5 mol/L. Too low concentration of the total lithium salts may bring about the case where ionic conductivity of the non-aqueous electrolytic solution becomes insufficient. On the other hand, too high concentration of the lithium salts may decrease ionic conductivity due to increase in viscosity, as well as bring about easy deposition at low temperature.

4. A Negative Electrode Film Forming Agent

The non-aqueous electrolytic solution of the present invention may further contain a negative electrode film forming agent. The negative electrode film forming agent forms a coating on a negative electrode surface, by making this contained in the non-aqueous electrolytic solution, and thus suppresses, for example, a side reaction such as decomposition of the non-aqueous solvent in the electrolytic solution, and enables to attain decrease in initial irreversible capacity.

As the negative electrode film forming agent, there is included at least one selected from the group composed of, for example, a vinylene carbonate derivative represented by the following general formula [2], a cyclic carbonate ester represented by the following general formula [3], a compound represented by the following general formula [4], a compound represented by the following general formula [4'] and a compound represented by the following general formula [5] (hereafter it may be abbreviated as the negative electrode film forming agent relevant to the present invention). These may be used alone or may be used in combination of two or more kinds as appropriate:

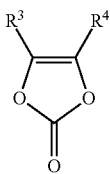

[2]

(wherein $R^3$ and $R^4$ each independently represent a hydrogen atom, a halogen atom, an alkyl group having 1 to 12 carbon atoms or a haloalkyl group having 1 to 12 carbon atoms);

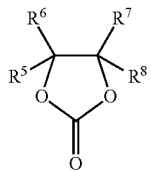

[3]

(wherein $R^5$ to $R^8$ each independently represent a hydrogen atom, a halogen atom, an alkyl group having 1 to 12 carbon atoms, a haloalkyl group having 1 to 12 carbon atoms, or an alkenyl group having 2 to 12 carbon atoms; provided that at least one of $R^5$ to $R^8$ is the haloalkyl group);

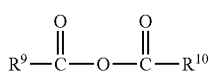

[4]

(wherein $R^9$ and $R^{10}$ each independently represent a hydrogen atom, a halogen atom, an alkyl group having 1 to 12 carbon atoms, a haloalkyl group having 1 to 12 carbon atoms, or an alkenyl group having 2 to 12 carbon atoms, and either one of $R^9$ and $R^{10}$ represents a halogen atom, an alkyl group having 1 to 12 carbon atoms, or a haloalkyl group having 1 to 12 carbon atoms. In addition, $R^9$ and $R^{10}$ together with a carbon atom, to which they bind, may form a cyclic aliphatic acid anhydride);

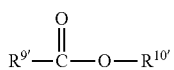

[4']

(wherein $R^{9'}$ represents a halogen atom, an alkyl group having 1 to 12 carbon atoms, a haloalkyl group having 1 to 12 carbon atoms, or an alkenyl group having 2 to 12 carbon atoms, and $R^{10'}$ represents an alkyl group having 1 to 12 carbon atoms, or a haloalkyl group having 1 to 12 carbon atoms or an alkenyl group having 2 to 12 carbon atoms, and either one of $R^{9'}$ and $R^{10'}$ represents a halogen atom, an alkyl group having 1 to 12 carbon atoms, or a haloalkyl group having 1 to 12 carbon atoms);

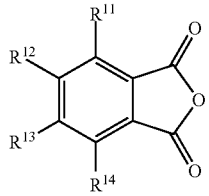

[5]

(wherein $R^{11}$ to $R^{14}$ each independently represent a hydrogen atom, a halogen atom, an alkyl group having 1 to 12 carbon atoms, a haloalkyl group having 1 to 12 carbon atoms, or an alkenyl group having 2 to 12 carbon atoms, at least one of $R^{11}$ to $R^{14}$ represents a halogen atom, an alkyl group having 1 to 12 carbon atoms, or a haloalkyl group having 1 to 12 carbon atoms).

As the halogen atom represented by $R^3$ to $R^{14}$ in the general formulae [2] to [5], there are included, for example, a fluorine atom, a chlorine atom, a bromine atom, an iodine atom, or the like.

The alkyl group having 1 to 12 carbon atoms, represented by $R^3$ to $R^{14}$, may be any of a straight chained, a branched or a cyclic one, includes the one having carbon atoms of usually 1 to 12, preferably 1 to 6 and more preferably 1 to 3, and specifically includes, for example, a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a 1-methylpentyl group, a n-hexyl group, an isohexyl group, a sec-hexyl group, a tert-hexyl group, a neohexyl group, a n-heptyl group, an isoheptyl group, a sec-heptyl group, a tert-heptyl group, a neoheptyl group, a n-octyl group, an isooctyl group, a sec-octyl group, a tert-octyl group, a neooctyl group, a n-nonyl group, an isononyl group, a sec-nonyl group, a tert-nonyl group, a neononyl group, a n-decyl group, an isodecyl group, a sec-decyl group, a tert-decyl group, a neodecyl group, a n-undecyl group, an isoundecyl group, a sec-undecyl group, a tert-undecyl group, a neoundecyl group, a n-dodecyl group, an isododecyl group, a sec-dodecyl group, a tert-dodecyl group, a neododecyl group, a cyclopropyl group, a cyclobutyl group, a cyclopentyl group, a cyclohexyl group, a cycloheptyl group, a cyclooctyl group, or the like.

As the haloalkyl group having 1 to 12 carbon atoms, represented by $R^3$ to $R^{14}$, there is included the one where a part of or all of hydrogen atoms of an alkyl group, having carbon atoms of usually 1 to 12, preferably 1 to 6 and more preferably 1 to 3, is substituted with a halogen atom (for example, a fluorine atom, a chlorine atom, a bromine atom, an iodine atom or the like), and specifically there are included, for example, a fluoromethyl group, a chloromethyl group, a bromomethyl group, an iodomethyl group, a trifluoromethyl group, a trichloromethyl group, a tribromomethyl group, a 2-fluoroethyl group, a 2-chloroethyl group, a 2-bromoethyl group, a pentafluoroethyl group, a pentachloroethyl group, a pentabromoethyl group, a pentaiodoethyl group, a 3-fluoropropyl group, a 3-chloropropyl group, a 3-bromopropyl group, a trifluoropropyl group, a trichloropropyl group, a tribromopropylgroup, a di(trifluoromethyl)methyl group, a di(trichloromethyl)methyl group, a di(tribromomethyl)methyl group, a heptafluoropropyl group, a heptachloropropyl group, a 4-fluorobutyl group, a 4-chlorobutyl group, a 4-bromobutyl group, a nonafluorobutyl group, a nonachlorobutyl group, a nonabromobutyl group, a 5-fluoropentyl group, a 5-chloropentyl group, a 5-bromopentyl group, a 2,2,3,3,4,4,5,5-octafluoropentyl group (—$CH_2(CF_2)_4H$), a 2,2,3,3,4,4,5,5-octachloropentyl group (—$CH_2(CCl_2)_4H$), a 2,2,3,3,4,4,5,5-octabromopentyl group (—$CH_2(CBr_2)_4H$), a perfluoropentyl group, a perchloropentyl group, a perbromopentyl group, a 6-fluorohexyl group, a 6-chlorohexyl group, a 6-bromohexyl group, a perfluorohexyl group, a perchlorohexyl group, a perbromohexyl group, a perfluoroheptyl group, a perchloroheptyl group, a perbromoheptyl group, a perfluorooctyl group, a perchlorooctyl group, a perbromooctyl group, a perfluorononyl group, a perchlorononyl group, a perbromononyl group, a 3,3,4,4,5,5,6,6,7,7,8,8,9,9,-10,10,10-heptadecafluorodecyl group (—$(CH_2)_2(CF_2)_7CF_3$), a 3,3,4,4,5,5,6,6,7,7,-8,8,9,9,10,10,10-heptadecachlorodecyl group (—$(CH_2)_2(CCl_2)_7CCl_3$), a 3,3,4,4,5,5,-6,6,7,7,8,8,9,9,10,10,10-heptadecabromodecyl group (—$(CH_2)_2(CBr_2)_7CBr_3$), a per-fluorodecyl group, perchlorodecyl group, a perbromodecyl group, a perfluoro-undecyl group, a perchloroundecyl group, a perbromoundecyl group, a per-fluoro-dodecyl group, a perchlorododecyl group, a perbromododecyl group or the like.

In the general formulae [3] to [5], the alkenyl group having 2 to 12 carbon atoms, represented by $R^5$ to $R^{14}$, may be any of a straight chained, a branched or a cyclic one, includes the one having carbon atoms of usually 2 to 12 and preferably 2 to 6, and specifically includes, for example, a vinyl group, an allyl group, a 1-propenyl group, an isopropenyl group, a 1-butenyl group, a 2-butenyl group, a 3-butenyl group, a 2-methylallyl group, a 1-pentenyl group, a 2-pentenyl group, a 3-pentenyl group, a 4-pentenyl group, a 2-methyl-2-butenyl group, a 1-hexenyl group, a 2-hexenyl group, a 3-hexenyl group, a 5-hexenyl group, a 2-methyl-2-pentenyl group, a 1-heptenyl group, a 2-heptenyl group, a 3-heptenyl group, a 4-heptenyl group, a 5-heptenyl group, a 6-heptenyl group, a 1-dodecenyl group, a 2-dodecenyl group, a 3-dodecenyl group, a 4-dodecenyl group, a 5-dodecenyl group, a 6-dodecenyl group, a 7-dodecenyl group, a 8-dodecenyl group, a 9-dodecenyl group, a 10-dodecenyl group, a 11-dodecenyl group, a 1-cyclobutenyl group, a 1-cyclopentenyl group, a 1-cyclohexenyl group or the like.

In the general formula [4], a cyclic aliphatic acid anhydride, which is formed by $R^9$ and $R^{10}$ together with a carbon atom, to which they bind, may be the one where all of the hydrogen atoms on the acid anhydride is substituted with a fluorine atom, includes a cyclic aliphatic acid anhydride, having carbon atoms of usually 3 to 8, and preferably 3 to 5, not substituted with a fluorine atom, a acid anhydride, having carbon atoms of usually 3 to 8, and preferably 3 to 5, substituted with a fluorine atom or the like. The cyclic aliphatic acid anhydride, not substituted with a fluorine atom, includes specifically, for example, succinic anhydride, glutaric anhydride, maleic anhydride, citraconic anhydride, glutaconic anhydride, itaconic anhydride, or the like, and among them, succinic anhydride, glutaric anhydride are preferable. The cyclic aliphatic acid anhydride, substituted with a fluorine atom, includes, for example, difluoromaleic anhydride, tetrafluorosuccinic anhydride, tetrafluorocitraconic anhydride, tetrafluoroglutaconic anhydride, tetrafluoroitaconic anhydride, hexafluoroglutaric anhydride, or the like, and among them, tetrafluorosuccinic anhydride, hexafluoroglutaric anhydride are preferable.

As a specific example of a vinylene carbonate derivative represented by the general formula [2], included as the negative electrode film forming agent, there are included, for example, vinylene carbonate, fluorovinylene carbonate, methylvinylene carbonate, fluoromethylvinylene carbonate, ethylvinylene carbonate, propylvinylene carbonate, butylvinylene carbonate, dipropylvinylene carbonate, 4,5-dimethylvinylene carbonate, 4,5-diethylvinylene carbonate, trifluoromethylvinylene carbonate, or the like, and among them, vinylene carbonate is preferable.

As a specific example of cyclic carbonate ester represented by the general formula [3], there are included, for example, fluoroethylene carbonate, difluoroethylene carbonate, fluoropropylene carbonate, difluoropropylene carbonate, monofluoromethylethylene carbonate, difluoromethylethylene carbonate, trifluoromethylethylene carbonate, chloroethylene carbonate, dichloroethylene carbonate, chloropropylene carbonate, dichloropropylene carbonate, or the like, and among them, fluoroethylene carbonate, difluoroethylene carbonate are preferable.

As a specific example of the compound represented by the general formula [4], a fluorinated carboxylic anhydride such as, for example, trifluoroacetic anhydride, pentafluoropropionic anhydride, heptafluoro-n-butyric anhydride; a cyclic aliphatic anhydride, substituted with a fluorine atom, such as, for example, difluoromaleic anhydride, tetrafluorosuccinic anhydride, tetrafluorocitraconic anhydride, tetrafluoroglutaconic anhydride, tetrafluoroitaconic anhydride, hexafluoroglutaric anhydride; a cyclic aliphatic anhydride such as, for example, succinic anhydride, glutaric anhydride, maleic anhydride, citraconic anhydride, glutaconic anhydride, itaconic anhydride are preferable.

As a specific example of the compound represented by the general formula [4'], a fluorinated carboxylic acid methyl ester such as, for example, methyl trifluoroacetate, methyl pentafluoropropionate, methyl heptafluoro-n-butyrate, methyl nonafluorovalerate; a fluorinated carboxylic acid ethyl ester such as, for example, ethyl trifluoroacetate, ethyl pentafluoropropionate, ethyl heptafluoro-n-butyrate, ethyl nonafluorovalerate are preferable.

As a specific example of the compound represented by the general formula [5], for example, phthalic anhydride, 3-fluoro phthalic anhydride, 4-fluoro phthalic anhydride, tetrafluoro phthalic anhydride or the like are preferable.

As the negative electrode film forming agent, at least one selected from the compounds represented by the above general formulae [2] to [5] may be used, and two or more kinds may be used in combination as appropriate. As the negative electrode film forming agent, as preferable combination, in the case where two or more kinds selected from the above general formulae [2] to [5] are used, there are included, for example, a combination of the vinylene carbonate derivative represented by the general formula [2] and the compound represented by the above general formula [4]; a combination of the cyclic carbonate ester represented by the general formula [3] and the compound represented by the general formula [4]; a combination of the vinylene carbonate derivative represented by the general formula [2], the cyclic carbonate ester represented by the general formula [3] and the compound represented by the general formula [4]; a combination of the vinylene carbonate derivative represented by the general formula [2], the cyclic carbonate ester represented by the general formula [3] and the compound represented by the general formula [5]; or the like.

As preferable specific examples of a combination of the vinylene carbonate derivative represented by the general formula [2], and the compound represented by the general formula [4], there are included, for example, a combination of vinylene carbonate and trifluoroacetic anhyride, a combination of vinylene carbonate and hexafluoroglutaric anhydride or the like.

As preferable specific examples of a combination of the cyclic carbonate ester represented by the general formula [3], and the compound represented by the general formula [4], there are included, for example, a combination of fluoroethylene carbonate and tetrafluorosuccinic anhydride, a combination of difluoroethylene carbonate and hexafluoroglutaric anhydride or the like.

As preferable specific examples of a combination of the vinylene carbonate derivative represented by the general formula [2], the cyclic carbonate ester represented by the general formula [3], and the compound represented by the general formula [4], there are included, for example, a combination of vinylene carbonate, fluoroethylene carbonate and tetrafluorosuccinic anhydride or the like.

As preferable specific examples of a combination of the vinylene carbonate derivative represented by the general formula [2], the cyclic carbonate ester represented by the general formula [3], and the compound represented by the general formula [5], there are included, for example, a combination of vinylene carbonate, fluoroethylene carbonate and tetrafluoro phthalic anhydride or the like.

Content of the negative electrode film forming agent to be dissolved into the non-aqueous electrolytic solution of the present invention is, in any of the use cases alone or in a mixture, in a range of 0.1 to 15% by weight, relative to the non-aqueous electrolytic solution.

In addition, in the case of using the vinylene carbonate derivative represented by the general formula [2] as the negative electrode film forming agent, content of the vinylene carbonate is in a range of usually 0.1 to 5% by weight, and preferably 0.1 to 3% by weight, relative to the non-aqueous electrolytic solution of the present invention.

In the case of using the cyclic carbonate ester represented by the general formula [3] as the negative electrode film forming agent, content of the cyclic carbonate ester is in a range of usually 0.1 to 15% by weight, and preferably 0.5 to 15% by weight, relative to the non-aqueous electrolytic solution of the present invention.

In the case of using the compound represented by the general formula [4] or the compound represented by the general formula [5], content of the compound is in a range of usually 0.1 to 2% by weight, and preferably 0.1 to 1% by weight, relative to the non-aqueous electrolytic solution of the present invention.

5. A Blister Inhibitor

The non-aqueous electrolytic solution of the present invention may further contain a blister inhibitor. The blister inhibitor, by being contained in the non-aqueous electrolytic solution, enables to suppress gas generation in storage at high temperature of 60° C. or higher in a full charged state of, for example, 4.2 to 4.3 V, as well as enables to improve storage characteristics at high temperature.

As the blister inhibitor, there is included, for example, at least one selected from the group consisting of γ-butyrolactone, γ-valerolactone, γ-caprolactone, ε-caprolactone, and a cyclic phosphazene derivative represented by the following general formula [6] (hereafter, it may be abbreviated as the blister inhibitor relevant to the present invention). It may be used alone or may be used two or more kinds in combination, as appropriate.

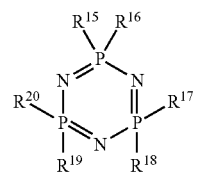

[6]

(wherein $R^{15}$ to $R^{20}$ each independently represent a hydrogen atom, a halogen atom, an alkyl group having 1 to 10 carbon atoms, a haloalkyl group having 1 to 10 carbon atoms, an alkoxy group having 1 to 10 carbon atoms, a haloalkoxy group having 1 to 10 carbon atoms, or an aryl group having 6 to 12 carbon atoms, which may contain a halogen atom).

As the halogen atom represented by $R^{15}$ to $R^{20}$ in the general formula [6], there are included, for example, a fluorine atom, a chlorine atom, a bromine atom, an iodine atom, or the like, and among them, a fluorine atom is preferable.

The alkyl group having 1 to 10 carbon atoms, represented by $R^{15}$ to $R^{20}$, may be any of a straight chained, a branched or a cyclic one, includes the one having carbon atoms of usually 1 to 10, preferably 1 to 6 and more preferably 1 to 3, and specifically includes, for example, a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a 1-methylpentyl group, a n-hexyl group, an isohexyl group, a sec-hexyl group, a tert-hexyl group, a neohexyl group, a n-heptyl group, an isoheptyl group, a sec-heptyl group, a tert-heptyl group, a neoheptyl group, a n-octyl group, an isooctyl group, a sec-octyl group, a tert-octyl group, a neooctyl group, a n-nonyl group, an isononyl group, a sec-nonyl group, a tert-nonyl group, a neononyl group, a n-decyl group, an isodecyl group, a sec-decyl group, a tert-decyl group, a neodecyl group, a cyclopropyl group, a cyclobutyl group, a cyclopentyl group, a cyclohexyl group, a cycloheptyl group, a cyclooctyl group, or the like.

As the haloalkyl group having 1 to 10 carbon atoms, represented by $R^{15}$ to $R^{20}$, there is included the one where a part of or all of hydrogen atoms of an alkyl group, having carbon atoms of usually 1 to 10, preferably 1 to 6 and more preferably 1 to 4, is substituted with a halogen atom (for example, a fluorine atom, a chlorine atom, a bromine atom, an iodine atom or the like), and specifically there are included, for example, a fluoromethyl group, a chloromethyl group, a bromomethyl group, an iodomethyl group, a trifluoromethyl group, a trichloromethyl group, a tribromomethyl group, a 2-fluoroethyl group, a 2-chloroethyl group, a 2-bromoethyl group, a pentafluoroethyl group, a pentachloroethyl group, a pentabromoethyl group, a pentaiodoethyl group, a 3-fluoropropyl group, a 3-chloropropyl group, a 3-bromopropyl group, a trifluoropropyl group, a trichloropropyl group, a tribromo-propylgroup, a di(trifluoromethyl)methyl group, a di(trichloromethyl)methyl group, a di(tribromomethyl)methyl group, a heptafluoropropyl group, a heptachloropropyl group, a 4-fluorobutyl group, a 4-chlorobutyl group, a 4-bromobutyl group, a nonafluorobutyl group, a nonachlorobutyl group, a nonabromobutyl group, a 5-fluoropentyl group, a 5-chloropentyl group, a 5-bromopentyl group, a 2,2,3,3,-4,4,5,5-octafluoropentyl group (—CH$_2$(CF$_2$)$_4$H), a 2,2,3,3,4,4,5,5-octachloropentyl group (—CH$_2$(CCl$_2$)$_4$H), a 2,2,3,3,4,4,5,5-octabromopentyl group (—CH$_2$(CBr$_2$)$_4$H), a perfluoropentyl group, a perchloropentyl group, a perbromopentyl group, a 6-fluorohexyl group, a 6-chlorohexyl group, a 6-bromohexyl group, a perfluorohexyl group, a perchlorohexyl group, a perbromohexyl group, a perfluoroheptyl group, a perchloroheptyl group, a perbromoheptyl group, a perfluorooctyl group, a perchlorooctyl group, a perbromooctyl group, a perfluorononyl group, a perchlorononyl group, a perbromononyl group, a 3,3,4,4,5,5,6,6,7,7,8,8,9,9,10,10,10-heptadecafluorodecyl group (—$CH_2$)$_2$($CF_2$)$_7$$CF_3$), a 3,3,4,4,5,5,6,6,7,7,8,8,9,9,10,10,10-heptadecachlorodecyl group (—($CH_2$)$_2$($CCl_2$)$_7$$CCl_3$), a 3,3,4,4,5,5,6,6,7,7,8,8,9,9,10,10,10-heptadeca-bromodecyl group (—($CH_2$)$_2$($CBr_2$)$_7$$CBr_3$), a perfluorodecyl group, a perchlorodecyl group, a perbromodecyl group, or the like.

The alkoxy group having 1 to 10 carbon atoms, represented by $R^{15}$ to $R^{20}$, may be any of a straight chained, a branched or a cyclic one, includes the one having carbon atoms of usually 1 to 10, preferably 1 to 6 and more preferably 1 to 3, and specifically includes, for example, a methoxy group, an ethoxy group, a n-propoxy group, an isopropoxy group, a n-butoxy group, an isobutoxy group, a sec-butoxy group, a tert-butoxy group, a n-pentyloxy group, an isopentyloxy group, a sec-pentyloxy group, a tert-pentyloxy group, a neopentyloxy group, a n-hexyloxy group, an isohexyloxy group, a sec-hexyloxy group, a tert-hexyloxy group, a neohexyloxy group, a n-heptyloxy group, an isoheptyloxy group, a sec-heptyloxy group, a tert-heptyloxy group, a neoheptyloxy group, a n-octyloxy group, an isooctyloxy group, a sec-octyloxy group, a tert-octyloxy group, a neooctyloxy group, a n-nonyloxy group, an isononyloxy group, a sec-nonyloxy group, a tert-nonyloxy group, a neononyloxy group, a n-decyloxy group, an isodecyloxy group, a sec-decyloxy group, a tert-decyloxy group, a neodecyloxy group, a cyclopropoxy group, a cyclobutoxy group, a cyclopentyloxy group, a cyclohexyloxy group, a cycloheptyloxy group, a cyclooctyloxy group, a cyclononyloxy group, a cyclodecyloxy group, or the like.

As the haloalkoxy group having 1 to 10 carbon atoms, represented by $R^{15}$ to $R^{20}$, there is included the one where a part of or all of hydrogen atoms of an alkoxy group, having carbon atoms of usually 1 to 10, preferably 1 to 6 and more preferably 1 to 3, is substituted with a halogen atom (for example, a fluorine atom, a chlorine atom, a bromine atom, an iodine atom or the like), and specifically there are included, for example, a fluoromethoxy group, a chloromethoxy group, a bromomethoxy group, an iodomethoxy group, a trifluoromethoxy group, a trichloromethoxy group, a tribromomethoxy group, a 2-fluoroethoxy group, a 2-chloroethoxy group, a 2-bromoethoxy group, a pentafluoroethoxy group, a pentachloroethoxy group, a pentabromoethoxy group, a pentaiodoethoxy group, a 3-fluoropropoxy group, a 3-chloropropoxy group, a 3-bromopropoxy group, a trifluoropropoxy group, a trichloropropoxy group, a tribromopropoxy group, a di(trifluoromethyl)methoxy group, a di(trichloromethyl)methoxy group, a di(tribromomethyl)methoxy group, a heptafluoropropoxy group, a heptachloropropoxy group, a 4-fluorobutoxy group, a 4-chlorobutoxy group, a 4-bromobutoxy group, a nonafluorobutoxy group, a nonachlorobutoxy group, a nonabromobutoxy group, a 5-fluoropentyloxy group, a 5-chloropentyloxy group, a 5-bromopentyloxy group, a 2,2,3,3,4,4,5,5-octafluoropentyloxy group (—$CH_2$($CF_2$)$_4$H), a 2,2,3,3,4,4,5,5-octachloropentyloxy group (—$CH_2$($CCl_2$)$_4$H), a 2,2,3,3,4,4,5,5-octabromopentyloxy group (—$CH_2$($CBr_2$)$_4$H), a perfluoropentyloxy group, a perchloropentyloxy group, a perbromopentyloxy group, a 6-fluoro-hexyloxy group, a 6-chlorohexyloxy group, a 6-bromohexyloxy group, a perfluorohexyloxy group, a perchlorohexyloxy group, a perbromohexyloxy group, a perfluoroheptyloxy group, a perchloroheptyloxy group, a perbromoheptyloxy group, a perfluorooctyloxy group, a perchlorooctyloxy group, a perbromooctyloxy group, a perfluorononyloxy group, a perchlorononyloxy group, a perbromononyloxy group, a 3,3,4,4,5,5,6,6,7,7,8,8,9,9,10,10,10-heptadecafluorodecyloxy group (—($CH_2$)$_2$($CF_2$)$_7$$CF_3$), a 3,3,4,4,5,5,6,6,-7,7,8,8,9,9,10,10,10-heptadecachlorodecyloxy group (—($CH_2$)$_2$($CCl_2$)$_7$$CCl_3$), a 3,3,4,4,5,5,6,6,7,7,8,8,9,9,10,10,10-heptadecabromodecyloxy group (—($CH_2$)$_2$($CBr_2$)$_7$$CBr_3$), a perfluorodecyloxy group, a perchlorodecyloxy group, a perbromodecyloxy group, or the like.

As an aryl group of the aryl group having 6 to 12 carbon atoms, which may contain a halogen atom, represented by $R^{15}$ to $R^{20}$, the one having 6 to 10 carbon atoms is preferable, there are included, for example, a phenyl group, a naphthyl group or the like.

As the aryl group having 6 to 12 carbon atoms, containing a halogen atom, there is included the one where a part of or all of hydrogen atoms in the aryl group is substituted with a halogen atom (for example, a fluorine atom, a chlorine atom, a bromine atom, an iodine atom or the like), and specifically there are included, for example, a fluorophenyl group, a difluorophenyl group, a trifluorophenyl group, a perfluorophenyl group, a chlorophenyl group, a dichlorophenyl group, a trichlorophenyl group, a perchlorophenyl group, a bromophenyl group, a dibromophenyl group, a tribromophenyl group, a perbromophenyl group, an iodophenyl group, a diiodophenyl group, a triiodophenyl group, a periodo-phenylgroup, a fluoronaphthyl group, a perfluoronaphthyl group, a chloronaphthyl group, a perchloronaphthyl group, a bromonaphthyl group, a perbromonaphthyl group, an iodonaphthyl group, a periodonaphthyl group or the like.

As a specific example of the cyclic phosphazene derivative represented by the general formula [6], included as the blister inhibitor, there are included an alkoxy substituted cyclophosphazenes such as, for example, hexamethoxytricyclophosphazene, hexaethoxytricyclophosphazene, hexapropoxytricyclophosphazene; a halogen substituted cyclophosphazenes such as, for example, hexachlorocyclotriphosphazene, hexafluorocyclotriphosphazene, hexabromocyclotriphosphazene; an alkoxy and halogen substituted cyclophosphazenes such as, for example, ethoxypentafluorocyclotriphosphazene, diethoxytetrafluorocyclotriphosphazene, phenoxypentafluorocyclotriphosphazene, methoxypentafluorocyclotriphosphazene, propoxypentafluorocyclotriphosphazene, butoxypentafluorocyclotriphosphazene, and among them, the halogen substituted cyclophosphazenes, the alkoxy and halogen substituted cyclophosphazenes are preferable, and particularly, for example, hexafluorocyclotriphosphazene, ethoxypentafluorocyclotriphosphazene, phenoxypentafluorocyclotriphosphazene are more preferable.

Among the blister inhibitor relevant to the present invention, γ-butyrolactone, γ-valerolactone, hexafluorocyclotriphosphazene, ethoxypentafluorocyclo-triphosphazene, phenoxypentafluorocyclotriphosphazene are more preferable.

As the blister inhibitor, at least one from γ-butyrolactone, γ-valerolactone, γ-caprolactone, ε-caprolactone, and the cyclic phosphazene derivative represented by the above general formula [6] may be used, and in using two or more kinds, as a preferable combination thereof, there are included, for example, a combination of γ-butyrolactone and hexafluorocyclotriphosphazene; a combination of γ-butyrolactone, γ-valerolactone and hexafluorocyclo-triphosphazene; a combination of γ-butyrolactone, hexafluorocyclotriphosphazene and ethoxypentafluorocyclotriphosphazene; a combination of γ-butyrolactone, ethoxypentafluorocyclotriphosphazene and phenoxypentafluorocyclo-triphosphazene; or the like, and among them the combination of γ-butyrolactone and hexafluorocyclotriphosphazene; the combination of γ-butyrolactone, hexafluorocyclotriphosphazene and ethoxypentafluorocyclotriphosphazene; the combination of γ-butyrolactone, ethoxypentafluorocyclotriphosphazene and phenoxypentafluorocyclotriphosphazene are more preferable.

Concentration of the blister inhibitor to be dissolved in the non-aqueous electrolytic solution of the present invention is, in any use case thereof alone or in a mixture, in a range of usually 0.1 to 3% by weight, and preferably 0.2 to 2% by weight, relative to the non-aqueous electrolytic solution. The concentration below 0.1% by weight may raise a case bringing about a problem that improvement effect of suppression of gas generation in storage at high temperature of 60° C. or higher, for example, in a full charged state of 4.2 to 4.3 V, improvement effect of storage characteristics at high temperature or the like are not sufficient and, in particular, improvement effect of suppression of gas generation is not sufficient.

The case where the negative electrode film forming agent and the blister inhibitor relevant to the present invention are contained in the non-aqueous electrolytic solution of the present invention includes, for example, the case where only the negative electrode film forming agent is contained alone; the case where only the blister inhibitor is contained alone; and the case where the negative electrode film forming agent and the blister inhibitor are contained together; and among them, the case where the negative electrode film forming agent and the blister inhibitor are contained together is preferable.

6. The Non-aqueous Electrolytic Solution of the Present Invention

As a preferable combination of the non-aqueous electrolytic solution of the present invention, there are included, for example, the following (I) to (IV).

[A Non-aqueous Electrolytic Solution (I)]

The non-aqueous electrolytic solution comprising (1) the methylenebis-sulfonate derivative relevant to the present invention, (2) the non-aqueous solvent, and (3) the lithium salt (the electrolyte salt).

[A Non-aqueous Electrolytic Solution (II)]

The non-aqueous electrolytic solution comprising (1) the methylenebis-sulfonate derivative relevant to the present invention, (2) the non-aqueous solvent comprising at least the cyclic carbonate ester, (3) the lithium salt (the electrolyte salt) and (4) the negative electrode film forming agent.

[A Non-aqueous Electrolytic Solution (III)]

The non-aqueous electrolytic solution comprising (1) the methylenebis-sulfonate derivative relevant to the present invention, (2) the non-aqueous solvent comprising at least the cyclic carbonate ester, (3) the lithium salt (the electrolyte salt) and (4) the blister inhibitor.

[A Non-aqueous Electrolytic Solution (IV)]

The non-aqueous electrolytic solution comprising (1) the methylenebis-sulfonate derivative relevant to the present invention, (2) the non-aqueous solvent comprising at least the cyclic carbonate ester, (3) the lithium salt (the electrolyte salt), (4) the negative electrode film forming agent and (5) the blister inhibitor.

The non-aqueous electrolytic solution (I) of the present invention exhibits improvement effect of charge-discharge characteristics or the like, in particular, improvement effect of cycle characteristics, or improvement effect of storage characteristics at high temperature. The non-aqueous electrolytic solution (II) of the present invention exhibits improvement effect of charge-discharge characteristics or the like, in particular, decreasing initial irreversible capacity, or improvement effect of cycle characteristics, or improvement effect of storage characteristics at high temperature. The non-aqueous electrolytic solution (III) of the present invention exhibits improvement effect of cycle characteristics, or improvement of storage characteristics at high temperature, as well as effect of suppression of gas generation in storage at high temperature of 60° C. or higher, in a full charged state of 4.2 to 4.3 V and suppression of battery blister. The non-aqueous electrolytic solution (IV) of the present invention exhibits improvement effect of charge-discharge characteristics or the like, in particular, decreasing initial irreversible capacity or improvement effect of cycle characteristics, improvement of storage characteristics at high temperature, as well as effect of suppression of gas generation in storage at high temperature of 60° C. or higher, in a full charged state of 4.2 to 4.3 V and suppression of battery blister.

The non-aqueous electrolytic solution of the present invention may be added with those usually added into a usual electrolytic solution as appropriate, as long as they do not give adverse influence on effect of the present invention, aiming at, for example, enhancing over-charging characteristics, enhancing wettability of the non-aqueous electrolytic solution or the like.

As the one which may be added in the non-aqueous electrolytic solution of the present invention, there are included, for example, a sulfur-containing compound such as, for example, diphenyldisulfide, dimethylsulfone, divinylsulfone, dimethylsulfite, ethylenesulfite, methyl methanesulfonate, 2-propynyl methane-sulfonate, 2-sulfobenzoic anhydride; an aromatic compound or a fluorine substituted compound thereof such as, for example, tert-butylbenzene, tert-amylbenzene, biphenyl, o-terphenyl, 4-fluorobiphenyl, fluorobenzene, 2,4-difluorobenzene, cyclohexylbenzene, diphenylether, 2,4-difluoroanisole, trifluoromethylbenzene, or the like. These compounds may be used alone or may be used by combining two or more kinds as appropriate.

In addition, in order to promote impregnation into an electrode or a separator, the non-aqueous electrolytic solution of the present invention may be added with a surfactant such as phosphate ester (for example, triethyl phosphate, tributyl phosphate, trioctyl phosphate, or the like); for example, a fluoroalkyl group-containing fluorine type nonionic surfactant (for example, Ftergent, FT-250, FT-251, FT-222F (manufactured by Neos Company Ltd.) or the like).

7. Synthesis of the Methylenebissulfonate Derivative

The methylenebissulfonate derivative represented by the general formula [1] of the present invention may be synthesized by the following method, however, it should not be limited to the present method.

The methylenebissulfonate derivative represented by the general formula [1] may be synthesized in accordance with a usual method (for example, refer to WO 2008/032463 A1 or the like) as appropriate, and may be produced specifically as follows.

As a production method for the methylenebissulfonate derivative represented by the general formula [1], explanation will be given below using a compound where $R^1$ and $R^2$ are the same in the general formula [1], that is, the methylenebissulfonate derivative represented by the general formula [1'], as one example.

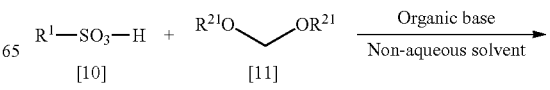

-continued

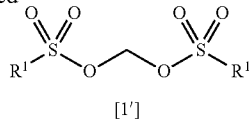

[1']

{wherein two $R^{21}$s each independently represent a sulfonyl group represented by the general formula [12];

$$-SO_2-R^{22} \quad [12]$$

(wherein $R^{22}$ represents a halogen atom, a haloalkyl group, an alkoxy group, or an alkyl group or an aryl group which may have a substitution group), or an acyl group represented by the general formula [13];

$$-COR^{23} \quad [13]$$

(wherein $R^{23}$ represents an alkyl group or an aryl group which may have a substitution group), two $R^1$s are the same as described above}.

As a halogen atom represented by $R^{22}$ in the general formula [12], there are included, for example, a fluorine atom, a chlorine atom, a bromine atom, an iodine atom, or the like.

As a haloalkyl group represented by $R^{22}$ may be any of a straight chained, a branched or a cyclic one, there is included the one where a part of or all of hydrogen atoms of an alkyl group, having carbon atoms of usually 1 to 12, preferably 1 to 6 and more preferably 1 to 3, is substituted with a halogen atom (for example, a fluorine atom, a chlorine atom, a bromine atom, an iodine atom or the like), and specifically there are included, for example, a fluoromethyl group, a chloromethyl group, a bromomethyl group, an iodomethyl group, a trifluoromethyl group, a trichloromethyl group, a tribromomethyl group, a 2-fluoroethyl group, a 2-chloroethyl group, a 2-bromoethyl group, pentafluoroethyl group, a pentachloroethyl group, a pentabromoethyl group, a pentaiodoethyl group, a 3-fluoropropyl group, a 3-chloropropyl group, a 3-bromopropyl group, a trifluoropropyl group, a trichloropropyl group, a tribromopropyl group, a di(trifluoromethyl)methyl group, a di(trichloromethyl)methyl group, a di(tribromomethyl)methyl group, a heptafluoropropyl group, a heptachloropropyl group, a 4-fluorobutyl group, a 4-chlorobutyl group, a 4-bromobutyl group, a nonafluorobutyl group, a nonachlorobutyl group, a nonabromobutyl group, a 5-fluoropentyl group, a 5-chloropentyl group, a 5-bromopentyl group, a 2,2,3,3,4,4,5,5-octafluoropentyl group ($-CH_2(CF_2)_4H$), a 2,2,3,3,4,4,5,5-octa-chloropentyl group ($-CH_2(CCl_2)_4H$), a 2,2,3,3,4,4,5,5-octabromopentyl group ($-CH_2(CBr_2)_4H$), a perfluoropentyl group, a perchloropentyl group, a perbro-mopentyl group, a 6-fluorohexyl group, a 6-chlorohexyl group, a 6-bromohexyl group, a perfluorohexyl group, a perchlorohexyl group, a perbromohexyl group, a perfluoroheptyl group, a perchloroheptyl group, a perbromoheptyl group, a perfluorooctyl group, a perchlorooctyl group, a perbromooctyl group, a perfluorononyl group, a perchlorononyl group, a perbromononyl group, a 3,3,4,4,5,5,6,6,7,7,8,8,9,9,10,10,10-heptadecafluorodecyl group ($-(CH_2)_2(CF_2)_7CF_3$), a 3,3,4,4,5,5,6,6,7,7,8,8,9,9,10,10,10-heptadecachlorodecyl group ($-(CH_2)_2(CCl_2)_7CCl_3$), a 3,3,4,4,5,5,6,6,7,7,8,8,9,9,10,10,10-heptadecabromodecyl group ($-(CH_2)_2(CBr_2)_7CBr_3$), a perfluorodecyl group, a perchlorodecyl group, a perbromodecyl group, a perfluoroundecyl group, a perchloroundecyl group, a perbromoundecyl group, a perfluorododecyl group, a perchlorododecyl group, a perbromododecyl group or the like.

The alkoxy group represented by $R^{22}$ may be any of a straight chained, a branched or a cyclic one, includes the one having carbon atoms of usually 1 to 12, preferably 1 to 6 and more preferably 1 to 3, and specifically includes, for example, a same one as an exemplification of alkoxy group having 1 to 10 carbon atoms, represented by $R^{15}$ to $R^{20}$ in the general formula [6], a n-undecyloxy group, an isoundecyloxy group, a sec-undecyloxy group, a tert-undecyloxy group, a neoundecyloxy group, a n-dodecyloxy group, an isododecyloxy group, a sec-dodecyloxy group, a tert-dodecyloxy group, a neododecyloxy group, or the like.

The alkyl group of the alkyl group, which may have a substitution group, represented by $R^{22}$ and $R^{23}$ in the general formulae [12] and [13], may be any of a straight chained, a branched or a cyclic one, includes the one having carbon atoms of usually 1 to 12, preferably 1 to 6 and more preferably 1 to 3, and specifically includes, for example, a same one as an exemplification of alkyl group having 1 to 12 carbon atoms, represented by $R^3$ to $R^{14}$ in the general formulae [2] to [5].

As an aryl group of the aryl group which may have a substitution group, represented by $R^{22}$ and $R^{23}$, there is included the one having carbon atoms of usually 6 to 14 and preferably 6 to 10, and specifically there are included, for example, a phenyl group, a naphthyl group, a phenanthryl group, an anthryl group, or the like.

As a substitution group of the alkyl group which may have a substitution group, represented by $R^{22}$, there are included, for example, an alkoxy group having carbon atoms of usually 1 to 12, an acyl group, a nitro group, a hydroxyl group, a carboxy group, a cyano group, a formyl group or the like.

As a substitution group of the alkyl group which may have a substitution group, represented to $R^{23}$, there are included, for example, a halogen atom, an alkoxy group having 1 to 12 carbon atoms, an acyl group, a nitro group, a hydroxyl group, a carboxyl group, a cyano group, a formyl group, or the like.

As a substitution group of the aryl group which may have a substitution group, represented to $R^{22}$ and $R^{23}$, there are included, for example, a halogen atom, an alkyl group having 1 to 12 carbon atoms, an alkoxy group having 1 to 12 carbon atoms, an acyl group, a nitro group, a hydroxyl group, a carboxyl group, a cyano group, a formyl group, or the like.

The halogen atom included as a substitution group includes, for example, a fluorine atom, a chlorine atom, a bromine atom, an iodine atom, or the like.

As an alkoxy group having carbon atoms of 1 to 12, included as a substitution group, may be any of a straight chained, a branched or a cyclic one, there is included the one having carbon atoms of usually 1 to 12, preferably 1 to 6 and more preferably 1 to 3, and specifically there is included, for example, a same one as an exemplification of alkoxy group having 1 to 12 carbon atoms, represented by $R^{22}$ in the general formula [12].

As an acyl group included as a substitution group, there is included the one derived from an aliphatic carboxylic acid and derived from an aromatic carboxylic acid.

The acyl group derived from an aliphatic carboxylic acid may be any of a straight chained, a branched or a cyclic one, or may further have a double bond in a chain, includes the one having carbon atoms of usually 1 to 20 and preferably 1 to 15, and specifically includes, for example, an acyl group derived from a saturated aliphatic carboxylic acid such as, for example, a formyl group, an acetyl group, a propionyl group, a butyryl group, an isobutyryl group, a valeryl group, an isovaleryl group, a pivaloyl group, a hexanoyl group, a heptanoyl group, an octanoyl group, a nonanoyl, a decanoyl group, an undecanoyl group, a lauroyl group, a myristoyl group, a palmitoyl group, a stearoyl group, an icosanoyl group, a cyclohexylcarbonyl group; an acyl group derived from an unsaturated aliphatic carboxylic acid such as, for example, an acryloyl group, a methacryloyl group, a crotonyl group, an oleoyl group.

As an acyl group derived from an aromatic carboxylic acid, there is included the one having carbon atoms of usually 7 to 15 and preferably 7 to 11, and specifically there are included, for example, a benzoyl group, a naphthoyl group, a toluoyl group, an anthoyl group, or the like.

The alkyl group having 1 to 12 carbon atoms, included as a substitution group, may be any of a straight chained, a branched or a cyclic one, includes the one having carbon atoms of usually 1 to 12, preferably 1 to 6, more preferably 1 to 3, and specifically includes, for example, a same one as an exemplification of the alkyl group having 1 to 12 carbon atoms, represented by $R^3$ to $R^{14}$, in general formulae [2] to [5], or the like.

The methylenebissulfonate derivative, as an objective compound represented by the general formula [1'], can be obtained, for example, by adding sulfonic acid represented by the general formula [10], 1 to 4 times mole of an organic base relative to the relevant sulfonic acid, and 0.2 to 0.5 times mole of the compound represented by the general formula [11], into a suitable solvent, at 0 to 150° C., and then making reacted under stirring for 0.5 to 12 hours.

It should be noted that the compound represented by the general formula [11] may be reacted with a salt, formed by sulfonic acid represented by the general formula [10] and an organic base, which is obtained by mixing sulfonic acid represented by the general formula [10] and the organic base in a suitable solvent, in advance, removing the solvent by concentration or the like, as needed, then depositing the salt by adding a suitable poor solvent, as needed, and then filtering this to isolate the salt.

As the organic base to be used here, there is included the one which enables to form a salt with sulfonic acid represented by the general formula [10], and specifically there are included, for example, a secondary amine, a tertiary amine, a quaternary ammonium salt or the like.

As the secondary amine and the tertiary amine, there is included, for example, the one represented by the general formula [15]:

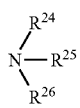

[15]

(wherein $R^{24}$ to $R^{26}$ each independently represent a hydrogen atom, an alkyl group, an aryl group, an aralkyl group. In addition, $R^{24}$ to $R^{26}$ together with a nitrogen atom to which they bind may form a hetero cycle, excluding the case where two among $R^{24}$ to $R^{26}$ are hydrogen atoms, and the case where all of $R^{24}$ to $R^{26}$ are hydrogen atoms).

As the quaternary ammonium salt, there is included, for example, the one represented by the general formula [16]:

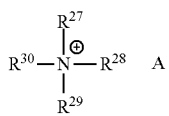

[16]

(wherein $R^{27}$ to $R^{30}$ each independently represent an alkyl group or an aralkyl group; and A represents a counter anion. In addition, two or three among $R^{24}$ to $R^{26}$ together with a nitrogen atom to which they bind may form a hetero cycle).

As a specific example of the case where, among a cation part of the relevant quaternary ammonium salt, three among $R^{27}$ to $R^{30}$ in the general formula [16], together with a nitrogen atom to which they bind form a hetero cycle, there is included an imidazolium ion represented, for example, by the general formula [17]:

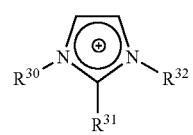

[17]

(wherein $R^{31}$ represents a hydrogen atom, an alkyl group or an aralkyl group; $R^{32}$ represents an alkyl group or an aralkyl group; and $R^{30}$ is the same as above), a pyridinium ion represented by the general formula [18]:

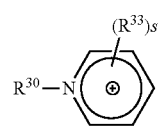

[18]

(wherein s moieties of $R^{33}$ each independently represent an alkyl group; s represents an integer of 0 to 5; and $R^{30}$ is the same as above) and a bipyridinium ion represented by the general formula [19]:

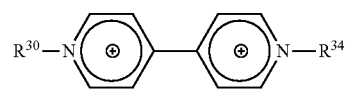

[19]

(wherein $R^{34}$ represents an alkyl group or an aralkyl group; and $R^{30}$ is the same as above. It should be noted that in this case, the counter anion A becomes two), and among them, the pyridinium ion represented by the general formula [18] is preferable.

In the general formulae [15] to [19], the alkyl group represented by $R^{24}$ to $R^{34}$, may be any of a straight chained, a branched or a cyclic one, includes the one having carbon atoms of usually 1 to 12 and preferably 1 to 4, and specifically includes, for example, a methyl group, an ethyl group, a n-propyl group, an isopropyl group, a n-butyl group, an isobutyl group, a sec-butyl group, a tert-butyl group, a n-pentyl group, an isopentyl group, a sec-pentyl group, a tert-pentyl group, a neopentyl group, a 1-methylpentyl group, a n-hexyl group, an isohexyl group, a sec-hexyl group, a tert-hexyl group, a neohexyl group, a n-heptyl group, an isoheptyl group, a sec-heptyl group, a tert-heptyl group, a neoheptyl group, a n-octyl group, an isooctyl group, a sec-octyl group, a tert-octyl group, a neooctyl group, a n-nonyl group, an isononyl group, a sec-nonyl group, a tert-nonyl group, a neononyl group, a n-decyl group, an isodecyl group, a sec-decyl group, a tert-decyl group, a neodecyl group, a n-undecyl group, an isoundecyl group, a sec-undecyl group, a tert-undecyl group, a neoundecyl group, a n-dodecyl group, an isododecyl group, a sec-dodecyl group, a tert-dodecyl group, a neododecyl group, a cyclopropyl group, a cyclobutyl group, a cyclopentyl group, a cyclohexyl group, a cycloheptyl group, a cyclooctyl group, a cyclononyl group, a cyclodecyl group, a cycloundecyl group, a cyclododecyl group, or the like, and among them, for example, a methyl group, an ethyl group, a n-propyl group, an isopropyl group, a n-butyl group, or the like is preferable.

In the general formula [15], as the aryl group represented by $R^{24}$ to $R^{26}$, there is included the one having carbon atoms of usually 6 to 14 and preferably 6 to 10, and specifically there are included, for example, a phenyl group, a naphthyl group, a phenanthryl group, an anthryl group, or the like.

In the general formulae [15] and [19], as the aralkyl group represented by $R^{22}$ to $R^{34}$, there is included the one having carbon atoms of usually 7 to 15, and specifically there are included, for example, a benzyl group, a phenethyl group, a 1-phenylethyl group, a 2-phenylpropyl group, a 3-phenylpropyl group, a phenylbutyl group, a 1-methyl-3-phenylpropyl group, a naphthylmethyl group, or the like.

The hetero cycle formed by $R^{24}$ to $R^{26}$ in the general formula [15] and a nitrogen atom to which they bind, and the hetero cycle formed by two or three among $R^{27}$ to $R^{30}$ in the general formula [16] and a nitrogen atom to which they bind, are, for example, a 5-membered ring or a 6-membered ring and may include one to two hetero atoms (for example, a nitrogen atom, an oxygen atom, a sulfur atom or the like) other than one nitrogen atom, and specifically includes, for example, an aliphatic hetero ring, for example, a 2H-pyrrole ring, an imidazoline ring, a pyrazoline ring, a pyrroline ring, a piperidine ring, a piperazine ring, a morpholine ring, a thiazoline ring or the like; an aromatic hetero ring, for example, a pyridine ring, an imidazole ring, a pyrazole ring, a thiazole ring, a furan ring, a pyran ring, a pyrrole ring, a pyrrolidine ring, a quinoline ring, an indole ring, an isoindolin ring, a carbazole ring or the like, or the like.

The aromatic hetero cycle may further have, as a substitution group, an alkyl group having 1 to 4 carbon atoms, for example, a methyl group, an ethyl group, a n-propyl group, an isopropyl group, a n-butyl group, a sec-butyl group, a tert-butyl group or the like, and a specific example of the aromatic hetero cycle compound having such the substitution group includes, for example, 2-picoline, 3-picoline, 4-picoline, 2,3-lutidine, 2,4-lutidine, 2,5-lutidine, 2,6-lutidine, α-collidine, β-collidine, γ-collidine, 2-isobutylpyridine, 2,6-di-tert-pyridine, 3-isobutylpyridine, 2-isopropylpyridine, 2-ethyl-6-isopropylpyridine, 2-n-propylpyridine, or the like.

Among the organic bases, a tertiary amine is preferable, and among them, for example, pyridine, lutidine, collidine, or the like is more preferable.

As preferable specific examples of the secondary amines represented by the general formula [15], there are included, for example, secondary alkyl amines such as, for example, dimethylamine, diethylamine, di-n-propylamine, diisopropylamine, di-n-butylamine, diisobutylamine, di-sec-butylamine, di-tert-butylamine, di-n-pentylamine, diisopentylamine, di-sec-pentylamine, di-tert-pentylamine, dineopentylamine, dihexylamine, diisohexylamine, di-sec-hexylamine, di-tert-hexylamine, dineohexylamine, diheptylamine, dioctylamine, bis(2-ethylhexyl)amine, didecylamine, dicetylamine, dicyclopropylamine, dicyclobutylamine, dicyclopentylamine, dicyclohexylamine, methylethylamine, isopropylethylamine, or the like; secondary aryl amines such as diphenylamine, dinaphthylamine, or the like; secondary aralkyl amines such as, for example, dibenzylamine, or the like; secondary cyclic amines such as, for example, morpholine, piperidine, pyrrolidine, piperazine, or the like, and among them secondary aryl amines are preferable, and among them diphenylamine is more preferable.

As preferable specific examples of the tertiary amines represented by the general formula [15], there are included, tertiary alkyl amines, for example, trimethylamine, triethylamine, tri-n-propylamine, triisopropylamine, tri-n-butylamine, triisobutylamine, tri-sec-butylamine, tri-tert-butylamine, tri-n-pentylamine, triisopentylamine, tri-sec-pentylamine, tri-tert-pentylamine, trineopentylamine, trihexylamine, triisohexylamine, tri-sec-hexylamine, tri-tert-hexylamine, trineohexylamine, tricyclopropylamine, tricyclobutylamine, tricyclopentylamine, tricyclohexylamine, dimethylethylamine, diisopropylethylamine, or the like; tertiary aryl amines, for example, triphenylamine, trinaphthylamine, or the like; tertiary aralkyl amines for example, tribenzylamine, or the like; tertiary cyclic amines, for example, pyridine, 2,3-lutidine, 2,4-lutidine, 2,5-lutidine, 2,6-lutidine, 3,4-lutidine, 3,5-lutidine, 2,4,6-collidine, α-collidine (4-ethyl-2-methylpyridine), β-collidine (3-ethyl-4-methylpyridine), γ-collidine (2,4,6-collidine), or the like, and among them tertiary cyclic amines are preferable, and among them pyridine, lutidine, collidine are preferable.

As a preferable specific example of the cation part of the quaternary ammonium salt represented by the general formula [16], there are included, a tetraalkyl ammonium ion such as, for example, a tetraethylammonium ion, a tetra-n-propylammonium ion, a tetra-n-butylammonium ion, a tetra-n-pentylammonium ion, a tetra-n-hexylammonium ion, a tetra-n-heptylammonium ion, a tetra-n-octylammonium ion, a tetra-n-nonylammonium ion, a tetra-n-decylammonium ion, a tetra-n-undecylammonium ion, a tetralauryl(dodecyl)ammonium ion, a tetra-n-tetradecylammonium ion, a tetramyristyl(tetradecyl)ammonium ion, a tetra-n-pentadecylammonium ion, a tetracetylammonium ion, a tetra-n-heptadecylammonium ion, a trioctadecylmethylammonium ion, a tridecylmethylammonium ion, a trinonylmethylammonium ion, a trioctylethylammonium ion, a triheptylpentylammonium ion, a triheptylpropylammonium ion, a triheptylmethylammonium ion, a trihexylbutylammonium ion, a trihexylethylammonium ion, a nonyltripentylammonium ion, a hexyltripentylammonium ion, a tripentylbutylammonium ion, a tripentylmethylammonium ion, an octyltributylammonium ion, a hexyltributylammonium ion, a decyltripropylammonium ion, an undecyltripropylammonium ion, a heptyltripropylammonium ion, a hexyltripropylammonium ion, a tripropylmethylammonium ion, a decyltriethylammonium ion, an octyltriethylammonium ion, an octadecyltrimethylammonium ion, a heptadecyltrimethylammonium ion, a hexadecyltrimethylammonium ion, a dodecyltrimethylammonium ion, a decyltrimethylammonium ion, a nonyltrimethylammonium ion, an octyltrimethylammonium ion, a hexyltrimethylammonium ion, an ethyltrimethylammonium ion, an undecylbutyldipropylammonium ion, an undecylbutyldiethylammonium ion, an undecylpropyldiethylammonium ion, a nonyloctyldiethylammonium ion, a nonyloctyldimethylammonium ion, a nonylhexyldibutylammonium ion, a nonylhexyldimethylammonium ion, a nonylpentyldimethylammonium ion, a nonylbutyldimethylammonium ion, an octylhexyldipentylammonium ion, an octylhexyldipropylammonium ion, an octylhexyldimethylammonium ion, an octylpentyldibutylammonium ion, an octylpentyldipropylammonium ion, an octylpentyldimethylammonium ion, an octylbutyldipropylammonium ion, an octylethyldimethylammonium ion, a heptylpentyldimethylammonium ion, a hexylpentyldibutylammonium ion, a hexylpentyldimethylammonium ion, a hexylbutyldimethylammonium ion, a pentylbutyldipropylammonium ion; an aralkyltrialkyl ammonium ion such as, for example, a benzyltrimethylammonium ion, a benzyltriethylammonium ion, a benzyltripropylammonium ion, a benzyl tri-n-propylammonium ion.

As a preferable specific example of the imidazolium ion represented by the general formula [17], there are included, for example, an alkyl substituted imidazolium ion such as, for example, a 1,3-dimethylimidazolium ion, a 1-methyl-3-ethylimidazolium ion, a 1-methyl-3-butylimidazolium ion, a 1-methyl-3-pentylimidazolium ion, a 1-methyl-3-hexylimidazolium ion, a 1-methyl-3-octylimidazolium ion, a 1-methyl-3-decylimidazolium ion, a 1-methyl-3-dodecylimidazolium ion, a 1-methyl-3-tetradecylimidazolium ion, a 1-methyl-3-hexadecylimidazolium ion, a 1-methyl-3-octadecylimidazolium ion, a 1,3-diethylimidazolium ion, a 1-ethyl-3-butylimidazolium ion, a 1-ethyl-3-pentylimidazolium ion, a 1-ethyl-3-hexylimidazolium ion, a 1-ethyl-3-octylimidazolium ion, a 1-ethyl-3-decylimidazolium ion, a 1-ethyl-3-dodecylimidazolium ion, a 1-ethyl-3-tetradecylimidazolium ion, a 1-ethyl-3-hexadecylimidazolium ion, a 1-ethyl-3-octadecylimidazolium ion; an aralkyl substituted imidazolium ion such as, for example, a 1-methyl-3-benzylimidazolium ion, a 1-methyl-3-phenylpropylimidazolium ion; a three alkyl groups substituted imidazolium ion, for example, a 1,2,3-trimethylimidazolium ion, a 1,2-dimethyl-3-ethylimidazolium ion, a 1,2-dimethyl-3-butylimidazolium ion, a 1,2-dimethyl-3-propylimidazolium ion, a 1,2-dimethyl-3-hexylimidazolium ion, a 1,2-dimethyl3-hexadecylimidazolium ion, or the like.

As a preferable specific example of the pyridinium ion represented by the general formula [18], there are included, for example, a 1-methylpyridinium ion, a 1-ethylpyridinium ion, a 1,3-dimethylpyridinium ion, a 1-methyl-3-ethylpyridinium ion, a 1,3,5-trimethylpyridinium ion, a 1-methyl-3,5-diethylpyridinium ion or the like, and among them, for example, the 1-methylpyridinium ion or the like is preferable.

As a preferable specific example of the bipyridinium ion represented by the general formula [19], there are included an N,N'-dialkyl-4,4'-bipyridinium ion such as, for example, a 1,1'-dimethyl-4,4'-bipyridinium ion, a 1,1'-diethyl-4,4'-bipyridinium ion, a 1,1'-dipropyl-4,4'-bipyridinium ion, a 1,1'-dibutyl-4,4'-bipyridinium ion, a 1,1'-dipentyl-4,4'-bipyridinium ion, a 1,1'-dihexyl-4,4'-bipyridinium ion, a 1,1'-diheptyl-4,4'-bipyridinium ion, a 1,1'-dioctyl-4,4'-bipyridinium ion, a 1,1'-dinonyl-4,4'-bipyridinium ion, a 1,1'-didecyl-4,4'-bipyridinium ion, a 1,1'-diundecyl-4,4'-bipyridinium ion, a 1,1'-didodecyl-4,4'-bipyridinium ion, a 1,1'-ditridecyl-4,4'-bipyridinium ion, a 1,1'-ditetradecyl-4,4'-bipyridinium ion, a 1,1'-dipentadecyl-4,4'-bipyridinium ion, a 1,1'-dihexadecyl-4,4'-bipyridinium ion, a 1,1'-diheptadecyl-4,4'-bipyridinium ion, a 1,1'-dioctadecyl-4,4'-bipyridinium ion, a 1,1'-dinonadecyl-4,4'-bipyridinium ion, a 1,1'-diicosyl-4,4'-bipyridinium ion, a 1-methyl-1'-ethyl-4,4'-bipyridinium ion, a 1-methyl-1'-propyl-4,4'-bipyridinium ion, a 1-methyl-1'-butyl-4,4'-bipyridinium ion, a 1-methyl-1'-pentyl-4,4'-bipyridinium ion, a 1-methyl-1'-hexyl-4,4'-bipyridinium ion, a 1-methyl-1'-heptyl-4,4'-bipyridinium ion, a 1-methyl-1'-octyl-4,4'-bipyridinium ion, a 1-methyl-1'-nonyl-4,4'-bipyridinium ion, a 1-methyl-1'-decyl-4,4'-bipyridinium ion, a 1-methyl-1'-undecyl-4,4'-bipyridinium ion, a 1-methyl-1'-dodecyl-4,4'-bipyridinium ion, a 1-ethyl-1'-propyl-4,4'-bipyridinium ion, a 1-ethyl-1'-butyl-4,4'-bipyridinium ion, a 1-ethyl-1'-pentyl-4,4'-bipyridinium ion, a 1-ethyl-1'-hexyl-4,4'-bipyridinium ion, a 1-ethyl-1'-heptyl-4,4'-bipyridinium ion, a 1-ethyl-1'-octyl-4,4'-bipyridinium ion, a 1-ethyl-1'-nonyl-4,4'-bipyridinium ion, a 1-ethyl-1'-decyl-4,4'-bipyridinium ion, a 1-ethyl-1'-undecyl-4,4'-bipyridinium ion, a 1-ethyl-1'-dodecyl-4,4'-bipyridinium ion; an N-alkyl-N'-aralkyl-4,4'-bipyridinium ion such as, for example, a 1-methyl-1'-benzyl-4,4'-bipyridinium ion, or the like.

As a preferable specific example of a counter anion of a quaternary ammonium salt, represented by the general formula [16], there are included, a halide ion such as, for example, an iodide ion, a bromide ion, a chloride ion; a halogen acid ion such as, for example, an iodate ion, a bromate ion, a chlorate ion; a perhalogen acid ion such as, for example, a periodate ion, a perbromate ion, a perchlorate ion; a halous acid ion such as, for example, a chlorite ion, an iodite ion, a bromite ion; a hypohalous acid ion such as, for example, a hypochlorite ion, a hypoiodite ion, a hypobromite ion; an anion derived from an inorganic acid such as, for example, a nitrate ion, a nitrite ion, a sulfate ion, a sulfite ion, a hydrogen sulfate ion, a hydrogen sulfite ion, a phosphate ion, a phosphite ion, a hydrogen phosphate ion, a hydrogen phosphite ion, a carbonate ion, a hydrogen carbonate ion, a borate ion, a hydrogen borate ion, a hexafluorophosphate ion, a tetrafluoroborate ion, a hydroxide ion; an anion derived from a carboxylic acid such as, for example, an aliphatic saturated carboxylic acid having 2 to 7 carbon atoms such as, for example, formic acid, acetic acid, propionic acid, butyric acid, isobutyric acid, valeric acid, isovaleric acid, pivalic acid, hexanoic acid, a cyclohexane carboxylic acid; a halogenated saturated aliphatic carboxylic acid having 2 to 7 carbon atoms such as, for example, trifluoroacetic acid, trichloroacetic acid, tribromoacetic acid, triiodoacetic acid, 3,3,3-trifluoropropionic acid, 3,3,3-trichloropropionic acid, pentafluoropropionic acid, pentachloropropionic acid, pentabromopropionic acid, pentaiodopropionic acid, 3,3,4,4,4-pentafluorobutyric acid, heptachlorobutyric acid, heptafluorobutyric acid, heptabromobutyric acid, heptaiodobutyric acid, heptafluoroisobutyric acid, heptachloroisobutyric acid, heptabromoisobutyric acid, heptaiodoisobutyric acid, nonafluorovaleric acid, nonachlorovaleric acid, nonabromovaleric acid, nonaiodovaleric acid, 6,6,6-trifluorohexanoic acid, 6,6,6-trichlorohexanoic acid, perfluorohexanoic acid, perchlorohexanoic acid, perbromohexanoic acid, periodohexanoic acid, perfluorocyclohexane carboxylic acid; an aromatic carboxylic acid having 7 to 11 carbon atoms such as, for example, benzoic acid, naphthoic acid; a halogenated aromatic carboxylic acid having 7 to 11 carbon atoms such as, for example, pentafluorobenzoic acid, pentachlorobenzoic acid, pentabromobenzoic acid, pentaiodobenzoic acid, perfluoronaphthoic acid, perchloronaphthoic acid, perbromonaphthoic acid, periodonaphthoic acid; an anion derived from sulfonic acid such as, for example, an alkylsulfonic acid having 1 to 6 carbon atoms such as methanesulfonic acid, ethanesulfonic acid, propanesulfonic acid, butanesulfonic acid, pentanesulfonic acid, hexanesulfonic acid; a haloalkylsulfonic acid having 1 to 6 carbon atoms such as, for example, trifluoromethanesulfonic acid, trichloromethanesulfonic acid, tribromomethanesulfonic acid, pentafluoroethanesulfonic acid, pentachloroethanesulfonic acid, pentabromoethanesulfonic acid, pentaiodoethanesulfonic acid, heptafluoropropanesulfonic acid, heptachloropropanesulfonic acid, heptabromopropanesulfonic acid, hepta iodopropanesulfonic acid, nonafluorobutanesulfonic acid, nonachlorobutanesulfonic acid, nonabromobutanesulfonic acid, nonaiodobutanesulfonic acid, peril uoropentanesulfonic acid, perchloropentanesulfonic acid, perbromopentanesulfonic acid, periodopentanesulfonic acid, perfluorohexanesulfonic acid, perchlorohexanesulfonic acid, periodohexanesulfonic acid; a cycloalkylsulfonic acid such as, for example, cyclohexanesulfonic acid; an aromatic sulfonic acid having 6 to 10 carbon atoms such as, for example, benzenesulfonic acid, naphthalenesulfonic acid, p-toluenesulfonic acid, p-methoxybenzenesulfonic acid; a halogenated aromatic sulfonic acid having 6 to 10 carbon atoms such as, for example, pentafluorobenzenesulfonic acid, pentachlorobenzenesulfonic acid, pentabromobenzenesulfonic acid, pentaiodobenzenesulfonic acid, perfluoronaphthalenesulfonic acid, perchloronaphthalenesulfonic acid, perbromonaphthalenesulfonic acid, periodonaphthalenesulfonic acid; or the like.

As a reactive solvent to be used here, a non-aqueous solvent is preferable, specifically there are included, for example, aliphatic hydrocarbons such as, for example, hexane, heptane, octane, isooctane, nonane, decane, undecane, dodecane, tridecane, tetradecane, pentadecane, hexadecane, heptadecane, octadecane, cyclohexane, methylcyclohexane, ethylcyclohexane, or a mixture thereof (for example, paraffin, mineral spirit, or the like); halogenated hydrocarbons such as, for example, methylene chloride, methylene bromide, 1,2-dichloroethane, chloroform; aromatic hydrocarbons such as, for example, benzene, toluene, xylene; carbonates such as, for example, dimethyl carbonate, diethyl carbonate, ethylene carbonate, propylene carbonate; esters, for example such as, methyl acetate, ethyl acetate, butyl acetate; ketones such as, for example, acetone, methyl ethyl ketone; ethers such as, for example, diethyl ether, isopropyl ether, cyclopentylmethyl ether, tetrahydrofuran, dioxane; for example, acetonitrile, dimethylformamide, dimethylacetamide, dimethylsulfoxide, or the like. These may be used alone or may be used in combination of two or more kinds as appropriate.

As a preferable combination, in the case of using the reactive solvent as a mixed solvent, there are included, for example, a combination of acetonitrile and cyclohexane, a combination of acetonitrile and toluene, or the like.

Reaction temperature is usually 0 to 150° C., and preferably 20 to 100° C. Reaction time is usually 0.5 to 24 hours, and preferably 0.5 to 12 hours.

In addition, as a poor solvent to be used in the case where a salt formed by the sulfonic acid represented by the general formula [15] and an organic base is deposited, in advance, any solvent may be used as long as it decreases solubility of the salt, that is, deposits the salt, and specifically there are included, for example, aliphatic hydrocarbons such as, for example, hexane, heptane, octane, isooctane, nonane, decane, undecane, dodecane, tridecane, tetradecane, pentadecane, hexadecane, heptadecane, octadecane, cyclohexane, methylcyclohexane, ethylcyclohexane, or a mixture thereof (for example, paraffin, mineral spirit, or the like); halogenated hydrocarbons such as, for example, methylene chloride, methylene bromide, 1,2-dichloroethane, chloroform; aromatic hydrocarbons such as, for example, benzene, toluene, xylene; carbonates such as, for example, dimethyl carbonate, diethyl carbonate, ethylene carbonate, propylene carbonate; esters such as, for example, methyl acetate, ethyl acetate, butyl acetate; ketones such as, for example, acetone, methyl ethyl ketone; ethers such as, for example, diethyl ether, isopropyl ether, cyclopentylmethyl ether, tetrahydrofuran, dioxane; alcohols such as, for example, methanol, ethanol, n-propanol, isopropanol; acetonitrile, or the like. These may be used alone or may be used in combination of two or more kinds, as appropriate. Post-treatment after the reaction may be performed in accordance with a post-treatment method usually performed in this field.

8. A Method for Producing the Non-aqueous Electrolytic Solution of the Present Invention It is desirable that the non-aqueous electrolytic solution of the present invention is prepared by dissolving the lithium salt (an electrolyte salt) relevant to the present invention into the non-aqueous solvent relevant to the present invention, then making the methylenebissulfonate derivative represented by the general formula [1] contained preferably in 0.01 to 1% by weight, into the resulting solution. It is preferable to use the non-aqueous solvent to be used in this time and the methylenebissulfonate derivative to be added to the non-aqueous electrolytic solution, which have impurity substances as low as possible by purification, in advance, within a range not to decrease productivity significantly.

In the case of using two or more kinds of non-aqueous solvents relevant to the present invention, a specific example of a production method for the non-aqueous electrolytic solution of the present invention may take a step composed of, for example, the following (A), (B) and (C), in this order:

(A) a non-aqueous mixed solvent preparation step for combining two or more kinds of the non-aqueous solvents, for example, at least one cyclic carbonate ester and "Other non-aqueous solvent", and preparing the non-aqueous mixed solvent therefrom, (B) a lithium salt dissolving step for dissolving the lithium salt into the non-aqueous mixed solvent, (C) a step for dissolving the methylenebissulfonate derivative relevant to the present invention into the resultant solution in the step (B).

In the case of containing a non-aqueous solvent, which is solid at 30° C. or lower, (for example, ethylene carbonate or the like) among two or more kinds of the non-aqueous solvents to be mixed in the above step (A), it is preferable to contain at least one non-aqueous solvent, which is liquid at 30° C. or lower. In this case, the non-aqueous solvent, which is liquid at 30° C. or lower, may be any of the non-aqueous solvent relevant to the present invention (that is, a cyclic carbonate ester, a straight chained carbonate ester, a cyclic carboxylic acid ester or the like), or the above other non-aqueous solvent. As two or more kinds of the non-aqueous solvents to be mixed in the above step (A), a combination of, for example, a cyclic carbonate ester (containing at least ethylene carbonate) and a straight chained carbonate ester (containing at least one or more kinds selected from diethyl carbonate, dimethyl carbonate and ethylmethyl carbonate) is preferable.

In addition, it is preferable that the above production method is performed by the step further composed of (A1), (B1) and (C1), in this order:

(A1) a non-aqueous mixed solvent preparation step for preparing the non-aqueous mixed solvent by adding at least one or more kinds selected from diethyl carbonate, dimethyl carbonate and ethylmethyl carbonate, as a straight chained carbonate ester, and a cyclic carbonate ester containing at least ethylene carbonate, so that liquid temperature does not exceed 30° C., (B1) a lithium salt dissolving step for adding the lithium salt into the non-aqueous mixed solution, so that liquid temperature does not exceed 30° C., in a small portion wise, so that concentration of total lithium salt becomes 0.5 to 3 moles, relative to 1 L of the non-aqueous electrolytic solution, where the lithium salt is dissolved into the non-aqueous solvent, (C1) a dissolving step for adding the methylenebissulfonate derivative relevant to the present invention, in a small portion wise, into the non-aqueous electrolytic solution, so as to be contained in a range of from 0.01% by mass to 1% by mass.

The production method of the present invention may further contain a step for measuring moisture and free acid content. In that case, for example, the following various measurements may be performed, after performing the above step (C) or (C1). In measurement of moisture value, for example, a micro moisture measurement apparatus (Carl Fischer coulometric titrator) (Product Name (CA-200, manufactured by Mitsubishi Chemical Analytech Co., Ltd.)) may be used.

Measurement of free acid content may be performed by neutralization titration using, for example, an aqueous solution of sodium hydroxide. Specifically, it may be performed by operation such as measurement by neutralization titration using an aqueous solution of sodium hydroxide, by sampling each non-aqueous electrolytic solution, in a dry box having a dew point of −40° C. or lower, sealing it and taking it out of the dry box, and then by quickly it into ice water, and after adding a bromothymol blue indicator, under stirring.

The production method for the non-aqueous electrolytic solution containing the negative electrode film forming agent relevant to the present invention and/or the blister inhibitor relevant to the present invention is as follows. That is, it is preferable to perform a step composed of the following (A2), (B2) and (C2), in this order.

(A2) a non-aqueous mixed solvent preparation step for preparing the non-aqueous mixed solvent by adding at least one or more kinds selected from diethyl carbonate, dimethyl carbonate and ethylmethyl carbonate, as a straight chained carbonate ester, and a cyclic carbonate ester containing at least ethylene carbonate, so that liquid temperature does not exceed 30° C., (B2) a lithium salt dissolving step for adding the lithium salt into the non-aqueous mixed solution, so that liquid temperature does not exceed 30° C., in a small portion wise, so that concentration of total lithium salt becomes 0.5 to 3 moles, relative to 1 L of the non-aqueous electrolytic solution, where the lithium salt is dissolved into the non-aqueous solvent, (C2) a dissolving step for adding the methylenebissulfonate derivative relevant to the present invention, in a small portion wise, into the non-aqueous electrolytic solution, so as to be contained in a range of from 0.01% by mass to 1% by mass, and then the negative electrode film forming agent and/or the blister inhibitor are contained in the non-aqueous electrolytic solution within the above range.

In the above step (C2), in the case of adding both the negative electrode film forming agent and the blister inhibitor, whichever the negative electrode film forming agent may be added first, or the blister inhibitor may be added first.

It should be noted that, in the case of preparing a battery using the non-aqueous electrolytic solution containing the methylenebissulfonate derivative relevant to the present invention, the non-aqueous electrolytic solution battery in a non-sealed state may be charged preliminarily under dry atmosphere, as needed, to remove gas generated in initial charging from inside the battery. In this way, the non-aqueous electrolytic solution battery having more stable quality can be provided, and by using this, decrease in battery characteristics in leaving at high temperature can be prevented.

In the production method for the non-aqueous electrolytic solution, in dissolving a lithium salt, for example, by taking care so that liquid temperature of the non-aqueous mixed solvent obtained by mixing a cyclic carbonate ester such as, for example, ethylene carbonate, and a straight chained carbonate ester, does not exceed 30° C., generation of a free acid such as hydrogen fluoride (HF), by reaction of the lithium salt in the non-aqueous electrolytic solution with moisture inside a system, and decomposition, can be suppressed. Therefore, as a result, because suppression of decomposition of the non-aqueous solvent can also become possible, it is effective in deterioration prevention of the non-aqueous electrolytic solution. In addition, in the lithium salt dissolving step, by dissolving and preparing the lithium salt in a small portion wise, so that concentration of total lithium salt becomes 0.5 to 3 moles, generation of a free acid such as hydrogen fluoride (HF) can be suppressed similarly.

In particular, in the case of preparing the non-aqueous electrolytic solution containing the methylenebissulfonate derivative of the present invention, the above side reaction tends to be progressed easily due to increase in liquid temperature of the non-aqueous electrolytic solution in preparing, therefore by suppressing temperature increase so that liquid temperature of the non-aqueous electrolytic solution does not exceed 30° C., deterioration of the non-aqueous electrolytic solution can be prevented, thus quality thereof can be maintained.

In the non-aqueous solvent mixing step (A), in mixing a straight chained carbonate ester with a cyclic carbonate ester such as ethylene carbonate, in a liquid state, by heating and melting so that liquid temperature of the non-aqueous electrolytic solution does not exceed 30° C., it is desirable that the cyclic carbonate ester is added in small portion wise. By taking care so that liquid temperature inside a system does not exceed 30° C., not only the above problem can be solved but also volatilization of the straight chained carbonate ester in mixing the non-aqueous mixed solvent can be suppressed, resulting in no change of composition of the non-aqueous mixed solvent, and is thus suitable.

In the lithium salt dissolving step (B), as a method for dissolving and preparing the lithium salt in small portion wise so that liquid temperature does not exceed 30° C., it is preferable that, for example, by adding and dissolving firstly 10 to 35% by weight of the total lithium in the mixed solvent, and then repeating twice to nine times an operation of further adding and dissolving 10 to 35% by weight of the total lithium, and finally by adding and dissolving the remaining lithium, so that liquid temperature does not exceed 30° C.

In addition, in the dissolving step of the lithium salt, in the case of using two or more kinds of lithium salts in combination, for example, in a combination of $LiPF_6$ and $LiBF_4$, in a combination of $LiPF_6$ and $LiN(SO_2CF_3)_2$, in a combination of $LiPF_6$ and bis[oxalate-O,O']lithium borate, or the like, shown as the above suitable combination, it is preferable to add $LiPF_6$ being present in higher ratio, first in a small portion wise, and then add the lithium salt being present in lower ratio, in a small portion wise, so that liquid temperature does to exceed 30° C.

9. The Non-aqueous Electrolytic Solution Battery of the Present Invention

The non-aqueous electrolytic solution battery of the present invention is provided with (i) the non-aqueous electrolytic solution of the present invention, (ii) a negative electrode, (iii) a positive electrode and (iv) a separator, and among them one provided with the following (i) to (iv) is preferable.

(i) the non-aqueous electrolytic solution of the present invention:

(ii) a negative electrode being able to store and discharge lithium, comprising at least one negative electrode active material selected from the following (a) to (d), as a main component:

(a) a carbon material having a d value of a lattice plane (002 plane) of 0.340 nm or smaller, in X-ray diffraction, (b) an oxide of one or more kinds of metal selected from Sn, Si, Pb and Al, (c) an alloy of one or more kinds of metal selected from Sn, Si, Pb and Al, and lithium, (d) a lithium-titanium oxide;

(iii) a positive electrode comprising at least one oxide selected from the following (e) to (h) or a polyanion compound, as a main component of a positive electrode active material:

(e) lithium cobaltate, (f) a lithium-manganese complex oxide having a spinel structure, (g) a lithium transition metal complex oxide having a lamella structure, containing manganese, nickel and cobalt, (h) a lithium-containing olivine-type phosphate salt;

(iv) a separator having polyethylene as a main component.

As the negative electrode active material composing the negative electrode, there are included the one capable of doping and de-doping of a lithium ion, for example, (a) a carbon material having a d value of a lattice plane (002 plane) of 0.340 nm or smaller, in X-ray diffraction, (b) an oxide of one or more kinds of metal selected from Sn, Si, Pb and Al, (c) an alloy of one or more kinds of metal selected from Sn, Si, Pb and Al, and lithium, (d) a lithium-titanium oxide or the like.

As the carbon material having a d value of a lattice plane (002 plane) of 0.340 nm or smaller, in X-ray diffraction, included as the negative electrode active material, there are included, for example, thermally decomposed carbons, cokes (for example, pitch coke, needle coke, petroleum coke or the like), graphites, a burned substance of an organic polymer compound (a carbonized one obtained by burning, for example, a phenol resin, a furan resin or the like at suitable temperature), carbon fiber, activated carbon or the like, and they may also be a graphitized one.

In addition, the carbon material is the one having a d value of a lattice plane (002 plane) of 0.340 nm or smaller, in X-ray diffraction, and among them, graphite having a true density thereof of 1.70 $g/cm^3$ or higher, or a highly crystallized carbon material having near property thereto is preferable. Use of such a carbon material enables, for example, to increase energy density of the non-aqueous electrolytic solution battery. As a commercial product of the negative electrode active material, there are included, for example, MCMB25-28, OMAC (manufactured by Osaka Gas Chemicals Co., Ltd.), KMFC-HAG (manufactured by JFE Chemical Corp.), LB-BG (manufactured by Nippon Graphite Industries Ltd.), MAG-V, MAG-D (manufactured by Hitachi Chemical Co., Ltd.) or the like.

Still more, as the carbon material, for example, the one further containing boron, the one coated with a metal such as, for example, gold, platinum, silver, copper, Sn, Si, the one coated with, for example, an amorphous carbon or the like, can also be used together. These carbon materials may be used alone or may be used in combination of two or more kinds as appropriate.

As the oxide of one or more kinds of metal selected from Sn, Si, Pb and Al, included as the negative electrode active material, there are included, for example, a tin oxide, a silicon oxide capable of doping and de-doping of a lithium ion or the like.

As the one or more kinds of metal selected from Sn, Si, Pb and Al or the alloy of one or more kinds of metal selected from Sn, Si, Pb and Al, and lithium, included as the negative electrode active material, there are included, a metal such as, for example, silicon, tin, lead; an alloyed substance of the metal with lithium, such as, for example, a silicon alloy, a tin alloy, a lead alloy, or the like.

As a particularly preferable specific example thereof, there are included, a metal elementary substance (for example, powder-like one) such as, for example, silicon (Si), tin (Sn), an alloy of the metal, a compound containing the metal, an alloy of the metal containing tin (Sn) and cobalt (Co) or the like, described in WO 2004/100293 A1 and JP-A-2008-016424.

The metal, when used as an electrode, can exhibit high charging capacity, as well as provide relatively small volume expansion and shrinkage accompanied with chare-discharge, and is thus preferable. In addition, it has been known that these metals, when used as the negative electrode of the lithium secondary battery, make an alloy with Li in charging, to exhibit high charging capacity, and is thus preferable, in view of this point as well.

Still more, the negative electrode active material formed of a silicon pillar having a diameter of submicron, or the negative electrode active material made of a fiber composed of silicon, described, for example, in WO 2004/042851 A1 and WO 2007/083155 A1, may also be used.

As (d) a lithium-titanium oxide, included as the negative electrode active material, there are included, for example, lithium titanate having a spinel structure, lithium titanate having a ramsdellite structure or the like. As the lithium titanate having a spinel structure, there are included, for example, $Li_{4+\alpha}Ti_5O_{12}$ (α changes within a range of $0 \le \alpha \le 3$ depending on a charge-discharge reaction). In addition, as the lithium titanate having a ramsdellite structure, there are included, for example, $Li_{2+\beta}Ti_3O_7$ (β changes within a range of $0 \le \beta \le 3$ depending on a charge-discharge reaction).

These negative electrode active materials may be prepared in accordance with a production method described in, for example, JP-A-2007-018883, JP-A-2009-176752 or the like.

As the negative electrode, a composition, having the above negative electrode active material formed on a collector such as a copper foil or expanded metal, is general. In order to enhance adhesive property of the negative electrode active material to the collector, for example, a binding agent such as, for example, polytetrafluoroethylene (PTFE), polyvinylidene fluoride (PVDF), styrene-butadiene copolymer (SBR), acrylonitrile-butadiene copolymer (N BR), carboxymethylcellulose (CMC), ethylene-propylene-diene terpolymer, may be used, and carbon black, amorphous whisker carbon, or the like may also be used with addding as a conductive aid.

The negative electrode can be prepared by mixing the negative electrode active material with the above binding agent and the conductive aid, adding and kneading thereto a high boiling solvent such as 1-methyl-2-pyrrolidone to obtain a negative electrode mixture, and then by coating this negative electrode mixture onto a copper foil or the like of a collector, drying, compression molding, and then subjecting to heat treatment at temperature of about 50° C. to 250° C., for about 2 to 8 hours under vacuum.

In addition, in the case where graphite is used as the negative electrode active material, in order to further enhance capacity of a battery, density of the negative electrode part excluding a collector, is usually 1.4 $g/cm^3$ or higher, preferably 1.5 $g/cm^3$ or higher, and more preferably 1.7 $g/cm^3$ or higher, as the lower limit. In addition, the upper limit is usually 2.1 $g/cm^3$ or lower, and preferably 1.9 $g/cm^3$ or lower.

The positive electrode active material composing the positive electrode can be formed from various materials capable of charge-discharge, and there are included, for example, the one containing at least one from (e) lithium cobaltate ($LiCoO_2$), (f) the lithium-manganese complex oxide having a spinel structure, (g) the lithium transition metal complex oxide having a lamella structure, containing manganese, nickel and cobalt, and (h) the lithium-containing olivine-type phosphate salt.

As the (f) the lithium-manganese complex oxide having a spinel structure, included as the positive electrode active material, there are included, for example, the lithium-manganese complex oxide having a spinel structure represented by the general formula [20]:

$$Li_b(Mn_{2-c}M_c)O_4 \quad [20]$$

(wherein M is at least one metal element selected from the group consisting of Ni, Co, Fe, Mg, Cr, Cu, Al and Ti; b satisfies 1.05≤b≤1.15; and c satisfies 0.05≤c≤0.20), and specifically, there are included, for example, LiMn$_2$O$_4$, LiMn$_{1.9}$Al$_{0.1}$O$_4$, LiMn$_{1.95}$Al$_{0.05}$O$_4$ or the like.

As the (g) the lithium transition metal complex oxide having a lamella structure, containing manganese, nickel and cobalt, included as the positive electrode active material, there are included, for example, the lithium-containing complex oxide represented by the general formula [21]:

$$\text{Li}_d\text{Mn}_x\text{Ni}_y\text{Co}_z\text{O}_2 \qquad [21]$$

(wherein d satisfies 0≤d≤1.2; and x, y and z satisfy conditions of x+y+z=1, 0<x≤0.5, 0<y≤0.5, and z≥0), includes specifically, for example, LiNiO$_2$, LiMn$_2$O$_4$, LiCo$_{1-a}$Ni$_a$O$_2$ (0.01 <a<1), LiMnO$_2$, Li[Mn$_{1/3}$Ni$_{1/3}$Co$_{1/3}$]O$_2$, Li[Mn$_{0.3}$Ni$_{0.5}$Co$_{0.2}$]O$_2$, Li[Mn$_{0.2}$Ni$_{0.6}$Co$_{0.2}$]O$_2$ or the like. Among these, in order to increase structural stability thereof and enhance safety at high temperature in a lithium secondary battery, the one containing manganese is preferable, in particular, in order to increase efficiency characteristics of the lithium secondary battery, the one further containing cobalt is more preferable, and as such a preferable specific example, there are included, for example, Li[Mn$_{1/3}$Ni$_{1/3}$Co$_{1/3}$]O$_2$, Li[Mn$_{0.3}$Ni$_{0.5}$Co$_{0.2}$]O$_2$, Li[Mn$_{0.2}$Ni$_{0.6}$Co$_{0.2}$]O$_2$ or the like, having a charge-discharge region at, for example, 4.3 V or higher.

In addition, it is preferable that the lithium-containing complex oxide further contains a small amount of metalloid element such as, for example, B, an alkaline earth metal element such as, for example, Mg, a metal element such as, for example, Al, Zn, Sn, and at least one element selected from, for example, Ti, Cr, V, Fe, Cu, Nb, Y, Zr or the like, and among them, B, Mg, Al, Sn or the like is more preferable.

As (h) the lithium-containing olivine-type phosphate salt, included as the positive electrode active material, there are included, for example, the one represented by the general formula [22]:

$$\text{LiFe}_{1-q}\text{M}_q\text{PO}_4 \qquad [22]$$

(wherein M is at least one selected from Co, Ni, Mn, Cu, Zn, Nb, Mg, Al, Ti, W, Zr and Cd; and q satisfies 0≤q≤0.5), for example, LiFePO$_4$, LiCoPO$_4$, LiNiPO$_4$, LiMnPO$_4$ or the like, and among them, LiFePO$_4$ or LiMnPO$_4$ is preferable.

As the positive electrode active material, at least one selected from the above (e) to (h) may be contained, as a main component, and as other one to be contained, there are included a transition element chalcogenide such as, for example, FeS$_2$, TiS$_2$, V$_2$O$_5$, MoO$_3$, MoS$_2$; a polymer such as, for example, polyacetylene, polypyrrole.

In the case of setting charging termination voltage at a battery voltage of 4.25 V or higher, (g) the lithium transition metal complex oxide having a lamella structure, containing manganese, nickel and cobalt is more preferable, among the positive electrode active materials.

The positive electrode may be prepared by mixing the positive electrode active material with a conductive agent such as, for example, acetylene black, carbon black, and a binding agent such as, for example, polytetrafluoro-ethylene (PTFE), polyvinylidene fluoride (PVDF), styrene-butadiene copolymer (SBR), acrylonitrile-butadiene copolymer (NBR), carboxymethyl cellulose (CMC), ethylene-propylene-diene terpolymer, adding and kneading thereto a high boiling point solvent such as 1-methyl-2-pyrrolidone to obtain a positive electrode mixture, and then by coating this positive electrode mixture onto a collector such as a foil made of aluminum, titanium or stainless steel, expanded metal, drying and compression molding, and then by heat treatment at about 50° C. to 250° C. for about 2 to 8 hours under vacuum.

Density of the positive electrode part excluding a collector is usually 2 g/cm$^3$ or higher, preferably 3 g/cm$^3$ or higher and more preferably 3.4 g/cm$^3$ or higher, as the lower limit, and usually 4 g/cm$^3$ or lower, as the upper limit, to still more enhance capacity of a battery.

As the separator having polyethylene as a main component, there are included a film which electrically insulates the positive electrode and the negative electrode, and enables to transmit a lithium ion, and specifically there are included, for example, a microporous polymer film such as a porous polyolefin film. As a specific example of the porous polyolefin film, for example, the porous polyethylene film may be used alone, or the porous polyethylene film and a porous polypropylene film may be used as a multi-layered film by overlapping. In addition, there are included a multi-layered film of the porous polyethylene film and a polypropylene film or the like.

As a polyolefin resin to be used for the porous polyolefin film, there are included, for example, high density polyethylene having a density over 0.94 g/cm$^3$, middle density polyethylene having a density range of 0.93 g/cm$^3$ to 0.94 g/cm$^3$, low density polyethylene having a density of lower than 0.93 g/cm$^3$, a linear low density polyethylene or the like. Among them, in view of enhancing film strength of the microporous film, the high density polyethylene and the middle density polyethylene are preferably used. These may be used alone or as a mixture.

It is preferable that these films are processed to be microporous, so that ions easily transmit by being soaked with an electrolytic solution. As a method for making these films microporous, there are included, a "phase separation method" where, for example, a film is formed while microphase separating a solution of a polymer compound and a solvent, and the solvent is removed by extraction to obtain a microporous film; a "stretching method" where, for example, a molten polymer compound is extruded in high draft to form a film and then heat treated so as to align crystals in one direction, and still more by stretching to form gaps between the crystals to obtain a microporous film; or the like, and the method is selected as appropriate depending on the film.

In addition, as the separator, a polymer electrolyte may also be used. As the polymer electrolyte, for example, a polymer substance dissolved with a lithium salt, a polymer substance swollen with the electrolytic solution or the like may also be used, however, it should not be limited thereto.

The non-aqueous electrolytic solution of the present invention may be used to obtain a polymer electrolyte by swelling a polymer substance, as well as the non-aqueous electrolytic solution may be soaked into a separator having a form of using a porous polyolefin film and a polymer electrolyte together.

As preferable combinations of the non-aqueous electrolytic solution battery of the present invention, there are included, for example, the following (V) to (XII):
[The Non-aqueous Electrolytic Solution Battery (V)]

(i) the non-aqueous electrolytic solution: the non-aqueous electrolytic solution comprising (1) the methylenebissulfonate derivative relevant to the present invention, (2) a non-aqueous solvent and (3) a lithium salt (an electrolyte solution) (it corresponds to the non-aqueous electrolytic solution (I) of the present invention), (ii) a negative electrode: a negative electrode containing (a) a carbon material having a d value of a lattice plane (002 plane) in X-ray diffraction of 0.340 nm or smaller, as a main component of the negative electrode active material, (iii) a positive electrode: a positive electrode containing (e) lithium cobartate, as a main component of a positive electrode active material, (iv) a separator: a separator made of microporous polyethylene.

[The Non-aqueous Electrolytic Solution Battery (VI)]

(i) the non-aqueous electrolytic solution: the non-aqueous electrolytic solution comprising (1) the methylenebissulfonate derivative relevant to the present invention, (2) a non-aqueous solvent, (3) a lithium salt (an electrolyte solution) and (4) a negative electrode film forming agent (it corresponds to the non-aqueous electrolytic solution (II) of the present invention), (ii) a negative electrode: a negative electrode containing (a) a carbon material having a d value of a lattice plane (002 plane) in X-ray diffraction of 0.340 nm or smaller, as a main component of a negative electrode active material, (iii) a positive electrode: a positive electrode containing (e) lithium cobartate, as a main component of a positive electrode active material, (iv) a separator: a separator made of microporous polyethylene.

[The Non-aqueous Electrolytic Solution Battery (VII)]

(i) the non-aqueous electrolytic solution: the non-aqueous electrolytic solution comprising (1) the methylenebissulfonate derivative relevant to the present invention, (2) a non-aqueous solvent, (3) a lithium salt (an electrolyte solution) and (4) a blister inhibitor (it corresponds to the non-aqueous electrolytic solution (III) of the present invention), (ii) a negative electrode: a negative electrode containing (a) a carbon material having a d value of a lattice plane (002 plane) in X-ray diffraction of 0.340 nm or smaller, as a main component of a negative electrode active material, (iii) a positive electrode: a positive electrode containing (e) lithium cobartate, as a main component of a positive electrode active material, (iv) a separator: a separator made of microporous polyethylene.

[The Non-aqueous Electrolytic Solution Battery (VIII)]

(i) the non-aqueous electrolytic solution: the non-aqueous electrolytic solution comprising (1) the methylenebissulfonate derivative relevant to the present invention, (2) a non-aqueous solvent, (3) a lithium salt (an electrolyte solution), (4) a negative electrode film forming agent and (5) a blister inhibitor (it corresponds to the non-aqueous electrolytic solution (IV) of the present invention), (ii) a negative electrode: a negative electrode containing (a) a carbon material having a d value of a lattice plane (002 plane) in X-ray diffraction of 0.340 nm or smaller, and/or (c) an alloy of one or more kinds of metals selected from Sn, Si, Pb and Al, and lithium, as a main component of a negative electrode active material, (iii) a positive electrode: a positive electrode containing (e) lithium cobartate, as a main component of a positive electrode active material, (iv) a separator: a separator made of microporous polyethylene.

[The Non-aqueous Electrolytic Solution Battery (IX)]

(i) the non-aqueous electrolytic solution: the non-aqueous electrolytic solution comprising (1) the methylenebissulfonate derivative relevant to the present invention, (2) a non-aqueous solvent, (3) a lithium salt (an electrolyte solution), (4) a negative electrode film forming agent and (5) a blister inhibitor (it corresponds to the non-aqueous electrolytic solution (IV) of the present invention), (ii) a negative electrode: a negative electrode containing (a) a carbon material having a d value of a lattice plane (002 plane) in X-ray diffraction of 0.340 nm or smaller, and/or (c) an alloy of at least one metal selected from Sn, Si, Pb and Al, and lithium, as a main component of a negative electrode active material, (iii) a positive electrode: a positive electrode containing (f) a lithium-manganese complex oxide having a spinel structure, and/or (h) a lithium-containing olivine-type phosphate salt, as a main component of a positive electrode active material, (iv) a separator: a separator made of microporous polyethylene.

[The Non-aqueous Electrolytic Solution Battery (X)]

(i) the non-aqueous electrolytic solution: the non-aqueous electrolytic solution comprising (1) the methylenebissulfonate derivative relevant to the present invention, (2) a non-aqueous solvent, (3) a lithium salt (an electrolyte solution), (4) a negative electrode film forming agent and (5) a blister inhibitor (it corresponds to the non-aqueous electrolytic solution (IV) of the present invention), (ii) a negative electrode: a negative electrode containing (a) a carbon material having a d value of a lattice plane (002 plane) in X-ray diffraction of 0.340 nm or smaller, and/or (c) an alloy of at least one metal selected from Sn, Si, Pb and Al, and lithium, as a main component of a negative electrode active material, (iii) a positive electrode: a positive electrode containing (g) a lithium transition metal complex oxide having a lamella structure containing manganese, nickel and cobalt, as a main component of a positive electrode active material, (iv) a separator: a separator made of microporous polyethylene.

[The Non-aqueous Electrolytic Solution Battery (XI)]

(i) the non-aqueous electrolytic solution: the non-aqueous electrolytic solution comprising (1) the methylenebissulfonate derivative relevant to the present invention, (2) a non-aqueous solvent, (3) a lithium salt (an electrolyte solution), (4) a negative electrode film forming agent and (5) a blister inhibitor (it corresponds to the non-aqueous electrolytic solution (IV) of the present invention), (ii) a negative electrode: a negative electrode containing (d) a lithium-titanium oxide, as a main component of a negative electrode active material, (iii) a positive electrode: a positive electrode containing (e) a lithium cobaltate, as a main component of a positive electrode active material, (iv) a separator: a separator made of microporous polyethylene.

[The Non-aqueous Electrolytic Solution Battery (XII)]

(i) the non-aqueous electrolytic solution: the non-aqueous electrolytic solution comprising (1) the methylenebissulfonate derivative relevant to the present invention, (2) a non-aqueous solvent, (3) a lithium salt (an electrolyte solution), (4) a negative electrode film forming agent and (5) a blister inhibitor (it corresponds to the non-aqueous electrolytic solution (IV) of the present invention), (ii) a negative electrode: a negative electrode containing (d) a lithium-titanium oxide, as a main component of a negative electrode active material, (iii) a positive electrode: a positive electrode containing (f) a lithium-manganese complex oxide having a spinel structure, and/or a lithium transition metal complex oxide having a lamella structure containing manganese, nickel and cobalt, as a main component of a positive electrode active material, (iv) a separator: a two-layer separator made of microporous polyethylene/microporous polypropylene.

Shape of a secondary battery using the non-aqueous electrolytic solution of the present invention is not especially limited, and various shapes such as a cylinder-type, a square type, an aluminum laminated-type, a coin-type, a button type, may be taken.

In preparing the non-aqueous electrolytic solution battery using the non-aqueous electrolytic solution of the present invention, as a material of an outer package of the battery, a metal material, or a metal-resin laminated body film (an aluminum laminated sheet such as aluminum foil or the like having resin coating at both surfaces) are used. As the metal material, there are included, for example, a steel plate plated with nickel, a stainless steel plate, a stainless steel plate plated with nickel, aluminum or an alloy thereof, nickel, titanium, or the like. Shape such as circular cylinder-like, square cylinder-like, thin box-like one may be determined as appropriate depending on applications of a battery. In consideration of productivity and sealing properties, it is preferable to be used in a form of a metal can fabricated to these shapes.

As a sealing method of the metal outer package, any method usually used in this field may be adopted, and there are included, for example, a laser welding, caulking, electric welding or the like.

In addition, this metal outer package may also be installed with a rapture structure having gas exhausting function in internal pressure increase, current interruption mechanism of an electrode terminal, and PTC (positive temperature coefficient) element having current interruption mechanism in temperature increase.

As a method for preparing the outer package using a metal-resin laminated film, any method usually used in this field may be adopted and there are included a method, for example, wet lamination, extrusion coating, co-extrusion lamination, dry lamination or the like.

In the case of packaging a battery element laminated body arranged with an electrode terminal at the outer package, using the metal-resin laminated film, any packaging procedure may be adopted as long as final sealing is attained using the outer package, however, such a method is preferable that makes the electrode terminal in a cylinder-like or a bag-like state, in advance, having a protruding part of electrode terminal left, and charges the battery element laminate body into the outer package, and then seals an opening part of the outer package, so that the electrode terminal protrudes. As a method for sealing, there are included a method for heat sealing thermoplastic resin layers opposing at the innermost side, by impulse seal, heat seal, high frequency seal or the like, however, it should not be especially limited thereto.

In addition, to cover the end of the outer package with an insulating material at the taking out part of the electrode terminal of the outer package, or to install a fracture region at a part of a metal layer composing the outer package enables to prevent short circuit through the metal layer, in the case of folding the electrode terminal, and is thus effective to enhance safety and reliability of a battery.

Explanation will be given below briefly on effect obtained by a typical aspect of the present invention disclosed in the present disclosure, as follows. That is, according to the present invention, by using the non-aqueous electrolytic solution containing a novel methylenebissulfonate derivative not shown at all in a conventional system, in a predetermined addition amount range of the present invention, the non-aqueous electrolytic solution has stability at high temperature or good coating forming effect, therefore not only charge-discharge efficiency at the first cycle, initial characteristics or storage characteristics at high temperature become good but also the non-aqueous electrolytic solution battery, which enables to suppress gas generation inside the battery, can be provided. In addition, it can maintain initial capacity in battery preparation, even in repeating a charge-discharge cycle, and thus the non-aqueous electrolytic solution battery having good cycle characteristics can be provided.

In addition, the production method of the non-aqueous electrolytic solution of the present invention enables to suppress generation of a free acid and prevent deterioration of the non-aqueous electrolytic solution, and thus attains to provide a good non-aqueous electrolytic solution by maintaining quality thereof.

EXAMPLES

Explanation will be given below in more detail on the present invention, with reference to Synthetic Examples, Experimental Examples, Comparative Experimental Examples, Comparative Examples and Examples shown below, however, the present invention should not be limited to these Examples.

Synthetic Example (The Methylenebissulfonate Derivative Relevant to the Present Invention and a Comparative Compound)
[The Methylenebissulfonate Derivative Relevant to the Present Invention]

Synthetic Example 1

Synthesis of Compound No. 1
[methylenebis(methane sulfonate)]

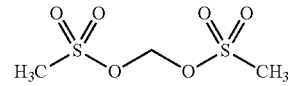

In dimethyl carbonate (10 mL), methylenebis(chlorosulfate) (ClSO$_2$OCH$_2$OSO$_2$Cl) (1.5 g, 6.1 mmol), and a methanesulfonic acid pyridinium salt (2.1 g, 12.0 mmol) synthesized in accordance with a method described in U.S. Pat. No. 4,649,209 were reacted under stirring at 55° C. for 3 hours. After completion of the reaction, a deposited pyridinium chlorosulfonate salt was filtered off and concentrated under reduced pressure to obtain a thin dark brown colored solid. By purification using re-crystallization after adsorption treatment with activated carbon, methylenebis(methane sulfonate) was obtained in a yield of 48% (0.6 g, 2.9 mmol), as an objective substance. Measurement result with $^1$H NMR is shown below.

$^1$H NMR (CD$_3$CN); δ=5.80 (s, 2H), 3.19 (s, 6H).

Synthetic Example 2

Synthesis of Compound No. 2 [methylenebis(ethane sulfonate)]

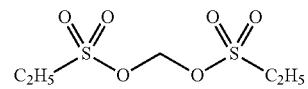

Methylenebis(ethane sulfonate) was obtained in a yield of 41% (0.6 g, 2.5 mmol) by treatment similarly as in Synthetic Example 1, except that a pyridinium ethanesulfonate salt (2.3 g, 12.0 mmol) was used instead of a pyridinium methanesulfonate salt (2.1 g, 12.0 mmol) in Synthetic Example 1. Measurement result with ¹H NMR is shown below.

¹H NMR (CDCl₃); δ=5.82 (s, 2H), 3.31-3.26 (q, 4H), 1.50-1.46 (t, 6H).

Synthetic Example 3

Synthesis of Compound No. 4 [methylenebis(n-butane sulfonate)]

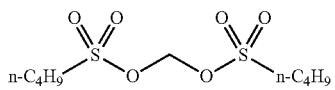

Methylenebis(n-butane sulfonate) was obtained in a yield of 55% (1.0 g, 3.3 mmol) by treatment similarly as in Synthetic Example 1, except that a pyridinium n-butanesulfonate salt (2.6 g, 12.0 mmol) was used instead of a pyridinium methanesulfonate salt (2.1 g, 12.0 mmol) in Synthetic Example 1. Measurement result with ¹H NMR is shown below.

¹H NMR (DMSO); δ=5.86 (s, 2H), 3.44-3.49 (m, 4H), 1.68-1.73 (m, 4H), 1.37-1.44 (m, 4H), 0.87-0.92 (t, 6H).

Synthetic Example 4

Synthesis of Compound No. 6 [methylenebis(trifluorometane sulfonate)]

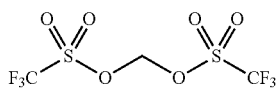

In n-hexane (10 mL), diiodomethane (1.0 g, 3.7 mmol), and silver trifluoromerthanesulfonate (2.0 g, 7.8 mmol) were reacted in reflux under heating for 4 hours. After completion of the reaction, a deposited silver iodide was filtered off and concentrated under reduced pressure to obtain a thin brown colored solid. By filtration of activated carbon after adsorption treatment with activated carbon, methylenebis(trifluorobenzene sulfonate) was obtained in a yield of 76% (0.9 g, 2.9 mmol), as an objective substance. Measurement result with ¹H NMR is shown below.

¹H NMR (CDCl₃); δ=6.06 (s, 2H).

Synthetic Example 5

Synthesis of Compound No. 7 [methylenebis(vinyl sulfonate)]

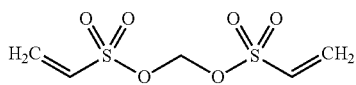

Methylenebis(vinyl sulfonate) was obtained in a yield of 61% (0.8 g, 3.7 mmol) by treatment similarly as in Synthetic Example 1, except that a pyridinium vinylsulfonate salt (2.2 g, 12.0 mmol) was used instead of a pyridinium methanesulfonate salt (2.1 g, 12.0 mmol) in Synthetic Example 1. Measurement result with ¹H NMR is shown below.

¹H NMR (CD₃CN); δ=6.77-6.72 (q, 2H), 6.47-6.43 (d, 2H), 6.29-6.27 (d, 2H), 5.73 (s, 2H).

Synthetic Example 6

Synthesis of Compound No. 12 [methylenebis(allyl sulfonate)]

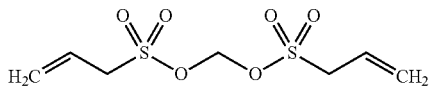

Methylenebis(allyl sulfonate) was obtained in a yield of 43% (0.7 g, 2.6 mmol) by treatment similarly as in Synthetic Example 1, except that a pyridinium allylsulfonate salt (2.4 g, 12.0 mmol) was used instead of a pyridinium methanesulfonate salt (2.1 g, 12.0 mmol) in Synthetic Example 1. Measurement result with ¹H NMR is shown below.

¹H NMR (CD₃CN); δ=5.93-5.82 (m, 2H), 5.76 (s, 2H), 5.55-5.49 (m, 4H), 4.06-4.04 (d, 4H).

Synthetic Example 7

Synthesis of Compound No. 13 [methylenebis(2-methylallyl sulfonate)]

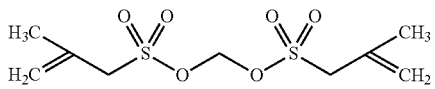 [SMILES: C=C(C)CS(=O)(=O)OCOS(=O)(=O)CC(=C)C]

Methylenebis(2-methylallyl sulfonate) was obtained in a yield of 35% (0.6 g, 2.1 mmol) by treatment similarly as in Synthetic Example 1, except that a pyridinium 2-methylallylsulfonate salt (2.6 g, 12.0 mmol) was used instead of a pyridinium methanesulfonate salt (2.1 g, 12.0 mmol) in Synthetic Example 1. Measurement result with ¹H NMR is shown below.

¹H NMR (CD₃CN); δ=5.78 (s, 2H), 5.26-5.20 (d, 4H), 4.04 (s, 4H), 1.93 (s, 6H).

Synthetic Example 8

Synthesis of Compound No. 15 [methylenebis(cinnamyl sulfonate)]

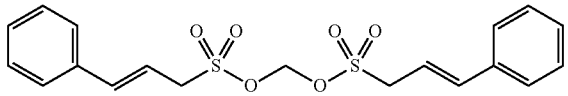 [SMILES: O=S(=O)(C/C=C/c1ccccc1)OCOS(=O)(=O)C/C=C/c1ccccc1]

Methylenebis(cinnamyl sulfonate) was obtained in a yield of 40% (1.0 g, 2.4 mmol) by treatment similarly as in Synthetic Example 1, except that a pyridinium cinnamylsulfonate salt (3.3 g, 12.0 mmol) was used instead of a pyridinium methanesulfonate salt (2.1 g, 12.0 mmol) in Synthetic Example 1. Measurement result with ¹H NMR is shown below.

$^1$H NMR (DMSO-d6); δ=7.48 (d, 4H), 7.38-7.30 (m, 6H), 6.83 (d, 2H), 6.29-6.22 (m, 2H), 5.95 (s, 2H), 4.47 (d, 4H).

Synthetic Example 9

Synthesis of Compound No. 16
[methylenebis(benzyl sulfonate)]

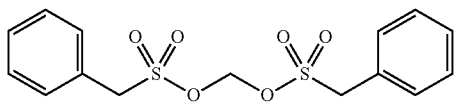 [SMILES: O=S(=O)(Cc1ccccc1)OCOS(=O)(=O)Cc1ccccc1]

Methylenebis(benzyl sulfonate) was obtained in a yield of 31% (0.7 g, 1.9 mmol) by treatment similarly as in Synthetic Example 1, except that a pyridinium benzylsulfonate salt (3.0 g, 12.0 mmol) was used instead of a pyridinium methanesulfonate salt (2.1 g, 12.0 mmol) in Synthetic Example 1. Measurement result with $^1$H NMR is shown below.

$^1$H NMR (CD$_3$CN); δ=7.43 (s, 10H), 5.58 (s, 2H), 4.56 (s, 4H).

Synthetic Example 10

Synthesis of Compound No. 17
[methylenebis(2-thienyl sulfonate)]

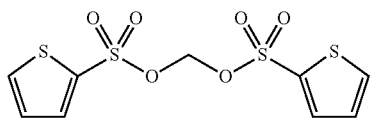 [SMILES: O=S(=O)(OCOS(=O)(=O)c1cccs1)c1cccs1]

Methylenebis(2-thienyl sulfonate) was obtained in a yield of 52% (0.7 g, 2.0 mmol) by treatment similarly as in Synthetic Example 4, except that silver 2-thienylsulfonate (2.1 g, 7.8 mmol) was used instead of silver trifluorosulfonate (2.0 g, 7.8 mmol) in Synthetic Example 4. Measurement result with $^1$H NMR is shown below.

$^1$H NMR (DMSO); δ=8.19-8.21 (m, 2H), 7.81-7.83 (m, 2H), 7.27-7.30 (m, 2H), 6.00 (s, 2H).

[Comparative Compounds]

As Comparative Compounds of the methylenebissulfonate derivative relevant to the present invention, the following disulfonate ester derivatives are shown.

Comparative Compound No. C-2 [ethylenebis(ethane sulfonate)]

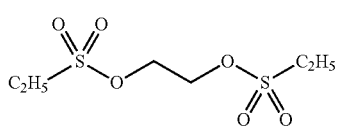

[No.C-2]

A Comparative Compound No. C-2 was synthesized as follows.

In acetonitrile (190 mL), ethanesulfonylchloride (25.7 g, 200 mmol), ethylene glycol (6.2 g, 100 mmol) and triethylamine (20.2 g, 200 mmol) were reacted under stirring at 25° C. for 2 hours. After completion of the reaction, the solution was diluted with ethyl acetate and separation washed with water. An ethyl acetate layer was subjected to adsorption treatment with activated carbon, and then activated carbon was filtered off and concentrated under reduced pressure to obtain ethylenebis(ethane sulfonate) in a yield of 18% (4.5 g, 18 mmol), as an objective substance. Measurement result with $^1$H NMR is shown below.

$^1$H NMR (CDCl$_3$); δ=4.46 (s, 4H), 3.24-3.16 (q, 4H), 1.48-1.43 (t, 6H).

Comparative Compound No. C-12 [ethylenebis(allyl sulfonate)]

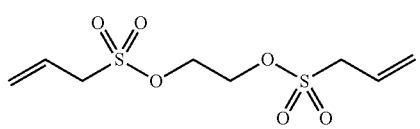

[No.C-12]

A Comparative Compound No. C-12 was synthesized as follows.

Ethylenebis(allyl sulfonate) was obtained in a yield of 48% (13.0 g, 48 mmol) by treatment similarly as in Comparative Compound No. C-2, except that allylsulfonyl chloride (18.1 g, 200 mmol) was used instead of ethanesulfonyl chloride (25.7 g, 200 mmol) in synthesis of Comparative Compound No. C-2. Measurement result with $^1$H NMR is shown below.

$^1$H NMR (CDCl$_3$); δ=5.95-5.85 (m, 2H), 5.53-5.47 (m, 4H), 4.47-4.43 (t, 4H), 3.92-3.90 (d, 4H).

Comparative Compound No. C-16 [ethylenebis(benzyl sulfonate)]

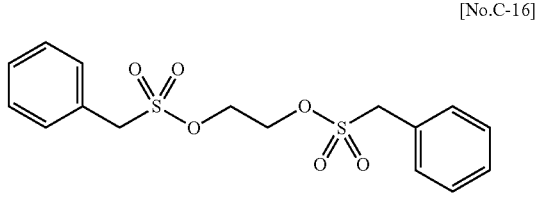 [SMILES: O=S(=O)(Cc1ccccc1)OCCOS(=O)(=O)Cc1ccccc1]

[No.C-16]

A Comparative Compound No. C-16 was synthesized as follows.

Ethylenebis(benzyl sulfonate) was obtained in a yield of 51% (19.0 g, 51 mmol) by treatment similarly as in Comparative Compound No. C-2, except that benzylsulfonyl chloride (38.0 g, 200 mmol) was used instead of ethanesulfonyl chloride (25.7 g, 200 mmol) in synthesis of Comparative Compound No. C-2. Measurement result with $^1$H NMR is shown below.

$^1$H NMR (DMSO-d6); δ=7.43-7.36 (m, 10H), 4.75-4.70 (t, 2H), 4.46 (s, 4H).

Comparative Compound No. 21: ethylene glycol dimethane sulfonate

The Comparative Compound No. 21 was synthesized in accordance with a usual method (for example, J Reprod Fertil. 1988 September; 84(1): 63-9 or the like).

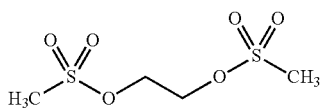

[No.21]

Comparative Compound No. 22: 1,4-butanediol-di-p-toluene sulfonate

As the Comparative Compound No. 22, a commercial product (manufactured by Shinsei Chemical Co., Ltd.) was used.

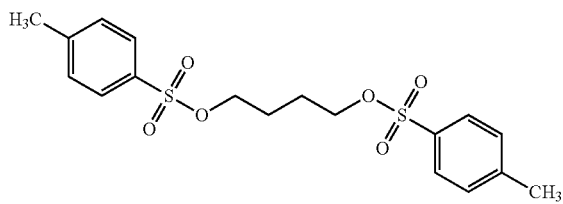

[No.22]

Comparative Compound No. 23: 1,4-butanediol bis(2,2,2-trifluoroethane sulfonate)

As the Comparative Compound No. 23, a commercial product (manufactured by Chemos GmbH, Germany) was used.

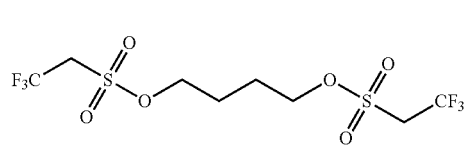

[No.23]

adding and dissolving firstly 30% by weight of the total $LiPF_6$ in the mixed solvent, mixed in advance, and then repeating twice an operation of adding and dissolving 30% by weight of the total $LiPF_6$, and finally by adding and dissolving the remaining 10% by weight of $LiPF_6$. Maximum liquid temperature at (A) the non-aqueous solvent mixing step and (B) the lithium salt dissolving step, in preparation of the standard electrolytic solution 1, was 20° C. and 26° C., respectively.

ii) Preparation of the Non-aqueous Electrolytic Solution 1

Then, by adding the methylenebissulfonate derivative relevant to the present invention, described in the following Table 1, in a predetermined amount described in the following Table 1, into the standard electrolytic solution 1 obtained in i), non-aqueous electrolytic solutions a-1 to a-3 were prepared.

In addition, a non-aqueous electrolytic solution b-1 not added with the methylenebissulfonate derivative relevant to the present invention (blank: the standard electrolytic solution 1), and non-aqueous electrolytic solutions b-2 to b-4 added with Comparative Compounds No. C-12, C-16 or C-2, in a predetermined amount described in the following Table 1, into the standard electrolytic solution 1, were adopted as Comparative Examples. Still more, moisture value and free acid value after preparation of the various non-aqueous electrolytic solutions are shown together in Table 1. It should be noted that moisture value of the non-aqueous electrolytic solution after preparation was measured using a micro moisture measurement apparatus (Carl Fisher coulometric titration apparatus, CA-200, manufactured by Mitsubishi Chemical Analytec Co., Ltd.).

Measurement of the free acid was performed by sampling 20 g of each non-aqueous electrolytic solution, in a dry box having a dew point of −40° C. or lower, sealing it and taking it out of the dry box, and then by quickly charging 20.0 g of the solution into 100 g of ice water (50 g of ice+50 g of water), and after adding three drops of a bromothymol blue indicator, by neutralization titration using a 0.1 mol/L sodium hydroxide aqueous solution, under stirring.

TABLE 1

| Non-aqueous electrolytic solution No. | Compound No. | Addition amount thereof (%) | Maximum liquid temperature of non-aqueous electrolytic solution at compound dissolution step (C) | Moisture and free acid of non-aqueous electrolytic solution after preparation | |
|---|---|---|---|---|---|
| | | | | Moisture | Free acid |
| a-1 | Compound No. 12 | 0.1 | 25° C. | 2 ppm | 23 ppm |
| a-2 | Compound No. 16 | 0.1 | 25° C. | 3 ppm | 22 ppm |
| a-3 | Compound No. 2 | 0.1 | 26° C. | 3 ppm | 24 ppm |
| b-1 | None | — | 25° C. | 3 ppm | 23 ppm |
| b-2 | Comparative Compound No. C-12 | 0.1 | 26° C. | 3 ppm | 23 ppm |
| b-3 | Comparative Compound No. C-16 | 0.1 | 26° C. | 3 ppm | 24 ppm |
| b-4 | Comparative Compound No. C-2 | 0.1 | 26° C. | 3 ppm | 26 ppm |

Experimental Examples 1 to 3 and Comparative Experimental Examples 1 to 4

[Preparation of the Non-aqueous Electrolytic Solution]

i) Preparation of a Standard Electrolytic Solution 1

Firstly, in a dry box having a dew point of −50° C. or lower, a mixed solvent of ethylene carbonate (EC) and diethyl carbonate (DEC) (in a volume ratio of 3:7), heated and dissolved in advance, was prepared, and then $LiPF_6$, as a lithium salt, was added so as to attain a concentration thereof of 1 mol/L, to prepare the standard electrolytic solution 1.

It should be noted that in this preparation, the standard electrolytic solution 1 was prepared by an operation of cooling so that liquid temperature does not exceed 30° C., and

[Preparation of a Negative Electrode]

93 parts by weight of a carbon material (MCMB25-28, manufactured by Osaka Gas Chemicals Co., Ltd.), as a negative electrode active material, was added into a solution, where 7 parts by mass of polyvinylidene fluoride (PVDF), as a binding agent, was dissolved in 1-methyl-2-pyroridone, in advance, uniformly dispersed and mixed, to prepare negative electrode mixture slurry. The resultant negative electrode mixture slurry was coated on a negative electrode collector made of a copper foil with a thickness of 18 μm, dried, and then compression molded and punched this out to a diameter of 17.5 mm to prepare the coin-like negative electrode.

[Preparation of a Positive Electrode]

94 parts by weight of $LiCoO_2$ (C-5H, manufactured by Nippon Chemical Industries Co., Ltd.), as a positive electrode active material, and 3 parts by weight of acetylene black, as a conductive agent, were mixed, which were added and uniformly dispersed and mixed into a solution, where 3 parts by mass of polyvinylidene fluoride (PVDF), as a binding agent, was dissolved in 1-methyl-2-pyrrolidone, in advance, to prepare $LiCoO_2$ mixture slurry. The resultant $LiCoO_2$ mixture slurry was coated on an aluminum foil with a thickness of 20 μm, dried, compression molded and punched this out to a diameter of 16.0 mm to prepare the positive electrode.

[Preparation of a Coin-type Battery]

The negative electrode with a diameter of 17.5 mm, the positive electrode with a diameter of 16.0 mm and a separator (E25MMS, manufactured by Tonen Chemical Nasu Co., Ltd.) made of a microporous polyethylene film with a thickness of 25 μm and a diameter of 18.0 mm, were laminated and arranged, in the order of the negative electrode, the separator and the positive electrode, into a stainless battery can having a 2032 size. After that, 900 μL of a non-aqueous electrolytic solution was poured into the negative electrode, the separator, and the positive electrode under vacuum, and then an aluminum plate (a thickness of 1.1 mm, a diameter of 16.0 mm) and a spring were stored. Finally, by caulking a battery can cap using a dedicated coin cell caulking machine, via a polypropylene gasket, air-tightness was maintained inside the battery, to prepare a coin-type battery having a diameter of 20 mm and a height of 3.2 mm.

[Measurement Condition of Charge-discharge Characteristics of the Coin-type Battery]

Charge-discharge characteristics were measured as follows using the coin-type battery prepared by the above method.

a) Charging at the first cycle;

Charging at 0.6 mA up to 3.0 V at 25° C., followed by charging at 1.2 mA up to 4.2 V, and then shifting to constant voltage charging from 4.2 V to complete charging when 6 hours have passed in total.

b) Discharging at the first cycle;

Discharging at 1.2 mA down to 3.0 V after the above charging.

c) Charge-discharge condition at the second cycle;

Charging at 1.2 mA up to 4.2 V, then shifting to constant voltage charging from 4.2 V to complete charging when 6 hours have passed in total. After that, discharging at 1.2 mA down to 3.0 V.

Charge-discharge efficiency and discharge capacity of the coin-type battery at the first cycle, along with discharge capacity at the second cycle were calculated by the following equations.

Charge-discharge efficiency at the first cycle=(charge capacity at the first cycle/discharge capacity at the first cycle)×100(%)

Discharge capacity at the first cycle(mAh/g)=discharge capacity at the first cycle of each coin cell/weight of the positive electrode active material of each coin cell Discharge capacity at the second cycle(mAh/g)=discharge capacity at the second cycle of each coin cell/weight of the positive electrode active material of each coin cell.

The results of charge-discharge efficiency at the first cycle, discharge capacity at the first cycle, and discharge capacity in the second cycle obtained are shown in Table 2.

TABLE 2

|  | Non-aqueous electrolytic solution No. | Compound No. | Addition amount thereof (%) | Charge-discharge efficiency at 1st cycle (%) | Discharge capacity at 1st cycle (mAh/g) | Discharge capacity at 2nd cycle (mAh/g) |
|---|---|---|---|---|---|---|
| Experimental Example 1 | a-1 | Compound No. 12 | 0.1 | 94.0 | 139 | 136 |
| Experimental Example 2 | a-2 | Compound No. 16 | 0.1 | 91.0 | 135 | 134 |
| Experimental Example 3 | a-3 | Compound No. 2 | 0.1 | 91.0 | 134 | 137 |
| Compatative Experimental Example 1 | b-1 | None | — | 90.0 | 127 | 129 |
| Compatative Experimental Example 2 | b-2 | Comparative Compound No. C-12 | 0.1 | 90.0 | 129 | 129 |
| Compatative Experimental Example 3 | b-3 | Comparative Compound No. C-16 | 0.1 | 90.0 | 125 | 124 |
| Compatative Experimental Example 4 | b-4 | Comparative Compound No. C-2 | 0.1 | 90.0 | 129 | 129 |

From the results of Table 2, it is understood that as compared with compounds of Compound No. 12, 16 and 2 (Experimental Examples 1 to 3: the methylenebissulfonate derivative relevant to the present invention), compounds of Comparative Experimental Examples No. C-12, C-16 and C-2 (Comparative Experimental Examples 2 to 4: the ethylenebissulfonate derivatives) tend to increase initial irreversible capacity due to decrease in charge-discharge efficiency at the first cycle. In other words, use of the methylenebissulfonate derivative relevant to the present invention exerts effect of decrease in initial irreversible capacity of a battery.

Examples 1-1 to 1-14 and Comparative Examples 1-1 to 1-4

[Preparation of the Non-aqueous Electrolytic Solution]

i) Preparation of the Standard Electrolytic Solution 1

Firstly, in a dry box having a dew point of −50° C. or lower, a mixed solvent of ethylene carbonate (EC) and ethylmethyl carbonate (EMC) (in a volume ratio of 1:1), heated and dissolved in advance, was prepared, and then $LiPF_6$, as a lithium salt, was added so as to attain a concentration of 1 mol/L, to prepare the standard electrolytic solution 1.

It should be noted that in preparing this, the standard electrolytic solution 1 was prepared by an operation of cooling so that liquid temperature does not exceed 30° C., and adding and dissolving firstly 30% by weight of the total $LiPF_6$ in the mixed solvent, mixed in advance, and then repeating twice an operation of adding and dissolving 30% by weight of the total $LiPF_6$, and finally by adding and dissolving the remaining 10% by weight of $LiPF_6$. Maximum liquid temperature at (A) the non-aqueous solvent mixing step and (B) the lithium salt dissolving step, in preparation of the standard electrolytic solution 1, was 21° C. and 27° C., respectively.

ii) Preparation of the Non-aqueous Electrolytic Solution 1

Then, by adding the methylenebissulfonate derivative relevant to the present invention, described in the following Table 3, in a predetermined amount described in the following Table 3, into the standard electrolytic solution 1 obtained in i), non-aqueous electrolytic solutions 1-1 to 1-14 were prepared. In addition, a non-aqueous electrolytic solution 1-15 not added with the methylenebissulfonate derivative relevant to the present invention (blank: the standard electrolytic solution 1), and non-aqueous electrolytic solutions 1-16 to 1-18 added with Comparative Compounds No. 1-16 to 1-18, in a predetermined amount described in the following Table 3, into the standard electrolytic solution 1, were adopted as Comparative Examples. Still more, moisture value and free acid value after preparation of the various non-aqueous electrolytic solutions are shown together in Table 3.

It should be noted that moisture value of the non-aqueous electrolytic solution after preparation was measured using a micro moisture measurement apparatus (Carl Fisher coulometric titration apparatus, CA-200, manufactured by Mitsubishi Chemical Analytec Co., Ltd.).

Measurement of the free acid was performed by sampling 20 g of each non-aqueous electrolytic solution, in a dry box having a dew point of −40° C. or lower, sealing it and taking it out of the dry box, and then by quickly charging 20.0 g of the solution into 100 g of ice water (50 g of ice+50 g of water), and after adding three drops of a bromothymol blue indicator, by neutralization titration using a 0.1 mol/L sodium hydroxide aqueous solution, under stirring.

a binding agent, was dissolved in 1-methyl-2-pyroridone, in advance, uniformly dispersed and mixed, to prepare negative electrode mixture slurry. The resultant negative electrode mixture slurry was coated on a negative electrode collector made of a copper foil with a thickness of 18 μm, dried, and then compression molded and punched this out to a diameter of 18 mm to prepare the coin-like negative electrode. This negative electrode mixture had a thickness of 95 μm, a weight of 71 mg for a circular shape with a diameter of 18 mm.

[Preparation of a Positive Electrode]

94 parts by weight of $LiCoO_2$ (C-5H, manufactured by Nippon Chemical Industries Co., Ltd.), as a positive electrode active material, and 3 parts by weight of acetylene black, as a conductive agent, were mixed, which were added and uniformly dispersed and mixed into a solution, where 3 parts by mass of polyvinylidene fluoride (PVDF), as a binding agent, was dissolved in 1-methyl-2-pyroridone, in advance, to prepare $LiCoO_2$ mixture slurry. The resultant $LiCoO_2$ mixture slurry was coated on an aluminum foil with a thickness of 20 μm, dried, compression molded and punched this out to a diameter of 16.5 mm to prepare the positive electrode. This $LiCoO_2$ mixture had a thickness of 105 μm, a weight of 65 mg for a circle with a diameter of 16.5 mm.

[Preparation of a Coin-type Battery]

The negative electrode with a diameter of 18 mm, the positive electrode with a diameter of 16.5 mm and a separator (E25MMS, manufactured by Tonen Chemical Nasu Co., Ltd.) made of a microporous polyethylene film with a thickness of 25 μm and a diameter of 18.5 mm, were laminated and arranged, in the order of the negative electrode, the separator and the positive electrode, into a stainless battery can having

TABLE 3

| Non-aqueous electrolytic solution No. | Compound No. | Addition amount thereof (%) | Maximum liquid temperature of non-aqueous electrolytic solution at compound dissolution step (C) | Moisture and free acid of non-aqueous electrolytic solution after preparation | |
|---|---|---|---|---|---|
| | | | | Moisture | Free acid |
| 1-1 | Compound No. 1 | 0.2 | 25° C. | 4 ppm | 24 ppm |
| 1-2 | Compound No. 2 | 0.2 | 25° C. | 3 ppm | 22 ppm |
| 1-3 | Compound No. 4 | 0.2 | 26° C. | 3 ppm | 25 ppm |
| 1-4 | Compound No. 7 | 0.2 | 25° C. | 5 ppm | 24 ppm |
| 1-5 | Compound No. 12 | 0.2 | 26° C. | 4 ppm | 23 ppm |
| 1-6 | Compound No. 13 | 0.2 | 26° C. | 3 ppm | 26 ppm |
| 1-7 | Compound No. 15 | 0.2 | 26° C. | 3 ppm | 26 ppm |
| 1-8 | Compound No. 17 | 0.2 | 26° C. | 4 ppm | 24 ppm |
| 1-9 | Compound No. 1 + No. 4 (1:2 wt. ratio) | 0.2 | 25° C. | 3 ppm | 25 ppm |
| 1-10 | Compound No. 1 + No. 7 (1:2 wt. ratio) | 0.2 | 25° C. | 4 ppm | 23 ppm |
| 1-11 | Compound No. 1 + No. 12 (1:2 wt. ratio) | 0.2 | 26° C. | 5 ppm | 25 ppm |
| 1-12 | Compound No. 1 + No. 13 (1:2 wt. ratio) | 0.2 | 25° C. | 4 ppm | 24 ppm |
| 1-13 | Compound No. 1 + No. 15 (1:2 wt. ratio) | 0.2 | 25° C. | 4 ppm | 23 ppm |
| 1-14 | Compound No. 1 + No. 17 (1:2 wt. ratio) | 0.2 | 25° C. | 3 ppm | 25 ppm |
| 1-15 | None | — | — | 4 ppm | 19 ppm |
| 1-16 | Comparative Compound No. 21 | 0.2 | 25° C. | 4 ppm | 24 ppm |
| 1-17 | Comparative Compound No. 22 | 0.2 | 25° C. | 4 ppm | 26 ppm |
| 1-18 | Comparative Compound No. 23 | 0.2 | 25° C. | 4 ppm | 26 ppm |

[Preparation of a Negative Electrode]

93 parts by weight of a carbon material (MCMB25-28, manufactured by Osaka Gas Chemicals Co., Ltd.), as a negative electrode active material, was added into a solution, where 7 parts by mass of polyvinylidene fluoride (PVDF), as a 2032 size. After that, 1000 μL of a non-aqueous electrolytic solution was poured into the negative electrode, the separator and the positive electrode under vacuum, and then an aluminum plate (a thickness of 1.1 mm, a diameter of 16.5 mm) and a spring were stored. Finally, by caulking a battery can cap using a dedicated coin cell caulking machine, via a polypropylene gasket, air-tightness was maintained inside the battery, to prepare a coin-type battery having a diameter of 20 mm and a height of 3.2 mm.

[Preparation of a Laminated Battery]

An electrode group was prepared by using the same electrode as in the above coin-type battery, cutting out the negative electrode with a dimension of 55 mm×100 mm, the positive electrode with a dimension of 50 mm×90 mm, and opposing them via a separator made of a microporous polyethylene film. This electrode group was stored in a cylinder-like bag, prepared by an aluminum laminated film (manufactured by Sumitomo Electric Industries Ltd.), so that both lead terminals of the positive electrode and the negative electrode can be drawn out from the either side of opening parts. After that, firstly, the side where the lead terminal was drawn out was closed by heat sealing. Then, with a remained opening part positioned upward, 1.2 g of the non-aqueous electrolytic solution was poured and impregnated to the electrode group, and next charging was performed for 90 minutes at a constant current of 15 mA. After that, with a remained opening part in a state positioned upward, 0.3 g of the non-aqueous electrolytic solution was still more poured and impregnated, and then the electrode group was sealed in the bag by heat sealing of the opening part to prepare the laminated battery.

[Comparison of Battery Characteristics Between the Coin-type Battery and the Laminated Battery]

Characteristics evaluation results of the coin-type batteries using various non-aqueous electrolytic solutions shown in the above Table 3, after storage at high temperature, and cycle characteristics evaluation results of the laminated batteries at 25° C. are shown together in Table 4. It should be noted that measurement condition of charge-discharge characteristics of the coin-type battery and the laminated battery is shown below.

[Measurement Condition of Charge-discharge Characteristics of the Coin-type Battery]

Charge-discharge characteristics were measured as follows using the coin-type battery prepared by the above method.

a) Charging at the first cycle;
Charging at 0.7 mA up to 3.0 V at 25° C., followed by charging at 1.4 mA up to 4.2 V, and then shifting to constant voltage charging from 4.2 V to complete charging when 6 hours have passed in total.

b) Discharging at the first cycle;
Discharging at 1.4 mA down to 3.0 V after the above charging.

c) Charge-discharge condition at the second cycle, the third cycle and the fourth cycle;
Charging at 1.4 mA up to 4.2 V, then shifting to constant voltage charging from 4.2 V to complete charging when 6 hours have passed in total. After that, discharging at 1.4 mA down to 3.0 V. This operation was repeated three times in total.

d) Characteristic after storage at high temperature (charge-discharge condition at the fifth cycle and the sixth cycle).

As for characteristic after storage of the coin-type battery at high temperature (charge-discharge condition at the fifth cycle), by charging under the same charging condition as in the above c), and then storing at 85° C. for 24 hours, and discharging under the same discharging condition as in the above c) at 25° C., capacity retention rate was calculated by the following equation:

Capacity retention rate=(discharge capacity at the fifth cycle/discharge capacity at the fourth cycle)×100 (%).

Still more, capacity recovery rate was calculated by the following equation, by performing charge-discharge, one cycle under the same condition at the second to fourth cycles at normal temperature:

Capacity recovery rate=(discharge capacity at the sixth cycle/discharge capacity at the fourth cycle)×100(%).

[Measurement Conditions of Charge-discharge Characteristics of the Laminated Battery]

Charge-discharge characteristics were measured as follows, after leaving the laminated battery prepared by the above method at room temperature for one week.

a) Charging (charging at the first cycle) after leaving at room temperature for one week;
Charging at 30 mA up to 4.2 V, and then shifting to constant voltage charging from 4.2 V to complete charging when 5 hours have passed in total.

b) Discharging at the first cycle;
Discharging at 30 mA down to 3.0 V after the above charging.

c) Charging at and subsequent to the second cycle;
After completion of discharging of the above b), charging at 30 mA up to 4.2 V, then shifting to constant voltage charging from 4.2 V to complete charging when 6 hours have passed in total.

d) Dicharging at and subsequent to the second cycle;
After completion of charging of the above c), discharging at 30 mA down to 3.0 V.

Charge-discharge between 3.0 V to 4.2 V (that is, the above steps (c) and (d)) was repeated still more three times in total by the same method.

Cycle characteristics at 25° C. were measured under the following charge-discharge test conditions, after performing the above charge-discharge test up to the fourth cycle. That is, capacity retention rate, after performing 100 cycles under the following charge-discharge conditions at 25° C., was calculated by the following equation:

Charging; Charging at 120 mA up to 4.2 V, and then shifting to constant voltage charging from 4.2 V to complete charging when 2.5 hours have passed in total, Discharging; After the above charging, discharging at 120 mA down to 3.0 V, Capacity retention rate, after 100 cycles at 25° C.= (discharge capacity at the 100th cycle at 25° C./discharge capacity at the fourth cycle)× 100(%).

TABLE 4

| | Non-aqueous electrolytic solution No. | Evaluation result in coin-type battery (after storage at 85° C., 24 h) | | Evaluation result in laminated battery Capacity retention rate after 100 cycles at 25° C. (%) |
|---|---|---|---|---|
| | | Capacity retention rate (%) | Capacity recovery rate (%) | |
| Example 1-1 | 1-1 | 79.2 | 91.1 | 90.5 |
| Example 1-2 | 1-2 | 79.1 | 91.0 | 90.4 |
| Example 1-3 | 1-3 | 79.3 | 91.2 | 90.6 |
| Example 1-4 | 1-4 | 79.1 | 91.3 | 90.7 |
| Example 1-5 | 1-5 | 79.3 | 91.4 | 90.3 |
| Example 1-6 | 1-6 | 79.1 | 91.2 | 90.2 |
| Example 1-7 | 1-7 | 79.2 | 91.3 | 90.2 |

TABLE 4-continued

|  | Non-aqueous electrolytic solution No. | Evaluation result in coin-type battery (after storage at 85° C., 24 h) | | Evaluation result in laminated battery Capacity retention rate after 100 cycles at 25° C. (%) |
|---|---|---|---|---|
|  |  | Capacity retention rate (%) | Capacity recovery rate (%) |  |
| Example 1-8 | 1-8 | 79.0 | 91.1 | 90.3 |
| Example 1-9 | 1-9 | 79.2 | 91.4 | 90.4 |
| Example 1-10 | 1-10 | 79.2 | 91.2 | 90.2 |
| Example 1-11 | 1-11 | 79.1 | 91.3 | 90.5 |
| Example 1-12 | 1-12 | 79.2 | 91.2 | 90.3 |
| Example 1-13 | 1-13 | 79.2 | 91.3 | 90.2 |
| Example 1-14 | 1-14 | 79.0 | 90.9 | 90.1 |
| Comparative Example 1-1 | 1-15 | 65.1 | 72.2 | 79.4 |
| Comparative Example 1-2 | 1-16 | 70.9 | 79.7 | 81.4 |
| Comparative Example 1-3 | 1-17 | 70.7 | 81.0 | 81.3 |
| Comparative Example 1-4 | 1-18 | 71.1 | 81.1 | 81.5 |

As is clear from the results of Examples 1-1 to 1-14 and Comparative Example 1-1 of Table 4, it is understood that any of the coin-type batteries, using the non-aqueous electrolytic solution containing predetermined amount of the methylenebissulfonate derivative relevant to the present invention, exhibits clear improvement effect of capacity retention rate and capacity recovery rate of the battery, after storage at 85° C. for 24 hours, as compared with the standard electrolytic solution alone (Comparative Example 1-1).

In addition, it was confirmed that good characteristics is obtained also in the result of cycle characteristics of the laminated battery, in the case of using the non-aqueous electrolytic solution of the present invention.

On the other hand, in the case of using, instead of the methylenebissulfonate derivative, the non-aqueous electrolytic solutions (Comparative Examples 1-2 to 1-4) containing Comparative Compounds No. 21 to 23 that are analogous compounds thereof, in predetermined amount, it was confirmed tendency of inferior storage characteristics at high temperature, as compared with Examples 1-2 to 1-14, caused by decrease in both capacity retention rate and capacity recovery rate.

Examples 1-15 to 1-17 and Comparative Example 1-5

[Comparison of Cycle Characteristics at 0° C. In the Coin-Type Batteries]

Examples 1-15 to 1-17

Coin batteries were prepared similarly as in Example 1-1 (the non-aqueous electrolytic solution No. 1-1 (containing 0.2% by weight of Compound No. 1) was used), Example 1-2 (the non-aqueous electrolytic solution No. 1-2 (containing 0.2% by weight of Compound No. 2) was used) and Example 1-3 (the non-aqueous electrolytic solution No. 1-3 (containing 0.2% by weight of Compound No. 4) was used), to perform evaluation of cycle characteristics at 0° C. The results thereof are shown in Table 5. It should be noted that measurement conditions of cycle characteristics at 0° C. of the coin-type batteries are shown below.

[A Cycle Test at Low Temperature of 0° C.]

Charge-discharge characteristics were measured as follows using the coin-type battery prepared by the above method.

a) Charging at the first cycle;

Charging at 0.7 mA up to 3.0 V at 25° C., followed by charging at 1.4 mA up to 4.2 V, and then shiftedshifting to constant voltage charging from 4.2 V to complete charging when 6 hours have passed in total.

b) Discharging at the first cycle;

Discharging at 1.4 mA down to 3.0 V after the above charging.

c) Charge-discharge condition from the second cycle to the eleventh cycle;

Charging at 1.4 mA up to 4.2 V at 25° C., then shifting to constant voltage charging from 4.2 V to complete charging when 6 hours have passed in total. After that, discharging was performed at 1.4 mA down to 3.0 V at 25° C. This operation was repeated 10 times in total.

d) Charge-discharge condition from the twelfth cycle to the twenty-first cycle;

Charging at 1.4 mA up to 4.2 V at 0° C., then shifting to constant voltage charging from 4.2 V to complete charging when 6 hours have passed in total. After that, discharging was performed at 1.4 mA down to 3.0 V at 0° C. This operation was repeated 10 times in total.

In addition, as for cycle characteristic of the coin-type battery at low temperature of 0° C., by discharging under the same discharging condition after charging at 25° C., capacity retention rate was calculated by the following equation:

Capacity retention rate=(discharge capacity at the twenty-first cycle/discharge capacity at the third cycle)×100(%).

Comparative Example 1-5

A coin battery was prepared similarly as in Example 1-15, except that one not added with the methylenebissulfonate derivative relevant to the present invention into the non-aqueous electrolytic solution (the non-aqueous electrolytic solution No. 1-15 (not added with the compound)) was used, to perform evaluation of cycle characteristics at 0° C. In addition, the coin battery was disassembled to observe a negative electrode surface. The results thereof are shown together in Table 5.

TABLE 5

|  | Non-aqueous electrolytic solution No. | Capacity retention rate after 10 cycles at 0° C. (%) | Li dendrite generation at negative electrode surface after 10 cycles at 0° C. |
|---|---|---|---|
| Example 1-15 | 1-1 | 94.4 | No Li dendrite generation |
| Example 1-16 | 1-2 | 94.3 | No Li dendrite generation |
| Example 1-17 | 1-3 | 94.5 | No Li dendrite generation |
| Comparative Example 1-5 | 1-15 | 84.6 | Li dendrite generation |

As shown in Table 5, it is understood that, as compared with the coin-type battery not added with the methylenebissulfonate derivative relevant to the present invention into the non-aqueous electrolytic solution (Comparative Example 1-5: the non-aqueous electrolytic solution No. 1-15 (the standard electrolytic solution 1 alone)), the coin-type batteries using the non-aqueous electrolytic solution of the present invention (Examples 1-15 to 1-17) show clear improvement effect of capacity retention rate after the cycle at 0° C. In addition, it is understood that the non-aqueous electrolytic solution of the present invention shows good characteristics because of no generation of Li dendrite at a negative electrode surface of Examples 1-15 to 1-17, as compared with a large quantity of generation of Li dendrite at a negative electrode surface of the coin-type battery of Comparative Example 1-5.

Examples 2-1 to 2-30 and Comparative Example 2-1 i) Preparation of a Standard Electrolytic Solution 2

In a dry box having a dew point of −50° C. or lower, a mixed solvent of ethylene carbonate (EC), ethylmethyl carbonate (EMC) and diethyl carbonate (DEC) (in a volume ratio of 1:1:1), was mixed in advance, and then $LiPF_6$ and $LiN(SO_2CF_3)_2$, as lithium salts, were added so as to attain each concentration thereof of 1.1 mol/L and 0.1 mol/L, respectively, to prepare the standard electrolytic solution 2.

It should be noted that, in this preparation, as for the addition of $LiPF_6$, so that liquid temperature does not exceed 30° C., firstly 30% by weight of the total $LiPF_6$ was added and dissolved in the mixed solvent, mixed in advance, and then an operation of adding and dissolving 30% by weight of the total $LiPF_6$ was repeated twice, and finally the remaining 10% by weight of $LiPF_6$ was added and dissolved. After that by still more adding and dissolving $LiN(SO_2CF_3)_2$ in a predetermined amount, the standard electrolytic solution 2 was prepared. Maximum liquid temperature at (A) the non-aqueous solvent mixing step and (B) the lithium salt dissolving step, in preparation of the standard electrolytic solution 2, was 21° C. and 26° C., respectively.

ii) Preparation of the Non-aqueous Electrolytic Solution 2

Then, by adding the methylenebissulfonate derivative relevant to the present invention, described in the following Table 6, in a predetermined amount, into the standard electrolytic solution 2 obtained in i), non-aqueous electrolytic solutions 2-1 to 2-30 were prepared.

In addition, a non-aqueous electrolytic solutions 2-31 not added with the methylenebissulfonate derivative relevant to the present invention (blank: the standard electrolytic solution 2), was adopted as Comparative Example. Moisture value and free acid value after preparation of the non-aqueous electrolytic solutions are shown together in Table 6.

TABLE 6

| Non-aqueous electrolytic solution No. | Compound No. | Addition amount thereof (%) | Maximum liquid temperature of non-aqueous electrolytic solution at compound dissolution step (C) | Moisture and free acid of non-aqueous electrolytic solution after preparation | |
|---|---|---|---|---|---|
| | | | | Moisture | Free acid |
| 2-1 | Compound No. 1 | 0.05 | 24° C. | 4 ppm | 23 ppm |
| 2-2 | | 0.1 | 23° C. | 3 ppm | 24 ppm |
| 2-3 | | 0.2 | 24° C. | 3 ppm | 25 ppm |
| 2-4 | | 0.5 | 25° C. | 5 ppm | 25 ppm |
| 2-5 | | 1.0 | 25° C. | 4 ppm | 26 ppm |
| 2-6 | | 2.0 | 25° C. | 4 ppm | 29 ppm |
| 2-7 | Compound No. 4 | 0.05 | 23° C. | 4 ppm | 22 ppm |
| 2-8 | | 0.1 | 23° C. | 3 ppm | 24 ppm |
| 2-9 | | 0.2 | 24° C. | 3 ppm | 25 ppm |
| 2-10 | | 0.5 | 25° C. | 5 ppm | 23 ppm |
| 2-11 | | 1.0 | 24° C. | 4 ppm | 26 ppm |
| 2-12 | | 2.0 | 25° C. | 3 ppm | 36 ppm |
| 2-13 | Compound No. 12 | 0.05 | 23° C. | 4 ppm | 21 ppm |
| 2-14 | | 0.1 | 23° C. | 3 ppm | 24 ppm |
| 2-15 | | 0.2 | 24° C. | 3 ppm | 25 ppm |
| 2-16 | | 0.5 | 25° C. | 5 ppm | 24 ppm |
| 2-17 | | 1.0 | 25° C. | 4 ppm | 27 ppm |
| 2-18 | | 2.0 | 25° C. | 4 ppm | 30 ppm |
| 2-19 | Compound No. 15 | 0.05 | 23° C. | 4 ppm | 22 ppm |
| 2-20 | | 0.1 | 23° C. | 3 ppm | 25 ppm |
| 2-21 | | 0.2 | 24° C. | 3 ppm | 25 ppm |
| 2-22 | | 0.5 | 25° C. | 5 ppm | 23 ppm |
| 2-23 | | 1.0 | 24° C. | 4 ppm | 24 ppm |
| 2-24 | | 2.0 | 25° C. | 3 ppm | 36 ppm |
| 2-25 | Compound No. 17 | 0.05 | 23° C. | 4 ppm | 22 ppm |
| 2-26 | | 0.1 | 23° C. | 3 ppm | 25 ppm |
| 2-27 | | 0.2 | 24° C. | 3 ppm | 25 ppm |
| 2-28 | | 0.5 | 25° C. | 5 ppm | 23 ppm |
| 2-29 | | 1.0 | 24° C. | 4 ppm | 24 ppm |
| 2-30 | | 2.0 | 25° C. | 3 ppm | 36 ppm |
| 2-31 | None | — | 23° C. | 3 ppm | 20 ppm |

[Comparison of Battery Characteristics Between the Laminated Batteries]

Characteristics evaluation results, after storage at high temperature, of the laminated batteries using each non-aqueous electrolytic solution shown in Table 6, and prepared by performing similar operation as in Examples 1-1 to 1-14, and cycle characteristics evaluation results at 25° C. are shown together in Table 7.

It should be noted that measurement characteristics after storage of the laminated battery at high temperature is shown below.

a) Charging after leaving still for one week the laminated battery prepared by using each of the above non-aqueous electrolytic solutions (charging at the first cycle);

Charging at 30 mA up to 4.2 V, and then shifting to constant voltage charging from 4.2 V to complete charging when 5 hours have passed in total.

b) Discharging at the first cycle;

Discharging at 30 mA down to 3.0 V after the above charging.

c) Charge-discharge condition at the second cycle, the third cycle and the fourth cycle;

Charging at 30 mA up to 4.2 V, then shifting to constant voltage charging from 4.2 V to complete charging when 6 hours have passed in total. After that, discharge was performed at 30 mA down to 3.0 V. This operation was repeated three times in total.

d) Characteristic after storage at high temperature (charge-discharge condition at the fifth cycle and the sixth cycle);

As for characteristic after storage of the laminated battery at high temperature (charge-discharge condition at the fifth cycle), by charging under the same charging condition as in the above c), and then storing at 85° C. for 24 hours, and discharging under the same discharging condition as in the above c) at 25° C., capacity retention rate was calculated by the following equation:

Capacity retention rate=(discharge capacity at the fifth cycle/discharge capacity at the fourth cycle)×100 (%).

Still more, capacity recovery rate was calculated by the following equation, by performing charge-discharge, one cycle under the same condition as in the second to the fourth cycles at normal temperature:

Capacity recovery rate=(discharge capacity at the sixth cycle/discharge capacity at the fourth cycle)×100(%).

[Evaluation of Blister of a Cell During Storage at High Temperature]

Blister of a cell in a laminated battery was measured based on volume change when the cell was immersed in silicone oil. Volume of the laminated battery was measured before and after a storage test at high temperature, after cooling to room temperature state, and the volume change rate was adopted as blister of the cell during storage. Results thereof are shown together in Table 7.

TABLE 7

|  | | | Evaluation result in laminated battery | | | |
|---|---|---|---|---|---|---|
|  | Non-aqueous electrolytic solution No. | Methylene bissulfonate/ EC (wt. ratio) | Capacity retention rate (%) | Capacity recovery rate (%) | Cell blister (%) | Capacity retention rate after 100 cycles at 25° C. (%) |
| Example 2-1 | 2-1 | 0.001 | 80.8 | 90.3 | 123.4 | 89.4 |
| Example 2-2 | 2-2 | 0.003 | 81.3 | 91.3 | 121.2 | 90.4 |
| Example 2-3 | 2-3 | 0.006 | 82.1 | 91.9 | 121.0 | 91.0 |
| Example 2-4 | 2-4 | 0.015 | 81.7 | 91.4 | 122.3 | 90.8 |
| Example 2-5 | 2-5 | 0.029 | 81.1 | 91.2 | 123.2 | 90.5 |
| Example 2-6 | 2-6 | 0.059 | 80.9 | 90.8 | 126.4 | 89.3 |
| Example 2-7 | 2-7 | 0.001 | 80.7 | 90.2 | 123.6 | 89.4 |
| Example 2-8 | 2-8 | 0.003 | 81.2 | 91.1 | 121.5 | 90.3 |
| Example 2-9 | 2-9 | 0.006 | 81.9 | 91.7 | 121.1 | 91.1 |
| Example 2-10 | 2-10 | 0.015 | 81.5 | 91.3 | 122.5 | 90.9 |
| Example 2-11 | 2-11 | 0.029 | 81.0 | 91.0 | 123.4 | 90.6 |
| Example 2-12 | 2-12 | 0.059 | 80.8 | 90.4 | 125.8 | 89.3 |
| Example 2-13 | 2-13 | 0.001 | 80.8 | 90.3 | 123.4 | 89.4 |
| Example 2-14 | 2-14 | 0.003 | 81.3 | 91.3 | 121.2 | 90.4 |
| Example 2-15 | 2-15 | 0.006 | 82.0 | 91.9 | 121.0 | 90.9 |
| Example 2-16 | 2-16 | 0.015 | 81.6 | 91.4 | 122.3 | 90.7 |
| Example 2-17 | 2-17 | 0.029 | 81.1 | 91.2 | 123.2 | 90.5 |
| Example 2-18 | 2-18 | 0.059 | 80.9 | 90.8 | 126.4 | 89.3 |
| Example 2-19 | 2-19 | 0.001 | 80.5 | 90.1 | 123.7 | 89.2 |
| Example 2-20 | 2-20 | 0.003 | 81.1 | 91.2 | 121.7 | 90.2 |
| Example 2-21 | 2-21 | 0.006 | 81.7 | 91.6 | 120.9 | 90.7 |
| Example 2-22 | 2-22 | 0.015 | 81.2 | 91.1 | 122.2 | 90.4 |
| Example 2-23 | 2-23 | 0.029 | 80.8 | 90.7 | 123.2 | 90.2 |
| Example 2-24 | 2-24 | 0.059 | 80.3 | 90.2 | 126.9 | 89.2 |
| Example 2-25 | 2-25 | 0.001 | 80.5 | 90.1 | 123.7 | 89.0 |
| Example 2-26 | 2-26 | 0.003 | 81.1 | 91.2 | 121.7 | 90.0 |
| Example 2-27 | 2-27 | 0.006 | 81.7 | 91.4 | 121.4 | 90.3 |
| Example 2-28 | 2-28 | 0.015 | 81.8 | 91.6 | 121.0 | 90.6 |
| Example 2-29 | 2-29 | 0.029 | 80.8 | 90.7 | 123.2 | 90.2 |
| Example 2-30 | 2-30 | 0.059 | 80.3 | 90.2 | 126.9 | 89.2 |
| Comparative Example 2-1 | 2-31 | — | 74.7 | 87.0 | 133.7 | 79.7 |

*EC = Ethylene carbonate

As shown in Table 7, it is understood that the laminated batteries using the non-aqueous electrolytic solution of the present invention (Examples 2-1 to 2-30) show good results in capacity retention rate, capacity recovery rate of the battery and blister of a cell, after storage at 85° C. for 24 hours, as compared with the laminated battery of the Comparative Example 2-1. In addition, also in evaluation result of cycle characteristics, it is clear that the non-aqueous electrolytic solution of the present invention exhibits good characteristics.

Examples 2-31 to 2-38 and Comparative Examples 2-2 to 2-5

Examples 2-31 to 2-32

A negative electrode was prepared using Sn powder as a raw material of a negative electrode active material, instead of the negative electrode active material used in Example 2-4 and Example 2-16. A negative electrode mixture slurry was prepared by mixing 78 parts by mass of Sn powder, 15 parts by mass of acetylene black as a conductive agent, which was added, uniformly dispersed and mixed into a solution, where 7 parts by mass of polyvinylidene fluoride (PVDF), as a binding agent, was dissolved in 1-methyl-2-pyroridone, in advance. A laminated battery was prepared and battery evaluation was performed (as the non-aqueous electrolytic solution, the non-aqueous electrolytic solutions No. 2-4 (containing 0.5% by weight of Compound No. 1) and No. 2-16 (containing 0.5% by weight of Compound No. 12) were used) by performing operation similarly as in Example 2-4, except that this negative electrode mixture slurry was coated onto a negative electrode collector made of a copper foil, dried, and then compression molded under pressure, cutting to a predetermined size to prepare a band-like negative electrode. It should be noted that battery evaluation was performed under similar evaluation condition as in Example 2-4, except that charging termination voltage was set at 4.2 V, and discharging termination voltage was set at 2.5 V. Cycle characteristics at 25° C. of the laminated battery are shown in Table 8.

Comparative Example 2-2

A laminated battery was prepared similarly as in Example 2-31, except that the one not added with the methylenebissulfonate derivative relevant to the present invention (the non-aqueous electrolytic solution No. 2-31 (not added with the compound)) was used, as the non-aqueous electrolytic solution, and battery evaluation was performed. An evaluation result of cycle characteristics at 25° C. of the laminated battery is shown together in Table 8.

TABLE 8

|  | Non-aqueous electrolytic solution No. | Evaluation result in laminated battery (Capacity retention rate after 100 cycles at 25° C. (%)) |
| --- | --- | --- |
| Example 2-31 | 2-4 | 86.6 |
| Example 2-32 | 2-16 | 86.3 |
| Comparative Example 2-2 | 2-31 | 69.6 |

Examples 2-33 to 2-34

A positive electrode was prepared using $LiFePO_4$, instead of the positive electrode active material used in Examples 2-3 and 2-15. A positive electrode mixture slurry was prepared by mixing 90 parts by mass of $LiFePO_4$ powder, 5 parts by mass of acetylene black as a conductive agent, which was added, uniformly dispersed and mixed into a solution, where 5 parts by mass of polyvinylidene fluoride (PVDF), as a binding agent, was dissolved in 1-methyl-2-pyroridone, in advance. A laminated battery was prepared and battery evaluation was performed (as the non-aqueous electrolytic solution, the non-aqueous electrolytic solution No. 2-3 (containing 0.2% by weight of Compound No. 1) and No. 2-15 (containing 0.2% by weight of Compound No. 12) were used) similarly as in Example 2-3, except that this positive electrode mixture slurry was coated onto a positive electrode collector made of an aluminum foil, dried, and then compression molded under pressure, cutting to a predetermined size to prepare a band-like positive electrode. It should be noted that battery evaluation was performed under similar evaluation condition as in Example 2-3, except that charging termination voltage was set at 3.6 V, and discharging termination voltage was set at 2.0 V. Result thereof is shown in Table 9.

Comparative Example 2-3

A laminated battery was prepared similarly as in Example 2-33, except that the one not added with the methylenebissulfonate derivative relevant to the present invention (the non-aqueous electrolytic solution No. 2-31 (not added with the compound)) was used, as the non-aqueous electrolytic solution, and battery evaluation was performed. An evaluation result of cycle characteristics at 25° C. of the laminated battery is shown together in Table 9.

TABLE 9

|  | Non-aqueous electrolytic solution No. | Evaluation result in laminated battery using $LiFePO_4$ positive electrode (Capacity retention rate after 100 cycles at 25° C. (%)) |
| --- | --- | --- |
| Example 2-33 | 2-3 | 87.3 |
| Example 2-34 | 2-15 | 87.4 |
| Comparative Example 2-3 | 2-31 | 69.6 |

Examples 2-35 to 2-36

A positive electrode was prepared using $Li[Mn_{0.2}Ni_{0.6}Co_{0.2}]$, instead of the positive electrode active material used in Examples 2-3 and 2-15. A positive electrode mixture slurry was prepared by mixing 92 parts by mass of $Li[Mn_{0.2}Ni_{0.6}Co_{0.2}]$ powder, 4 parts by mass of acetylene black as a conductive agent, which was added, uniformly dispersed and mixed into a solution, where 4 parts by mass of polyvinylidene fluoride (PVDF), as a binding agent, was dissolved in 1-methyl-2-pyroridone, in advance. A laminated battery was prepared and battery evaluation was performed (as the non-aqueous electrolytic solution, the non-aqueous electrolytic solution No. 2-3 (containing 0.2% by weight of Compound No. 1) and No. 2-15 (containing 0.2% by weight of Compound No. 12) were used) similarly as in Example 2-3, except that this positive electrode mixture slurry was coated onto a positive electrode collector made of an aluminum foil, dried, and then compression molded under pressure, cutting to a predetermined size to prepare a band-like positive electrode, and then, an electrode group was prepared by opposing the positive electrode and a negative electrode, via arrangement of a polypropylene side of a separator made of a microporous polypropylene-polyethylene two-layer film, at the positive electrode side. It should be noted that battery evaluation was performed under similar evaluation condition as in Example 2-3, except that charging termination voltage was set at 4.3 V, and discharging termination voltage was set at 3.0 V. Result thereof is shown in Table 10.

Comparative Example 2-4

A laminated battery was prepared similarly as in Example 2-35, except that the one not added with the methylenebissulfonate derivative relevant to the present invention (the non-aqueous electrolytic solution No. 2-31 (not added with the compound)) was used, as the non-aqueous electrolytic solution, and battery evaluation was performed. An evaluation result of cycle characteristics at 25° C. of the laminated battery is shown together in Table 10.

TABLE 10

| | Non-aqueous electrolytic solution No. | Evaluation result in laminated battery using Li[$Mn_{0.2}Ni_{0.6}Co_{0.2}$]$O_2$ positive electrode (Capacity retention rate after 100 cycles at 25° C. (%)) |
|---|---|---|
| Example 2-35 | 2-3 | 86.2 |
| Example 2-36 | 2-15 | 86.4 |
| Comparative Example 2-4 | 2-31 | 69.1 |

Example 2-37 to Example 2-38

A positive electrode was prepared using $LiMn_{1.95}Al_{0.05}O_4$, instead of the positive electrode active material used in Example 2-15. A positive electrode mixture slurry was prepared by mixing 92 parts by mass of $LiMn_{1.95}Al_{0.05}O_4$ powder, 4 parts by mass of acetylene black as a conductive agent, which was added, uniformly dispersed and mixed into a solution, where 4 parts by mass of polyvinylidene fluoride (PVDF), as a binding agent, was dissolved in 1-methyl-2-pyroridone, in advance. A laminated battery was prepared and battery evaluation was performed (as the non-aqueous electrolytic solution, the non-aqueous electrolytic solution No. 2-3 (containing 0.2% by weight of Compound No. 1) and No. 2-15 (containing 0.2% by weight of Compound No. 2) were used) similarly as in Example 2-3, except that this positive electrode mixture slurry was coated onto a positive electrode collector made of an aluminum foil, dried, and then compression molded, cutting to a predetermined size to prepare a band-like positive electrode. It should be noted that battery evaluation was performed under similar evaluation condition as in Example 2-3, except that charging termination voltage was set at 4.2 V, and discharging termination voltage was set at 3.0 V. Result thereof is shown in Table 11.

Comparative Example 2-5

A laminated battery was prepared similarly as in Example 2-35, except that the one not added with the methylenebissulfonate derivative relevant to the present invention (the non-aqueous electrolytic solution No. 2-31 (not added with the compound)) was used, as the non-aqueous electrolytic solution, and battery evaluation was performed. An evaluation result of cycle characteristics at 25° C. of the laminated battery is shown together in Table 11.

TABLE 11

| | Non-aqueous electrolytic solution No. | Evaluation result in laminated battery using $LiMn_{1.95}Al_{0.05}O_4$ positive electrode (Capacity retention rate after 100 cycles at 25° C. (%)) |
|---|---|---|
| Example 2-37 | 2-3 | 88.4 |
| Example 2-38 | 2-15 | 88.6 |
| Comparative Example 2-5 | 2-31 | 70.3 |

As is clear from the results of Tables 8 to 11, it is understood that the laminate batteries using the non-aqueous electrolytic solution of the present invention (Example 2-31 to Example 2-38) exhibit significant capacity retention rate after 100 cycles at 25° C., as compared with the case where each battery of Comparative Examples 2-1 to 2-5 was used.

In addition, from comparison results of Examples 2-31 to 2-32 and Comparative Example 2-1, Examples 2-33 to 2-34 and Comparative Example 2-2, Examples 2-35 to 2-36 and Comparative Example 2-3, and Examples 2-37 to 2-38 and Comparative Example 2-5, in any case of using Sn as the negative electrode, a lithium-containing olivine-type iron phosphate, a lithium transition metal complex oxide having lamella structure, containing manganese, nickel and cobalt, and a lithium-manganese complex oxide having a spinel structure, as the positive electrode, it is understood that the non-aqueous electrolytic solution of the present invention exhibits similar effect as in Examples 2-1 to 2-30. That is, it is clear that the non-aqueous electrolytic solution of the present invention and a battery using this provide improvement effect of cycle characteristics not depending on a specific positive electrode or negative electrode.

According to the production method for the non-aqueous electrolytic solution of the present invention, by performing preparing steps in the order of the above (A), (B) and (C), and by suppressing temperature increase so that temperature of the non-aqueous electrolytic solution does not exceed 30° C., even in the case of, for example, heating and dissolving ethylene carbonate and mixing with other low viscosity solvent, in a liquid state, generation of a free acid such as hydrogen fluoride (HF) or the like can be suppressed, and deterioration of the non-aqueous electrolytic solution can be prevented, thus quality thereof can be maintained and a good non-aqueous electrolytic solution can be provided.

Examples 3-1 to 3-45 i) Preparation of the Non-aqueous Electrolytic Solution 3

By adding the methylenebissulfonate derivative relevant to the present invention, described in the following Table 12, and negative electrode film forming agent in a predetermined amount, into the above standard electrolytic solution 1, non-aqueous electrolytic solutions 3-1 to 3-45 were prepared. Moisture value and free acid value after preparation of the non-aqueous electrolytic solutions are shown together in Table 12.

TABLE 12

| Non-aqueous electrolytic solution No. | Compound No. | Addition amount thereof (%) | Negative electrode film forming agent | Addition amount thereof (%) | Maximum liquid temperature of non-aqueous electrolytic solution at compound dissolution step (C.) | Moisture and free acid of non-aqueous electrolytic solution after preparation | |
|---|---|---|---|---|---|---|---|
| | | | | | | Moisture | Free acid |
| 3-1 | Compound No. 1 | 0.2 | None | 0.0 | 25° C. | 4 ppm | 24 ppm |
| 3-2 | | | Vinylene carbonate | 0.5 | 24° C. | 3 ppm | 21 ppm |
| 3-3 | | | | 1.0 | 25° C. | 3 ppm | 23 ppm |
| 3-4 | | | | 1.5 | 24° C. | 5 ppm | 22 ppm |
| 3-5 | | | | 2.0 | 23° C. | 4 ppm | 22 ppm |
| 3-6 | Compound No. 4 | 0.2 | None | 0.0 | 23° C. | 4 ppm | 22 ppm |
| 3-7 | | | Vinylene carbonate | 0.5 | 24° C. | 3 ppm | 20 ppm |
| 3-8 | | | | 1.0 | 25° C. | 3 ppm | 21 ppm |
| 3-9 | | | | 1.5 | 24° C. | 4 ppm | 20 ppm |
| 3-10 | | | | 2.0 | 23° C. | 4 ppm | 24 ppm |
| 3-11 | Compound No. 12 | 0.2 | None | 0.0 | 22° C. | 4 ppm | 24 ppm |
| 3-12 | | | Vinylene carbonate | 0.5 | 24° C. | 3 ppm | 20 ppm |
| 3-13 | | | | 1.0 | 22° C. | 3 ppm | 21 ppm |
| 3-14 | | | | 1.5 | 23° C. | 4 ppm | 22 ppm |
| 3-15 | | | | 2.0 | 22° C. | 3 ppm | 23 ppm |
| 3-16 | Compound No. 13 | 0.2 | None | 0.0 | 22° C. | 4 ppm | 24 ppm |
| 3-17 | | | Vinylene carbonate | 0.5 | 24° C. | 3 ppm | 23 ppm |
| 3-18 | | | | 1.0 | 23° C. | 4 ppm | 21 ppm |
| 3-19 | | | | 1.5 | 24° C. | 5 ppm | 23 ppm |
| 3-20 | | | | 2.0 | 22° C. | 3 ppm | 25 ppm |
| 3-21 | Compound No. 15 | 0.2 | None | 0.0 | 22° C. | 4 ppm | 24 ppm |
| 3-22 | | | Vinylene carbonate | 0.5 | 24° C. | 3 ppm | 23 ppm |
| 3-23 | | | | 1.0 | 23° C. | 4 ppm | 21 ppm |
| 3-24 | | | | 1.5 | 24° C. | 5 ppm | 23 ppm |
| 3-25 | | | | 2.0 | 22° C. | 3 ppm | 25 ppm |
| 3-26 | Compound No. 1 | 0.2 | Fluoroethylene carbonate | 1.0 | 22° C. | 4 ppm | 32 ppm |
| 3-27 | | | | 2.0 | 24° C. | 3 ppm | 33 ppm |
| 3-28 | | | | 3.0 | 23° C. | 4 ppm | 34 ppm |
| 3-29 | | | | 4.0 | 24° C. | 5 ppm | 36 ppm |
| 3-30 | Compound No. 4 | 0.2 | Fluoroethylene carbonate | 1.0 | 23° C. | 4 ppm | 34 ppm |
| 3-31 | | | | 2.0 | 24° C. | 5 ppm | 33 ppm |
| 3-32 | | | | 3.0 | 25° C. | 4 ppm | 36 ppm |
| 3-33 | | | | 4.0 | 24° C. | 5 ppm | 35 ppm |
| 3-34 | Compound No. 12 | 0.2 | Fluoroethylene carbonate | 1.0 | 23° C. | 4 ppm | 32 ppm |
| 3-35 | | | | 2.0 | 24° C. | 3 ppm | 31 ppm |
| 3-36 | | | | 3.0 | 23° C. | 4 ppm | 35 ppm |
| 3-37 | | | | 4.0 | 24° C. | 5 ppm | 34 ppm |
| 3-38 | Compound No. 13 | 0.2 | Fluoroethylene carbonate | 1.0 | 24° C. | 4 ppm | 32 ppm |
| 3-39 | | | | 2.0 | 25° C. | 5 ppm | 34 ppm |
| 3-40 | | | | 3.0 | 26° C. | 4 ppm | 36 ppm |
| 3-41 | | | | 4.0 | 25° C. | 6 ppm | 35 ppm |
| 3-42 | Compound No. 15 | 0.2 | Fluoroethylene carbonate | 1.0 | 24° C. | 4 ppm | 31 ppm |
| 3-43 | | | | 2.0 | 25° C. | 5 ppm | 32 ppm |
| 3-44 | | | | 3.0 | 26° C. | 4 ppm | 32 ppm |
| 3-45 | | | | 4.0 | 25° C. | 6 ppm | 31 ppm |

[Comparison of Battery Characteristics Between the Laminated Batteries]

Laminated batteries were prepared using each non-aqueous electrolytic solution shown in Table 12, similarly as in the above Examples 2-1 to 2-30. Evaluation results of charge-discharge efficiency at the first cycle, characteristics after storage at high temperature and cycle characteristics at 25° C. of the laminated batteries are shown together in Tables 13 to 14.

It should be noted that measurement characteristics after storage of the laminated battery at high temperature is shown below.

a) Charging after leaving still for one week the laminated battery prepared by using each of the above non-aqueous electrolytic solutions (charging at the first cycle);

Charging at 30 mA up to 4.2 V, and then shifting to constant voltage charging from 4.2 V to complete charging when 5 hours have passed in total.

b) Discharging at the first cycle;

Discharging at 30 mA down to 3.0 V after the above charging.

c) Charge-discharge condition at the second cycle, the third cycle, and the fourth cycle;

Charging at 30 mA up to 4.2 V, then shifting to constant voltage charging from 4.2 V to complete charging when 6 hours have passed in total. After that, discharge was performed at 30 mA down to 3.0 V. This operation was repeated three times in total.

d) Characteristic after storage at high temperature (charge-discharge condition at the fifth cycle and the sixth cycle);

As for characteristic after storage of the laminated battery at high temperature (charge-discharge condition at the fifth cycle), charging under the same charging condition as in the above c), and then storing at 85° C. for 24 hours, and discharging under the same discharging condition as in the above c) at 25° C. were performed.

It should be noted that charge-discharge efficiency at the first cycle of the laminated battery prepared was calculated by the following equation:

Charge-discharge efficiency at the first cycle=(charge capacity at the first cycle/discharge capacity at the first cycle)×100(%).

Here, charge capacity at the first cycle was calculated by the following equation:

Charge capacity at the first cycle=(charge capacity in constant current charging for 90 minutes after poring and impregnating the non-aqueous electrolytic solution in preparation of the laminated battery+charge capacity after standing still at room temperature for one week).

Characteristic after storage of the laminated battery at high temperature was calculated by the following equation:

Capacity retention rate=(discharge capacity at the fifth cycle/discharge capacity at the fourth cycle)×100 (%).

Still more, capacity recovery rate was calculated by the following equation, by performing charge-discharge, one cycle under the same condition as in the fifth cycle at normal temperature:

Capacity recovery rate=(discharge capacity at the sixth cycle/discharge capacity at the fourth cycle)×100(%)

TABLE 13

| | | | Evaluation result in laminated battery | | | | |
|---|---|---|---|---|---|---|---|
| | | | Charge- | after storage at 85° C., 24 h | | | Capacity |
| | Non-aqueous electrolytic solution No. | Methylene bissulfonate/ EC (wt. ratio) | discharge efficiency at 1st cycle (%) | Capacity retention rate (%) | Capacity recovery rate (%) | Cell blister (%) | retention rate after 100 cycles at 25° C. (%) |
| Example 3-1 | 3-1 | 0.006 | 92.6 | 82.2 | 91.9 | 119.4 | 91.0 |
| Example 3-2 | 3-2 | | 93.6 | 83.0 | 93.2 | 121.0 | 92.2 |
| Example 3-3 | 3-3 | | 94.1 | 83.6 | 93.7 | 121.6 | 93.0 |
| Example 3-4 | 3-4 | | 93.4 | 83.1 | 93.1 | 123.0 | 92.6 |
| Example 3-5 | 3-5 | | 93.1 | 82.2 | 92.1 | 124.2 | 92.2 |
| Example 3-6 | 3-6 | 0.006 | 92.4 | 81.8 | 91.6 | 120.9 | 90.7 |
| Example 3-7 | 3-7 | | 93.5 | 82.6 | 92.7 | 121.9 | 91.8 |
| Example 3-8 | 3-8 | | 93.9 | 83.1 | 93.4 | 122.5 | 92.6 |
| Example 3-9 | 3-9 | | 93.1 | 82.7 | 92.9 | 123.8 | 92.3 |
| Example 3-10 | 3-10 | | 92.8 | 82.0 | 91.7 | 124.5 | 91.8 |
| Example 3-11 | 3-11 | 0.006 | 92.5 | 82.1 | 91.8 | 119.6 | 90.9 |
| Example 3-12 | 3-12 | | 93.6 | 82.8 | 92.9 | 121.9 | 92.3 |
| Example 3-13 | 3-13 | | 93.9 | 83.4 | 93.7 | 121.7 | 92.9 |
| Example 3-14 | 3-14 | | 93.2 | 82.9 | 93.0 | 123.1 | 92.6 |
| Example 3-15 | 3-15 | | 92.9 | 82.0 | 92.0 | 124.3 | 92.4 |
| Example 3-16 | 3-16 | 0.006 | 92.1 | 82.1 | 91.8 | 120.8 | 90.8 |
| Example 3-17 | 3-17 | | 93.1 | 82.7 | 93.0 | 121.7 | 91.9 |
| Example 3-18 | 3-18 | | 93.7 | 83.3 | 93.6 | 122.2 | 92.7 |
| Example 3-19 | 3-19 | | 93.1 | 82.8 | 93.1 | 123.6 | 92.5 |
| Example 3-20 | 3-20 | | 92.7 | 82.1 | 91.9 | 124.7 | 92.1 |
| Example 3-21 | 3-21 | 0.006 | 92.3 | 82.2 | 91.8 | 119.6 | 90.9 |
| Example 3-22 | 3-22 | | 93.3 | 82.7 | 93.1 | 121.0 | 92.2 |
| Example 3-23 | 3-23 | | 93.8 | 83.2 | 93.6 | 121.7 | 92.9 |
| Example 3-24 | 3-24 | | 93.2 | 83.0 | 93.1 | 123.1 | 92.6 |
| Example 3-25 | 3-25 | | 92.8 | 82.1 | 92.2 | 124.3 | 92.3 |

TABLE 14

| | | | Evaluation result in laminated battery | | | | |
|---|---|---|---|---|---|---|---|
| | | | Charge- | after storage at 85° C., 24 h | | | Capacity |
| | Non-aqueous electrolytic solution No. | Methylene bissulfonate/ EC (wt. ratio) | discharge efficiency at 1st cycle (%) | Capacity retention rate (%) | Capacity recovery rate (%) | Cell blister (%) | retention rate after 100 cycles at 25° C. (%) |
| Example 3-26 | 3-26 | 0.006 | 93.1 | 82.6 | 92.7 | 122.0 | 91.7 |
| Example 3-27 | 3-27 | | 93.8 | 83.2 | 93.4 | 122.6 | 92.4 |
| Example 3-28 | 3-28 | | 93.3 | 82.9 | 92.9 | 123.9 | 92.1 |
| Example 3-29 | 3-29 | | 92.9 | 82.3 | 91.7 | 124.6 | 91.7 |
| Example 3-30 | 3-30 | 0.006 | 93.0 | 82.5 | 92.8 | 122.0 | 91.7 |
| Example 3-31 | 3-31 | | 93.7 | 83.1 | 93.5 | 122.6 | 92.4 |
| Example 3-32 | 3-32 | | 93.1 | 82.7 | 93.1 | 123.9 | 92.1 |
| Example 3-33 | 3-33 | | 92.9 | 82.0 | 91.9 | 124.6 | 91.7 |
| Example 3-34 | 3-34 | 0.006 | 93.4 | 82.6 | 92.9 | 121.0 | 92.1 |
| Example 3-35 | 3-35 | | 94.0 | 83.5 | 93.7 | 121.7 | 92.8 |
| Example 3-36 | 3-36 | | 93.3 | 82.9 | 92.9 | 123.2 | 92.5 |
| Example 3-37 | 3-37 | | 93.0 | 82.2 | 92.0 | 124.8 | 92.0 |
| Example 3-38 | 3-38 | 0.006 | 93.2 | 82.5 | 92.7 | 121.9 | 91.8 |
| Example 3-39 | 3-39 | | 93.8 | 83.0 | 93.4 | 122.5 | 92.7 |
| Example 3-40 | 3-40 | | 93.1 | 82.6 | 92.9 | 123.6 | 92.4 |
| Example 3-41 | 3-41 | | 92.8 | 81.9 | 91.7 | 125.2 | 92.1 |
| Example 3-42 | 3-42 | 0.006 | 93.2 | 82.4 | 92.9 | 121.0 | 92.1 |
| Example 3-43 | 3-43 | | 93.9 | 83.3 | 93.6 | 121.7 | 92.8 |

TABLE 14-continued

|  | Non-aqueous electrolytic solution No. | Methylene bissulfonate/ EC (wt. ratio) | Evaluation result in laminated battery | | | | |
|---|---|---|---|---|---|---|---|
|  |  |  | Charge- discharge efficiency at 1st cycle (%) | after storage at 85° C., 24 h | | | Capacity retention rate after 100 cycles at 25° C. (%) |
|  |  |  |  | Capacity retention rate (%) | Capacity recovery rate (%) | Cell blister (%) |  |
| Example 3-44 | 3-44 |  | 93.4 | 83.0 | 93.0 | 123.3 | 92.5 |
| Example 3-45 | 3-45 |  | 92.8 | 82.1 | 92.0 | 124.7 | 92.1 |

As is clear from the results of Tables 13 to 14, it is understood that the laminated batteries using the non-aqueous electrolytic solution of the present invention (Examples 3-1 to 3-45) show good charge-discharge efficiency at the first cycle.

In addition, it is understood that they show good characteristics even after storage at 85° C. for 24 hours, in view of capacity retention rate, capacity recovery rate of the battery and blister of a cell. In addition, also in evaluation result of cycle characteristics, it is clear that the non-aqueous electrolytic solution of the present invention exhibits good characteristics.

Still more, it is understood that as the non-aqueous electrolytic solution of the present invention, one added with the negative electrode film forming agent enhances cycle characteristics effect as compared with the one not added therewith. From this result, it is suggested that increase in cycle number by several hundred times exhibits difference in cycle characteristics effect thereof, in comparing the case not added with the negative electrode film forming agent, and the case added with the negative electrode film forming agent.

Examples 4-1 to 4-62 i) Preparation of a Standard Electrolytic Solution 4

The standard electrolytic solution 4 was prepared by operation, step and procedure for liquid temperature in preparation not to exceed 30° C., similarly as in the standard electrolytic solution 2, except that each lithium salt was added so that concentration of $LiPF_6$ becomes 1.15 mol/L, and concentration of $LiN(SO_2CF_3)_2$ becomes 0.05 mol/L, as lithium salts, in the above standard electrolytic solution 2.

ii) Preparation of a Non-aqueous Electrolytic Solution 4

The non-aqueous electrolytic solutions 4-1 to 4-62 were prepared by adding predetermined amount of the methylenebissulfonate derivative relevant to the present invention and the negative electrode film forming agent, described in the following Tables 15 to 17, into the above standard electrolytic solution 4, by similar operation, step and procedure as in the above non-aqueous electrolytic solution 2.

[Comparison of Battery Characteristics Between the Laminated Batteries]

Laminated batteries were prepared using each non-aqueous electrolytic solution shown in the following Tables 15 to 17, similarly as in the above Examples 3-1 to 3-45. Evaluation results of charge-discharge efficiency at the first cycle, characteristics after storage at high temperature and cycle characteristics at 25° C. of the laminated batteries are shown together in Tables 15 to 17, by performing a similar operation as in Examples 3-1 to 3-45. It should be noted that charge-discharge efficiency at the first cycle of the laminated batteries, characteristics after storage at high temperature of the laminated batteries (capacity retention rate, capacity recovery rate) are also calculated similarly as in Examples 3-1 to 3-45.

TABLE 15

|  | Non-aqueous electrolytic solution No. | Compound No. | Addition amount thereof (%) | Negative electrode film forming agent 1 | Addition amount thereof (%) | Evaluation result in laminated battery | | | | |
|---|---|---|---|---|---|---|---|---|---|---|
|  |  |  |  |  |  | Charge- discharge efficiency at 1st cycle (%) | after storage at 85° C., 24 h | | | Capacity retention rate after 100 cycles at 25° C. (%) |
|  |  |  |  |  |  |  | Capacity retention rate (%) | Capacity recovery rate (%) | Cell blister (%) |  |
| Example 4-1 | 4-1 | Compound No. 1 | 0.2 | None | — | 91.8 | 81.3 | 91.3 | 121.3 | 90.7 |
| Example 4-2 | 4-2 |  |  | Trifluoro acetic acid anhydride | 0.1 | 92.9 | 82.1 | 92.1 | 122.1 | 91.4 |
| Example 4-3 | 4-3 |  |  |  | 0.2 | 93.5 | 82.6 | 92.8 | 122.7 | 92.1 |
| Example 4-4 | 4-4 |  |  |  | 1.0 | 92.9 | 82.3 | 92.3 | 124.1 | 91.8 |
| Example 4-5 | 4-5 |  |  |  | 1.5 | 92.7 | 81.6 | 91.3 | 126.0 | 91.1 |
| Example 4-6 | 4-6 | Compound No. 4 | 0.2 | None | — | 91.6 | 81.3 | 91.0 | 121.2 | 90.6 |
| Example 4-7 | 4-7 |  |  | Trifluoro acetic acid anhydride | 0.1 | 92.8 | 81.7 | 91.8 | 122.3 | 91.2 |
| Example 4-8 | 4-8 |  |  |  | 0.2 | 93.3 | 82.4 | 92.5 | 122.9 | 91.9 |
| Example 4-9 | 4-9 |  |  |  | 1.0 | 92.6 | 82.0 | 91.9 | 124.2 | 91.8 |
| Example 4-10 | 4-10 |  |  |  | 1.5 | 92.4 | 81.4 | 91.1 | 126.3 | 91.1 |
| Example 4-11 | 4-11 | Compound No. 12 | 0.2 | None | — | 91.7 | 81.3 | 91.2 | 121.1 | 90.6 |
| Example 4-12 | 4-12 |  |  | Trifluoro acetic acid anhydride | 0.1 | 92.9 | 82.0 | 92.0 | 122.1 | 91.3 |
| Example 4-13 | 4-13 |  |  |  | 0.2 | 93.3 | 82.5 | 92.6 | 122.8 | 92.0 |
| Example 4-14 | 4-14 |  |  |  | 1.0 | 92.7 | 82.2 | 92.2 | 124.1 | 91.8 |
| Example 4-15 | 4-15 |  |  |  | 1.5 | 92.5 | 81.5 | 91.2 | 126.2 | 91.2 |
| Example 4-16 | 4-16 | Compound No. 1 | 0.2 | Hexafluoro glutaric anhydride | 0.1 | 93.1 | 82.3 | 92.3 | 121.9 | 91.6 |
| Example 4-17 | 4-17 |  |  |  | 0.2 | 93.7 | 82.8 | 93.0 | 122.5 | 92.3 |
| Example 4-18 | 4-18 |  |  |  | 1.0 | 93.1 | 82.4 | 92.4 | 124.0 | 91.9 |
| Example 4-19 | 4-19 |  |  |  | 1.5 | 92.9 | 81.8 | 91.5 | 125.8 | 91.3 |
| Example 4-20 | 4-20 | Compound No. 12 | 0.2 | Hexafluoro glutaric anhydride | 0.1 | 93.1 | 82.2 | 92.2 | 121.9 | 91.5 |
| Example 4-21 | 4-21 |  |  |  | 0.2 | 93.5 | 82.7 | 92.8 | 122.6 | 92.2 |
| Example 4-22 | 4-22 |  |  |  | 1.0 | 92.9 | 82.4 | 92.4 | 123.9 | 92.0 |

TABLE 15-continued

| | Non-aqueous electrolytic solution No. | Compound No. | Addition amount thereof (%) | Negative electrode film forming agent 1 | Addition amount thereof (%) | Charge-discharge efficiency at 1st cycle (%) | after storage at 85° C., 24 h Capacity retention rate (%) | Capacity recovery rate (%) | Cell blister (%) | Capacity retention rate after 100 cycles at 25° C. (%) |
|---|---|---|---|---|---|---|---|---|---|---|
| Example 4-23 | 4-23 | | | | 1.5 | 92.7 | 81.6 | 91.3 | 126.1 | 91.3 |
| Example 4-24 | 4-24 | Compound No. 1 | 0.2 | Tetrafluoro phtalic anhydride | 0.1 | 93.2 | 82.4 | 92.4 | 121.8 | 91.7 |
| Example 4-25 | 4-25 | | | | 0.2 | 93.8 | 82.9 | 93.1 | 122.4 | 92.4 |
| Example 4-26 | 4-26 | | | | 1.0 | 93.2 | 82.6 | 92.6 | 123.8 | 92.1 |
| Example 4-27 | 4-27 | | | | 1.5 | 93.0 | 81.8 | 91.5 | 125.8 | 91.3 |

TABLE 16

| | Non-aqueous electrolytic solution No. | Compound No. | Addition amount thereof (%) | Negative electrode film forming agent 1 | Addition amount thereof (%) | Charge-discharge efficiency at 1st cycle (%) | after storage at 85° C., 24 h Capacity retention rate (%) | Capacity recovery rate (%) | Cell blister (%) | Capacity retention rate after 100 cycles at 25° C. (%) |
|---|---|---|---|---|---|---|---|---|---|---|
| Example 4-28 | 4-28 | Compound No. 12 | 0.2 | tetrafluoro phthalic anhydride | 0.1 | 93.2 | 82.3 | 92.3 | 121.8 | 91.6 |
| Example 4-29 | 4-29 | | | | 0.2 | 93.6 | 82.8 | 92.9 | 122.5 | 92.3 |
| Example 4-30 | 4-30 | | | | 1.0 | 93.0 | 82.5 | 92.5 | 123.8 | 92.1 |
| Example 4-31 | 4-31 | | | | 1.5 | 92.8 | 81.7 | 91.4 | 126.0 | 91.4 |
| Example 4-32 | 4-32 | Compound No. 1 | 0.2 | 3-fluoro phthalic anhydride | 0.1 | 93.0 | 82.2 | 92.2 | 122.0 | 91.5 |
| Example 4-33 | 4-33 | | | | 0.2 | 93.6 | 82.7 | 92.9 | 122.6 | 92.2 |
| Example 4-34 | 4-34 | | | | 1.0 | 93.0 | 82.4 | 92.4 | 124.0 | 91.9 |
| Example 4-35 | 4-35 | | | | 1.5 | 92.8 | 81.7 | 91.4 | 125.9 | 91.2 |
| Example 4-36 | 4-36 | Compound No. 12 | 0.2 | 3-fluoro phthalic anhydride | 0.1 | 93.0 | 82.1 | 92.1 | 122.0 | 91.4 |
| Example 4-37 | 4-37 | | | | 0.2 | 93.4 | 82.6 | 92.7 | 122.7 | 92.1 |
| Example 4-38 | 4-38 | | | | 1.0 | 92.8 | 82.3 | 92.3 | 124.0 | 91.9 |
| Example 4-39 | 4-39 | | | | 1.5 | 92.6 | 81.6 | 91.3 | 126.1 | 91.3 |
| Example 4-40 | 4-40 | Compound No. 1 | 0.2 | Sccinic anhydride | 0.1 | 93.1 | 82.3 | 92.3 | 121.9 | 91.6 |
| Example 4-41 | 4-41 | | | | 0.2 | 93.8 | 82.9 | 93.1 | 122.4 | 92.4 |
| Example 4-42 | 4-42 | | | | 1.0 | 93.1 | 82.5 | 92.5 | 123.9 | 92.0 |
| Example 4-43 | 4-43 | | | | 1.5 | 93.0 | 81.9 | 91.6 | 125.7 | 91.4 |
| Example 4-44 | 4-44 | Compound No. 12 | 0.2 | Sccinic anhydride | 0.1 | 93.1 | 82.2 | 92.2 | 121.9 | 91.5 |
| Example 4-45 | 4-45 | | | | 0.2 | 93.6 | 82.8 | 92.9 | 122.5 | 92.3 |
| Example 4-46 | 4-46 | | | | 1.0 | 92.9 | 82.4 | 92.4 | 123.9 | 92.0 |
| Example 4-47 | 4-47 | | | | 1.5 | 92.8 | 81.8 | 91.5 | 125.9 | 91.5 |

TABLE 17

| | Non-aqueous electrolytic solution No. | Compound No. | Addition amount thereof (%) | Negative electrode film forming agent 1 | Addition amount thereof (%) | Negative electrode coating film forming agent 2 | Addition amount thereof (%) |
|---|---|---|---|---|---|---|---|
| Example 4-48 | 4-48 | Compound No. 1 | 0.2 | Vinylene carbonate | 1.0 | Hexafluoroglutaric anhydride | 0.2 |
| Example 4-49 | 4-49 | | | Vinylene carbonate | 1.0 | Tetrafluoro phthalic anhydride | 0.2 |
| Example 4-50 | 4-50 | | | Vinylene carbonate | 1.0 | Sccinic anhydride | 0.2 |
| Example 4-51 | 4-51 | | | Vinylene carbonate | 1.0 | Fluoroethylene carbonate | 1.0 |
| Example 4-52 | 4-52 | | | Fluoroethylene carbonate | 2.0 | Tetrafluoro phthalic anhydride | 0.2 |
| Example 4-53 | 4-53 | Compound No. 4 | 0.2 | Vinylene carbonate | 1.0 | Hexafluoroglutaric anhydride | 0.2 |
| Example 4-54 | 4-54 | | | Vinylene carbonate | 1.0 | Tetrafluoro phthalic anhydride | 0.2 |
| Example 4-55 | 4-55 | | | Vinylene carbonate | 1.0 | Sccinic anhydride | 0.2 |
| Example 4-56 | 4-56 | | | Vinylene carbonate | 1.0 | Fluoroethylene carbonate | 1.0 |
| Example 4-57 | 4-57 | | | Fluoroethylene carbonate | 2.0 | Tetrafluoro phthalic anhydride | 0.2 |

TABLE 17-continued

| | | | | Addition amount thereof (%) | Vinylene carbonate | 1.0 | Hexafluoroglutaric anhydride | 0.2 |
|---|---|---|---|---|---|---|---|---|
| Example 4-58 | 4-58 | Compound No. 12 | 0.2 | | Vinylene carbonate | 1.0 | Hexafluoroglutaric anhydride | 0.2 |
| Example 4-59 | 4-59 | | | | Vinylene carbonate | 1.0 | Tetrafluoro phthalic anhydride | 0.2 |
| Example 4-60 | 4-60 | | | | Vinylene carbonate | 1.0 | Sccinic anhydride | 0.2 |
| Example 4-61 | 4-61 | | | | Vinylene carbonate | 1.0 | Fluoroethylene carbonate | 1.0 |
| Example 4-62 | 4-62 | | | | Fluoroethylene carbonate | 2.0 | Tetrafluoro phthalic anhydride | 0.2 |

| | | | Evaluation result in laminated battery | | | | |
|---|---|---|---|---|---|---|---|
| | | | | after storage at 85° C., 24 h | | | Capacity |
| | Negative electrode coating film forming agent 3 | Addition amount thereof (%) | Charge- discharge efficiency at 1st cycle (%) | Capacity retention rate (%) | Capacity recovery rate (%) | Cell blister (%) | retention rate after 100 cycles at 25° C. (%) |
| Example 4-48 | — | — | 93.8 | 83.5 | 93.7 | 122.2 | 92.9 |
| Example 4-49 | — | — | 94.1 | 83.7 | 93.8 | 122.1 | 93.1 |
| Example 4-50 | — | — | 94.0 | 83.6 | 93.8 | 122.5 | 92.9 |
| Example 4-51 | Tetrafluoro phthalic anhydride | 0.2 | 94.7 | 83.8 | 93.9 | 123.0 | 93.2 |
| Example 4-52 | — | — | 94.5 | 83.6 | 93.6 | 122.6 | 92.8 |
| Example 4-53 | — | — | 93.6 | 83.3 | 93.5 | 122.3 | 92.6 |
| Example 4-54 | — | — | 93.9 | 83.4 | 93.6 | 122.2 | 92.9 |
| Example 4-55 | — | — | 93.8 | 83.2 | 93.5 | 122.6 | 92.7 |
| Example 4-56 | Tetrafluoro phthalic anhydride | 0.2 | 94.5 | 83.6 | 93.7 | 123.2 | 93.0 |
| Example 4-57 | — | — | 94.3 | 83.3 | 93.4 | 122.7 | 92.6 |
| Example 4-58 | — | — | 93.7 | 83.4 | 93.6 | 122.3 | 92.7 |
| Example 4-59 | — | — | 94.0 | 83.5 | 93.7 | 122.2 | 92.9 |
| Example 4-60 | — | — | 93.9 | 83.5 | 93.6 | 122.6 | 92.6 |
| Example 4-61 | Tetrafluoro phthalic anhydride | 0.2 | 94.6 | 83.7 | 93.8 | 123.1 | 93.1 |
| Example 4-62 | — | — | 94.4 | 83.5 | 93.4 | 122.5 | 92.7 |

As is clear from the results of Tables 15 to 17, it is understood that the laminated batteries using the non-aqueous electrolytic solution of the present invention (Examples 4-1 to 4-62) show good charge-discharge efficiency at the first cycle. In addition, it is understood that they show good characteristics even after storage at 85° C. for 24 hours, in view of capacity retention rate, capacity recovery rate of the battery and blister of a cell. In addition, also in evaluation result of cycle characteristics, it is clear that the non-aqueous electrolytic solution of the present invention exhibits good characteristics.

Reasons for being able to improve the above battery characteristics are estimated as follows: That is, the methylenebissulfonate derivative relevant to the present invention, together with the negative electrode film forming agent, decomposes at an interface between the non-aqueous electrolytic solution and the negative electrode to form a reactive coating layer having lower resistance.

The non-aqueous electrolytic solution of the present invention, by containing the methylenebissulfonate derivative of the present invention and the negative electrode film forming agent, exhibits effect of decrease in initial irreversible capacity and enhancement of charge-discharge efficiency at the first cycle or the like, due to further suppression of a side reaction such as solvent decomposition in charging at the first cycle. In addition, because of exhibiting also improvement effect of cycle characteristics, increase in cycle number by several hundred times exhibits large difference in characteristics effect thereof.

Examples 5-1 to 5-87 i) Preparation of a Standard Electrolytic Solution 5

The standard electrolytic solution 5 was prepared by operation, step and procedure for liquid temperature in preparation not to exceed 30° C., similarly as in the standard electrolytic solution 2, except that each lithium salt was added so that concentration of $LiPF_6$ becomes 1.2 mol/L, and concentration of $LiBF_4$ becomes 0.02 mol/L, as lithium salts, in the above standard electrolytic solution 2.

ii) Preparation of a Non-aqueous Electrolytic Solution 5

The non-aqueous electrolytic solutions 5-1 to 5-87 were prepared by adding predetermined amount of the methylenebissulfonate derivative relevant to the present invention, the negative electrode film forming agent, and the blister inhibitor described in the following Tables 18 to 21, into the above standard electrolytic solution 5, by similar operation, step and procedure as in the above non-aqueous electrolytic solution 2.

[Comparison of Battery Characteristics Between the Laminated Batteries]

Laminated batteries were prepared using each non-aqueous electrolytic solution shown in the following Tables 18 to 21, similarly as in the above Examples 3-1 to 3-45. Evaluation results of charge-discharge efficiency at the first cycle, characteristics after storage at high temperature and cycle characteristics at 25° C. of the laminated batteries are shown together in Tables 18 to 21, by performing a similar operation as in Examples 3-1 to 3-45. It should be noted that charge-discharge efficiency at the first cycle of the laminated batteries, characteristics after storage at high temperature of the laminated batteries (capacity retention rate, capacity recovery rate) are also calculated similarly as in Examples 3-1 to 3-45.

TABLE 18

| | Non-aqueous electrolytic solution No. | Compound No. | Addition amount thereof (%) | Negative electrode film forming agent | Addition amount thereof (%) | Blister inhibitor | Addition amount thereof (%) |
|---|---|---|---|---|---|---|---|
| Example 5-1 | 5-1 | Compound No. 1 | 0.2 | Vinylene carbonate | 1.0 | None | — |
| Example 5-2 | 5-2 | | | | | γ-butyrolactone | 0.5 |
| Example 5-3 | 5-3 | | | | | | 1.0 |
| Example 5-4 | 5-4 | | | | | | 1.5 |
| Example 5-5 | 5-5 | | | | | | 2.0 |
| Example 5-6 | 5-6 | | | | | | 3.0 |
| Example 5-7 | 5-7 | Compound No. 4 | 0.2 | Vinylene carbonate | 1.0 | None | — |
| Example 5-8 | 5-8 | | | | | γ-butyrolactone | 0.5 |
| Example 5-9 | 5-9 | | | | | | 1.0 |
| Example 5-10 | 5-10 | | | | | | 1.5 |
| Example 5-11 | 5-11 | | | | | | 2.0 |
| Example 5-12 | 5-12 | | | | | | 3.0 |
| Example 5-13 | 5-13 | Compound No. 12 | 0.2 | Vinylene carbonate | 1.0 | None | — |
| Example 5-14 | 5-14 | | | | | γ-butyrolactone | 0.5 |
| Example 5-15 | 5-15 | | | | | | 1.0 |
| Example 5-16 | 5-16 | | | | | | 1.5 |
| Example 5-17 | 5-17 | | | | | | 2.0 |
| Example 5-18 | 5-18 | | | | | | 3.0 |
| Example 5-19 | 5-19 | Compound No. 1 | 0.2 | Vinylene carbonate | 1.0 | γ-valerolactone | 0.5 |
| Example 5-20 | 5-20 | | | | | | 1.0 |
| Example 5-21 | 5-21 | | | | | | 1.5 |
| Example 5-22 | 5-22 | | | | | | 2.0 |
| Example 5-23 | 5-23 | | | | | | 3.0 |
| Example 5-24 | 5-24 | Compound No. 4 | 0.2 | Vinylene carbonate | 1.0 | γ-valerolactone | 0.5 |
| Example 5-25 | 5-25 | | | | | | 1.0 |
| Example 5-26 | 5-26 | | | | | | 1.5 |
| Example 5-27 | 5-27 | | | | | | 2.0 |
| Example 5-28 | 5-28 | | | | | | 3.0 |
| Example 5-29 | 5-29 | Compound No. 12 | 0.2 | Vinylene carbonate | 1.0 | γ-valerolactone | 0.5 |
| Example 5-30 | 5-30 | | | | | | 1.0 |
| Example 5-31 | 5-31 | | | | | | 1.5 |
| Example 5-32 | 5-32 | | | | | | 2.0 |
| Example 5-33 | 5-33 | | | | | | 3.0 |

| | Evaluation result in laminated battery | | | |
|---|---|---|---|---|
| | Charge-discharge efficiency at 1st cycle (%) | after storage at 85° C., 24 h | | Capacity retention rate after 100 cycles at 25° C. (%) |
| | | Capacity retention rate (%) | Capacity recovery rate (%) | Cell blister (%) | |
| Example 5-1 | 93.7 | 82.6 | 92.9 | 123.4 | 92.4 |
| Example 5-2 | 94.2 | 83.4 | 93.5 | 118.9 | 92.6 |
| Example 5-3 | 94.1 | 83.6 | 93.7 | 118.5 | 92.7 |
| Example 5-4 | 94.1 | 83.8 | 93.6 | 118.6 | 92.6 |
| Example 5-5 | 94.0 | 83.5 | 93.5 | 118.8 | 92.4 |
| Example 5-6 | 93.9 | 83.3 | 93.3 | 119.0 | 92.1 |
| Example 5-7 | 93.7 | 82.4 | 92.6 | 123.6 | 92.1 |
| Example 5-8 | 93.9 | 83.0 | 93.4 | 119.0 | 92.2 |
| Example 5-9 | 93.8 | 83.4 | 93.6 | 118.4 | 92.4 |
| Example 5-10 | 93.7 | 83.3 | 93.5 | 118.7 | 92.2 |
| Example 5-11 | 93.6 | 83.1 | 93.3 | 118.9 | 92.0 |
| Example 5-12 | 93.4 | 82.9 | 93.1 | 119.2 | 91.9 |
| Example 5-13 | 93.8 | 82.5 | 92.8 | 123.5 | 92.4 |
| Example 5-14 | 94.1 | 83.3 | 93.5 | 118.8 | 92.7 |
| Example 5-15 | 94.0 | 83.7 | 93.8 | 118.3 | 92.9 |
| Example 5-16 | 94.0 | 83.6 | 93.6 | 118.5 | 92.8 |
| Example 5-17 | 93.9 | 83.4 | 93.5 | 118.7 | 92.5 |
| Example 5-18 | 93.8 | 83.2 | 93.3 | 119.0 | 92.0 |
| Example 5-19 | 94.1 | 83.2 | 93.4 | 119.0 | 92.5 |
| Example 5-20 | 94.0 | 83.4 | 93.6 | 118.6 | 92.6 |
| Example 5-21 | 93.9 | 83.6 | 93.5 | 118.7 | 92.5 |
| Example 5-22 | 93.9 | 83.3 | 93.4 | 118.9 | 92.2 |
| Example 5-23 | 93.8 | 83.1 | 93.1 | 119.2 | 91.9 |
| Example 5-24 | 93.8 | 82.8 | 93.3 | 119.1 | 92.1 |
| Example 5-25 | 93.7 | 83.2 | 93.5 | 118.5 | 92.3 |
| Example 5-26 | 93.6 | 83.1 | 93.4 | 118.8 | 92.1 |
| Example 5-27 | 93.5 | 82.9 | 93.2 | 119.0 | 91.8 |
| Example 5-28 | 93.3 | 82.7 | 92.9 | 119.4 | 91.7 |
| Example 5-29 | 94.0 | 83.1 | 93.4 | 118.9 | 92.6 |
| Example 5-30 | 93.9 | 83.5 | 93.7 | 118.4 | 92.8 |
| Example 5-31 | 93.9 | 83.4 | 93.5 | 118.6 | 92.7 |

TABLE 18-continued

| | | | | | |
|---|---|---|---|---|---|
| Example 5-32 | 93.8 | 83.2 | 93.4 | 118.8 | 92.3 |
| Example 5-33 | 93.7 | 83.0 | 93.1 | 119.2 | 91.8 |

TABLE 19

| | Non-aqueous electrolytic solution No. | Compound No. | Addition amount thereof (%) | Negative electrode film forming agent | Addition amount thereof (%) | Blister inhibitor | Addition amount thereof (%) |
|---|---|---|---|---|---|---|---|
| Example 5-34 | 5-34 | Compound No. 1 | 0.2 | Vinylene carbonate | 1.0 | Hexafluorocyclo-triphosphazene | 0.5 |
| Example 5-35 | 5-35 | | | | | | 1.0 |
| Example 5-36 | 5-36 | | | | | | 1.5 |
| Example 5-37 | 5-37 | | | | | | 2.0 |
| Example 5-38 | 5-38 | | | | | | 3.0 |
| Example 5-39 | 5-39 | Compound No. 4 | 0.2 | Vinylene carbonate | 1.0 | Hexafluorocyclo-triphosphazene | 0.5 |
| Example 5-40 | 5-40 | | | | | | 1.0 |
| Example 5-41 | 5-41 | | | | | | 1.5 |
| Example 5-42 | 5-42 | | | | | | 2.0 |
| Example 5-43 | 5-43 | | | | | | 3.0 |
| Example 5-44 | 5-44 | Compound No. 12 | 0.2 | Vinylene carbonate | 1.0 | Hexafluorocyclo-triphosphazene | 0.5 |
| Example 5-45 | 5-45 | | | | | | 1.0 |
| Example 5-46 | 5-46 | | | | | | 1.5 |
| Example 5-47 | 5-47 | | | | | | 2.0 |
| Example 5-48 | 5-48 | | | | | | 3.0 |
| Example 5-49 | 5-49 | Compound No. 1 | 0.2 | Vinylene carbonate | 1.0 | Ethoxypentafluoro-cyclotriphosphazene | 0.5 |
| Example 5-50 | 5-50 | | | | | | 1.0 |
| Example 5-51 | 5-51 | | | | | | 1.5 |
| Example 5-52 | 5-52 | | | | | | 2.0 |
| Example 5-53 | 5-53 | | | | | | 3.0 |
| Example 5-54 | 5-54 | Compound No. 4 | 0.2 | Vinylene carbonate | 1.0 | Ethoxypentafluoro-cyclotriphosphazene | 0.5 |
| Example 5-55 | 5-55 | | | | | | 1.0 |
| Example 5-56 | 5-56 | | | | | | 1.5 |
| Example 5-57 | 5-57 | | | | | | 2.0 |
| Example 5-58 | 5-58 | | | | | | 3.0 |
| Example 5-59 | 5-59 | Compound No.12 | 0.2 | Vinylene carbonate | 1.0 | Ethoxypentafluoro-cyclotriphosphazene | 0.5 |
| Example 5-60 | 5-60 | | | | | | 1.0 |
| Example 5-61 | 5-61 | | | | | | 1.5 |
| Example 5-62 | 5-62 | | | | | | 2.0 |
| Example 5-63 | 5-63 | | | | | | 3.0 |

| | Evaluation result in laminated battery | | | | |
|---|---|---|---|---|---|
| | Charge-discharge efficiency at 1st cycle (%) | after storage at 85° C., 24 h | | | Capacity retention rate after 100 cycles at 25° C. (%) |
| | | Capacity retention rate (%) | Capacity recovery rate (%) | Cell blister (%) | |
| Example 5-34 | 94.0 | 83.5 | 93.6 | 118.8 | 92.7 |
| Example 5-35 | 93.9 | 83.7 | 93.8 | 118.4 | 92.8 |
| Example 5-36 | 94.0 | 83.9 | 93.7 | 118.5 | 92.7 |
| Example 5-37 | 93.9 | 83.6 | 93.6 | 118.7 | 92.5 |
| Example 5-38 | 93.8 | 83.4 | 93.4 | 118.9 | 92.1 |
| Example 5-39 | 94.0 | 83.1 | 93.5 | 118.9 | 92.3 |
| Example 5-40 | 93.9 | 83.5 | 93.7 | 118.3 | 92.5 |
| Example 5-41 | 93.8 | 83.4 | 93.6 | 118.6 | 92.3 |
| Example 5-42 | 93.7 | 83.2 | 93.4 | 118.8 | 92.1 |
| Example 5-43 | 93.6 | 83.0 | 93.1 | 119.1 | 91.9 |
| Example 5-44 | 94.0 | 83.4 | 93.6 | 118.7 | 92.8 |
| Example 5-45 | 93.9 | 83.8 | 93.9 | 118.2 | 93.0 |
| Example 5-46 | 94.1 | 83.7 | 93.7 | 118.4 | 92.9 |
| Example 5-47 | 93.8 | 83.5 | 93.6 | 118.6 | 92.6 |
| Example 5-48 | 93.8 | 83.3 | 93.3 | 118.9 | 92.0 |
| Example 5-49 | 94.1 | 83.6 | 93.7 | 118.7 | 92.8 |
| Example 5-50 | 94.2 | 83.8 | 93.9 | 118.3 | 92.9 |
| Example 5-51 | 94.1 | 84.0 | 93.8 | 118.4 | 92.8 |
| Example 5-52 | 94.0 | 83.7 | 93.7 | 118.6 | 92.5 |
| Example 5-53 | 93.8 | 83.5 | 93.4 | 118.8 | 92.2 |
| Example 5-54 | 93.8 | 83.2 | 93.6 | 118.8 | 92.4 |
| Example 5-55 | 93.9 | 83.6 | 93.8 | 118.2 | 92.6 |
| Example 5-56 | 93.8 | 83.5 | 93.7 | 118.5 | 92.4 |
| Example 5-57 | 93.7 | 83.3 | 93.5 | 118.7 | 92.1 |
| Example 5-58 | 93.5 | 83.1 | 93.2 | 119.0 | 92.0 |
| Example 5-59 | 94.0 | 83.5 | 93.7 | 118.6 | 92.9 |
| Example 5-60 | 93.9 | 83.9 | 94.0 | 118.1 | 93.1 |
| Example 5-61 | 94.1 | 83.8 | 93.8 | 118.3 | 93.0 |

TABLE 19-continued

| | | | | | |
|---|---|---|---|---|---|
| Example 5-62 | 94.0 | 83.6 | 93.7 | 118.5 | 92.6 |
| Example 5-63 | 93.9 | 83.4 | 93.4 | 118.8 | 92.1 |

TABLE 20

| | Non-aqueous electrolytic solution No. | Compound No. | Addition amount thereof (%) | Negative electrode film forming agent | Addition amount thereof (%) | Blister inhibitor 1 | Addition amount thereof (%) |
|---|---|---|---|---|---|---|---|
| Example 5-64 | 5-64 | Compound No. 1 | 0.2 | Vinylene carbonate | 1.0 | γ-butyrolactone | 0.5 |
| Example 5-65 | 5-65 | | | | | | |
| Example 5-66 | 5-66 | | | | | | |
| Example 5-67 | 5-67 | | | | | Hexafluorocyclo-triphosphazene | |
| Example 5-68 | 5-68 | | | | | γ-valerolactone | |
| Example 5-69 | 5-69 | | | | | Ethoxypentafluoro-cyclotriphosphazene | |
| Example 5-70 | 5-70 | | | Fluoroethylene carbonate | 2.0 | γ-butyrolactone | |
| Example 5-71 | 5-71 | | | | | | |
| Example 5-72 | 5-72 | Compound No. 4 | 0.2 | Vinylene carbonate | 1.0 | γ-butyrolactone | 0.5 |
| Example 5-73 | 5-73 | | | | | | |
| Example 5-74 | 5-74 | | | | | | |
| Example 5-75 | 5-75 | | | | | Hexafluorocyclo-triphosphazene | |
| Example 5-76 | 5-76 | | | | | γ-valerolactone | |
| Example 5-77 | 5-77 | | | | | Ethoxypentafluoro-cyclotriphosphazene | |
| Example 5-78 | 5-78 | | | Fluoroethylene carbonate | 2.0 | γ-butyrolactone | |
| Example 5-79 | 5-79 | | | | | | |

| | | | | Evaluation result for laminated battery | | | |
|---|---|---|---|---|---|---|---|
| | | Addition amount thereof (%) | Charge-discharge efficiency at 1st cycle (%) | after storage at 85° C., 24 h | | | Capacity retention rate after 100 cycles at 25° C. (%) |
| | Blister inhibitor 2 | | | Capacity retention rate (%) | Capacity recovery rate (%) | Cell blister (%) | |
| Example 5-64 | Hexafluorocyclo-triphosphazene | 0.5 | 94.1 | 83.5 | 93.7 | 117.9 | 92.7 |
| Example 5-65 | Ethoxypentafluoro-cyclotriphosphazene | 0.5 | 94.0 | 83.7 | 93.8 | 117.8 | 92.8 |
| Example 5-66 | Phenoxypentafluoro-cyclotriphosphazene | 0.5 | 93.9 | 83.6 | 93.7 | 117.9 | 92.7 |
| Example 5-67 | Ethoxypentafluoro-cyclotriphosphazene | 0.5 | 94.2 | 83.7 | 94.0 | 117.5 | 93.1 |
| Example 5-68 | Hexafluorocyclo-triphosphazene | 0.5 | 93.9 | 83.5 | 93.6 | 118.1 | 92.6 |
| Example 5-69 | Phenoxypentafluoro-cyclotriphosphazene | 0.5 | 94.1 | 83.6 | 93.9 | 117.6 | 93.0 |
| Example 5-70 | Hexafluorocyclo-triphosphazene | 0.5 | 93.9 | 83.7 | 93.7 | 117.8 | 92.7 |
| Example 5-71 | Ethoxypentafluoro-cyclotriphosphazene | 0.5 | 94.0 | 83.7 | 93.8 | 117.7 | 92.8 |
| Example 5-72 | Hexafluorocyclo-triphosphazene | 0.5 | 93.8 | 83.4 | 93.6 | 118.2 | 92.4 |
| Example 5-73 | Ethoxypentafluoro-cyclotriphosphazene | 0.5 | 93.9 | 83.5 | 93.7 | 118.1 | 92.5 |
| Example 5-74 | Phenoxypentafluoro-cyclotriphosphazene | 0.5 | 93.8 | 83.5 | 93.7 | 118.0 | 92.6 |
| Example 5-75 | Ethoxypentafluoro-cyclotriphosphazene | 0.5 | 94.0 | 83.6 | 93.9 | 117.8 | 92.7 |
| Example 5-76 | Hexafluorocyclo-triphosphazene | 0.5 | 93.8 | 83.4 | 93.5 | 118.4 | 92.3 |
| Example 5-77 | Phenoxypentafluoro-cyclotriphosphazene | 0.5 | 93.9 | 83.5 | 93.8 | 117.9 | 92.6 |
| Example 5-78 | Hexafluorocyclo-triphosphazene | 0.5 | 93.8 | 83.6 | 93.6 | 118.1 | 92.4 |
| Example 5-79 | Ethoxypentafluoro-cyclotriphosphazene | 0.5 | 93.9 | 83.7 | 93.7 | 118.2 | 92.5 |

TABLE 21

| Non-aqueous electrolytic solution No. | Compound No. | Addition amount thereof (%) | Negative electrode film forming agent | Addition amount thereof (%) | Blister inhibitor 1 | Addition amount thereof (%) |
|---|---|---|---|---|---|---|
| Example 5-80 | 5-80 | Compound No. 12 | 0.2 | Vinylene carbonate | 1.0 | γ-butyrolactone | 0.5 |
| Example 5-81 | 5-81 | | | | | | 0.5 |
| Example 5-82 | 5-82 | | | | | | 0.5 |
| Example 5-83 | 5-83 | | | | | Hexafluorocyclo-triphosphazene | 0.5 |
| Example 5-84 | 5-84 | | | | | γ-valerolactone | 0.5 |
| Example 5-85 | 5-85 | | | | | Ethoxypentafluoro-cyclotriphosphazene | 0.5 |
| Example 5-86 | 5-86 | | | Fluoroethylene carbonate | 2.0 | γ-butyrolactone | 0.5 |
| Example 5-87 | 5-87 | | | | | | 0.5 |

| | | | | Evaluation result in laminated battery | | | |
| | | | | | after storage at 85° C., 24 h | | Capacity |
| | Blister inhibitor 2 | Addition amount thereof (%) | Charge-discharge efficiency at 1st cycle (%) | Capacity retention rate (%) | Capacity recovery rate (%) | Cell blister (%) | retention rate after 100 cycles at 25° C. (%) |
|---|---|---|---|---|---|---|---|
| Example 5-80 | Hexafluorocyclo-triphosphazene | 0.5 | 93.9 | 83.8 | 93.8 | 118.0 | 92.8 |
| Example 5-81 | Ethoxypentafluoro-cyclotriphosphazene | 0.5 | 94.0 | 83.9 | 93.9 | 117.9 | 92.8 |
| Example 5-82 | Phenoxypentafluoro-cyclotriphosphazene | 0.5 | 93.9. | 83.7 | 93.8 | 118.0 | 92.9 |
| Example 5-83 | Ethoxypentafluoro-cyclotriphosphazene | 0.5 | 94.0 | 84.0 | 94.0 | 117.9 | 93.2 |
| Example 5-84 | Hexafluorocyclo-triphosphazene | 0.5 | 93.9 | 83.7 | 93.7 | 118.3 | 92.7 |
| Example 5-85 | Phenoxypentafluoro-cyclotriphosphazene | 0.5 | 94.1 | 84.0 | 94.1 | 117.9 | 93.1 |
| Example 5-86 | Hexafluorocyclo-triphosphazene | 0.5 | 94.0 | 84.0 | 93.8 | 117.9 | 92.9 |
| Example 5-87 | Ethoxypentafluoro-cyclotriphosphazene | 0.5 | 93.9 | 83.9 | 93.6 | 118.1 | 92.7 |

As is clear from the results of Tables 18 to 21, it is understood that the laminated batteries using the non-aqueous electrolytic solution of the present invention (Examples 5-1 to 5-87) show good charge-discharge efficiency at the first cycle. It is understood that they show good characteristics even after storage at 85° C. for 24 hours, in view of capacity retention rate, capacity recovery rate of the battery and blister of a cell. In particular, suppression effect of blister of a cell after storage is significantly observed. In addition, also in evaluation result of cycle characteristics, it is clear that the non-aqueous electrolytic solution of the present invention exhibits good characteristics.

Still more, it was understood that the non-aqueous electrolytic solution of the present invention enables to suppress, for example, a decomposition reaction of a carbon substance of the negative electrode under storage at high temperature by hydrogen fluoride, by adding a blister inhibitor, for example, γ-butyrolactone or the like, and resulting in effect of suppressing generation of carbon dioxide gas under storage at high temperature, and suppressing blister of a cell after storage at high temperature. On the other hand, in the case of using the cyclophosphazene derivative represented by the general formula [6] as the blister inhibitor, it is estimated that the blister inhibitor in the non-aqueous electrolytic solution of the present invention oxidatively decomposes before the non-aqueous solvent or the negative electrode film forming agent remaining at the initial charging, to form a protective coating at the positive electrode, and it is considered that it suppresses oxidative decomposition of the non-aqueous solvent or the negative electrode film forming agent at the positive electrode surface, and as a result, blister of a cell is suppressed, in particular, after storage at high temperature.

In addition, it is considered that the non-aqueous electrolytic solution of the present invention decomposes also at the positive electrode side, judging from HOMO energy of the methylenebissulfonate derivative relevant to the present invention, to form a good reactive coating, which decreases interface resistance between the positive electrode and the electrolytic solution, which results in being able to contribute to decrease in internal resistance of a battery, characteristics improvement after storage at high temperature, and suppression of blister of a cell.

As shown above, by combined use of the methylenebissulfonate derivative relevant to the present invention, negative electrode film forming agent and the above blister inhibitor, good cycle characteristics at 25° C. and characteristics after storage at high temperature can be obtained, similarly as in the case of adding the methylenebissulfonate derivative alone. In addition, battery blister in standing still at high temperature is suppressed well.

Examples 6-1 to 6-54 and Comparative Examples 6-1 to 6-6 i) Preparation of a Standard Electrolytic Solution 6

The standard electrolytic solution 6 was prepared in operation, step and procedure for liquid temperature in preparation not to exceed 30° C., similarly as in the standard electrolytic solution 2, except that each lithium salt was added so that concentration of $LiPF_6$ becomes 1.2 mol/L, and concentration of bis[oxalate-O,O']lithium borate becomes 0.01 mol/L, as lithium salts, in the above standard electrolytic solution 3.

ii) Preparation of a Non-aqueous Electrolytic Solution 6

The non-aqueous electrolytic solutions 6-1 to 6-30 were prepared by adding predetermined amount of the methyl-enebissulfonate derivative relevant to the present invention, the negative electrode film forming agent and the blister inhibitor described in the following Tables 22, into the above standard electrolytic solution 6, by similar operation, step and procedure as in the above non-aqueous electrolytic solution 2.

TABLE 22

| Non-aqueous electrolytic solution No. | Compound No. | Addition amount thereof (%) | Negative electrode film forming agent | Addition amount thereof (%) | Blister inhibitor 1 | Addition amount thereof (%) | Blister inhibitor 2 | Addition amount thereof (%) |
|---|---|---|---|---|---|---|---|---|
| 6-1 | Compound No. 1 | 0.2 | Vinylene carbonate | 1.0 | γ-butyrolactone | 0.5 | Hexafluorocyclo-triphosphazene | 0.5 |
| 6-2 | | | | 1.0 | Hexafluorocyclo-triphosphazene | 0.5 | Ethoxypentafluoro-cyclotriphosphazene | 0.5 |
| 6-3 | | | | 1.0 | Ethoxypentafluoro-cyclotriphosphazene | 0.5 | Phenoxypentafluoro-cyclotriphosphazene | 0.5 |
| 6-4 | | | | 3.0 | Hexafluorocyclo-triphosphazene | 0.5 | Ethoxypentafluoro-cyclotriphosphazene | 0.5 |
| 6-5 | | | | 3.0 | Ethoxypentafluoro-cyclotriphosphazene | 0.5 | Phenoxypentafluoro-cyclotriphosphazene | 0.5 |
| 6-6 | | 0.5 | Fluoroethylene carbonate | 5.0 | γ-butyrolactone | 0.5 | Hexafluorocyclo-triphosphazene | 0.5 |
| 6-7 | | | | 5.0 | Hexafluorocyclo-triphosphazene | 0.5 | Ethoxypentafluoro-cyclotriphosphazene | 0.5 |
| 6-8 | | | | 5.0 | Ethoxypentafluoro-cyclotriphosphazene | 0.5 | Phenoxypentafluoro-cyclotriphosphazene | 0.5 |
| 6-9 | | | | 10.0 | Hexafluorocyclo-triphosphazene | 0.5 | Ethoxypentafluoro-cyclotriphosphazene | 0.5 |
| 6-10 | | | | 10.0 | Ethoxypentafluoro-cyclotriphosphazene | 0.5 | Phenoxypentafluoro-cyclotriphosphazene | 0.5 |
| 6-11 | Compound No. 4 | 0.2 | Vinylene carbonate | 1.0 | γ-butyrolactone | 0.5 | Hexafluorocyclo-triphosphazene | 0.5 |
| 6-12 | | | | 1.0 | Hexafluorocyclo-triphosphazene | 0.5 | Ethoxypentafluoro-cyclotriphosphazene | 0.5 |
| 6-13 | | | | 1.0 | Ethoxypentafluoro-cyclotriphosphazene | 0.5 | Phenoxypentafluoro-cyclotriphosphazene | 0.5 |
| 6-14 | | | | 3.0 | Hexafluorocyclo-triphosphazene | 0.5 | Ethoxypentafluoro-cyclotriphosphazene | 0.5 |
| 6-15 | | | | 3.0 | Ethoxypentafluoro-cyclotriphosphazene | 0.5 | Phenoxypentafluoro-cyclotriphosphazene | 0.5 |
| 6-16 | | 0.5 | Fluoroethylene carbonate | 5.0 | γ-butyrolactone | 0.5 | Hexafluorocyclo-triphosphazene | 0.5 |
| 6-17 | | | | 5.0 | Hexafluorocyclo-triphosphazene | 0.5 | Ethoxypentafluoro-cyclotriphosphazene | 0.5 |
| 6-18 | | | | 5.0 | Ethoxypentafluoro-cyclotriphosphazene | 0.5 | Phenoxypentafluoro-cyclotriphosphazene | 0.5 |
| 6-19 | | | | 10.0 | Hexafluorocyclo-triphosphazene | 0.5 | Ethoxypentafluoro-cyclotriphosphazene | 0.5 |
| 6-20 | | | | 10.0 | Ethoxypentafluoro-cyclotriphosphazene | 0.5 | Phenoxypentafluoro-cyclotriphosphazene | 0.5 |
| 6-21 | Compound No. 12 | 0.2 | Vinylene carbonate | 1.0 | γ-butyrolactone | 0.5 | Hexafluorocyclo-triphosphazene | 0.5 |
| 6-22 | | | | 1.0 | Hexafluorocyclo-triphosphazene | 0.5 | Ethoxypentafluoro-cyclotriphosphazene | 0.5 |
| 6-23 | | | | 1.0 | Ethoxypentafluoro-cyclotriphosphazene | 0.5 | Phenoxypentafluoro-cyclotriphosphazene | 0.5 |
| 6-24 | | | | 3.0 | Hexafluorocyclo-triphosphazene | 0.5 | Ethoxypentafluoro-cyclotriphosphazene | 0.5 |
| 6-25 | | | | 3.0 | Ethoxypentafluoro-cyclotriphosphazene | 0.5 | Phenoxypentafluoro-cyclotriphosphazene | 0.5 |
| 6-26 | | 0.5 | Fluoroethylene carbonate | 5.0 | γ-butyrolactone | 0.5 | Hexafluorocyclo-triphosphazene | 0.5 |
| 6-27 | | | | 5.0 | Hexafluorocyclo-triphosphazene | 0.5 | Ethoxypentafluoro-cyclotriphosphazene | 0.5 |
| 6-28 | | | | 5.0 | Ethoxypentafluoro-cyclotriphosphazene | 0.5 | Phenoxypentafluoro-cyclotriphosphazene | 0.5 |
| 6-29 | | | | 10.0 | Hexafluorocyclo-triphosphazene | 0.5 | Ethoxypentafluoro-cyclotriphosphazene | 0.5 |
| 6-30 | | | | 10.0 | Ethoxypentafluoro-cyclotriphosphazene | 0.5 | Phenoxypentafluoro-cyclotriphosphazene | 0.5 |
| 6-31 | None | — | None | — | None | — | None | — |

Examples 6-1 to 6-9

A positive electrode was prepared using LiFePO$_4$, instead of the positive electrode active material used in Example 2-3. A positive electrode mixture slurry was prepared by mixing 90 parts by mass of LiFePO$_4$ powder, 5 parts by mass of acetylene black as a conductive agent, which was added, uniformly dispersed and mixed into a solution, where 5 parts by mass of polyvinylidene fluoride (PVDF), as a binding agent, was dissolved in 1-methyl-2-pyroridone, in advance. A laminated battery was prepared and battery evaluation was performed (the non-aqueous electrolytic solutions used No. 6-1 to 6-3, 6-11 to 6-13, and 6-21 to 6-23 are described in Table 22 and Table 23) similarly as in Example 2-3, except that this positive electrode mixture slurry was coated onto a positive electrode collector made of an aluminum foil, dried, and then compression molded under pressure, cutting to a predetermined size to prepare a band-like positive electrode. It should be noted that battery evaluation was performed under similar evaluation condition as in Example 2-33, except that charging termination voltage was set at 3.6 V, and discharging termination voltage was set at 2.0 V. Result thereof is shown in Table 23.

Comparative Example 6-1

A laminated battery was prepared similarly as in Example 6-1, except that the one not added with the methylenebissulfonate derivative relevant to the present invention, the negative electrode film forming agent and the blister inhibitor (the non-aqueous electrolytic solution No. 6-31 (not added with the compounds)) was used, as the non-aqueous electrolytic solution, and battery evaluation was performed. An evaluation result of cycle characteristics at 25° C. of the laminated battery is shown together in Table 23.

Examples 6-10 to 6-18

A positive electrode was prepared using LiMn$_{1.95}$Al$_{0.05}$O$_4$, instead of the positive electrode active material used in Example 2-3. A positive electrode mixture slurry was prepared by mixing 92 parts by mass of LiMn$_{1.95}$Al$_{0.05}$O$_4$ powder, 4 parts by mass of acetylene black as a conductive agent, which was added, uniformly dispersed and mixed into a solution, where 4 parts by mass of polyvinylidene fluoride (PVDF), as a binding agent, was dissolved in 1-methyl-2-pyroridone, in advance. A laminated battery was prepared and battery evaluation was performed (the non-aqueous electrolytic solutions used are described in Table 22 and Table 23 similarly as above) similarly as in Example 2-3, except that this positive electrode mixture slurry was coated onto a positive electrode collector made of an aluminum foil, dried, and then compression molded under pressure, cutting to a predetermined size to prepare a band-like positive electrode. It should be noted that battery evaluation was performed under similar evaluation condition as in Example 2-37, except that charging termination voltage was set at 4.2 V, and discharging termination voltage was set at 3.0 V. Result thereof is shown in Table 23.

Comparative Example 6-2

A laminated battery was prepared similarly as in Examples 6-10, except that the one not added with the methylenebissulfonate derivative relevant to the present invention, the negative electrode film forming agent and the blister inhibitor (the non-aqueous electrolytic solution No. 6-31 (not added with the compounds)) was used, as the non-aqueous electrolytic solution, and battery evaluation was performed. An evaluation result of cycle characteristics at 25° C. of the laminated battery is shown together in Table 23.

Examples 6-19 to 6-27

A positive electrode was prepared using Li[Mn$_{0.2}$Ni$_{0.6}$Co$_{0.2}$]O$_2$, instead of the positive electrode active material used in Example 2-3. A positive electrode mixture slurry was prepared by mixing 92 parts by mass of Li[Mn$_{0.2}$Ni$_{0.6}$Co$_{0.2}$]O$_2$ powder, 4 parts by mass of acetylene black as a conductive agent, which was added, uniformly dispersed and mixed into a solution, where 4 parts by mass of polyvinylidene fluoride (PVDF), as a binding agent, was dissolved in 1-methyl-2-pyroridone, in advance. A laminated battery was prepared and battery evaluation was performed (the non-aqueous electrolytic solutions used are described in Table 22 and Table 23 similarly as above) similarly as in Example 2-3, except that this positive electrode mixture slurry was coated onto a positive electrode collector made of an aluminum foil, dried, and then compression molded under pressure, cutting to a predetermined size to prepare a band-like positive electrode, and then, an electrode group was prepared by opposing the positive electrode and a negative electrode, via arrangement of the polypropylene side of a separator made of a microporous polypropylene-polyethylene two-layer film, at the positive electrode side. It should be noted that battery evaluation was performed under similar evaluation condition as in Example 2-35, except that charging termination voltage was set at 4.3 V, and discharging termination voltage was set at 3.0 V. Result thereof is shown in Table 23.

Comparative Example 6-3

A laminated battery was prepared similarly as in Example 6-19, except that the one not added with the methylenebissulfonate derivative relevant to the present invention, the negative electrode film forming agent and the blister inhibitor (the non-aqueous electrolytic solution No. 6-31 (not added with the compounds)) was used, as the non-aqueous electrolytic solution, and battery evaluation was performed. An evaluation result of cycle characteristics at 25° C. of the laminated battery is shown together in Table 23.

TABLE 23

| | Non-aqueous electrolytic solution No. | positive electrode active material/separator/negative electrode active material | Evaluation result in laminated battery (Capacity retention rate after 100 cycles at 25° C. (%)) |
|---|---|---|---|
| Example 6-1 | 6-1 | LiFePO$_4$/Microporous Polyethylene separator/MCMB25-28 | 87.9 |
| Example 6-2 | 6-2 | | 88.2 |
| Example 6-3 | 6-3 | | 87.9 |
| Example 6-4 | 6-11 | | 88.5 |
| Example 6-5 | 6-12 | | 88.7 |
| Example 6-6 | 6-13 | | 88.6 |
| Example 6-7 | 6-21 | | 89.3 |
| Example 6-8 | 6-22 | | 89.5 |
| Example 6-9 | 6-23 | | 89.2 |
| Comparative Example 6-1 | 6-31 | | 71.5 |
| Example 6-10 | 6-1 | LiMn$_{1.95}$Al$_{0.05}$O$_4$/ Microporous | 88.6 |
| Example 6-11 | 6-2 | | 88.9 |

TABLE 23-continued

| | Non-aqueous electrolytic solution No. | positive electrode active material/separator/negative electrode active material | Evaluation result in laminated battery (Capacity retention rate after 100 cycles at 25° C. (%)) |
|---|---|---|---|
| Example 6-12 | 6-3 | Polyethylene separator/MCMB25-28 | 88.7 |
| Example 6-13 | 6-11 | | 88.2 |
| Example 6-14 | 6-12 | | 88.3 |
| Example 6-15 | 6-13 | | 88.2 |
| Example 6-16 | 6-21 | | 89.0 |
| Example 6-17 | 6-22 | | 89.3 |
| Example 6-18 | 6-23 | | 89.1 |
| Comparative Example 6-2 | 6-31 | | 70.9 |
| Example 6-19 | 6-1 | Li[Mn$_{0.2}$Ni$_{0.6}$Co$_{0.2}$]$_2$/ Microporous Polypropylene- Polyethylene two-layer separator/MCMB25-28 | 87.6 |
| Example 6-20 | 6-2 | | 87.9 |
| Example 6-21 | 6-3 | | 87.7 |
| Example 6-22 | 6-11 | | 87.1 |
| Example 6-23 | 6-12 | | 87.3 |
| Example 6-24 | 6-13 | | 87.2 |
| Example 6-25 | 6-21 | | 88.1 |
| Example 6-26 | 6-22 | | 88.3 |
| Example 6-27 | 6-23 | | 88.2 |
| Comparative Example 6-3 | 6-31 | | 70.1 |

As is clear from the results of Table 23, it is understood that the laminate batteries using the non-aqueous electrolytic solution of the present invention (Examples 6-1 to 6-27) each show significant capacity retention rate after cycle, as compared with using the batteries of Comparative Examples 6-1 to 6-3.

It is understood that the non-aqueous electrolytic solution of the present invention shows good effect in any case of using a lithium-containing olivine-type iron phosphate, a lithium-manganese complex oxide having a spinel structure, and a lithium transition metal complex oxide having a lamella structure containing manganese-nickel-cobalt. That is, it is clear that the non-aqueous electrolytic solution of the present invention and a battery using the same exhibit high cycle characteristics without depending on a specific positive electrode or negative electrode.

Examples 6-28 to 6-42

A negative electrode was prepared using spherical graphite (GDR, manufactured by Nippon & Coke Engineering Co., Ltd.), instead of the negative electrode active material used in Example 2-3. A negative electrode mixture slurry was prepared by mixing 95 parts by mass of spherical graphite powder, 2 parts by mass of calboxymethyl cellulose, as a thickener, 3 parts by mass of styrene-butadiene rubber, as a binding agent and suitable amount of water as a solvent, and by uniformly dispersing and mixing. A laminated battery was prepared and battery evaluation was performed (the non-aqueous electrolytic solutions used No. 6-4 to 6-8, 6-14 to 6-18, 6-24 to 6-28 are described in Table 22) similarly as in Example 2-3, except that this negative electrode mixture slurry was coated onto a negative electrode collector made of a copper foil, dried, and then compression molded under pressure, cutting to a predetermined size to prepare a band-like negative electrode. It should be noted that battery evaluation was performed under similarly as in Example 2-3, except that charging termination voltage was set at 4.2 V, and discharging termination voltage was set at 3.0 V. Evaluation results of charge-discharge efficiency at the first cycle, characteristics after storage at high temperature and cycle characteristics at 25° C. of the laminated batteries are shown together in Tables 24.

Comparative Example 6-4

A laminated battery was prepared similarly as in Example 6-28, except that the one not added with the methylenebissulfonate derivative relevant to the present invention, the negative electrode film forming agent and the blister inhibitor (the non-aqueous electrolytic solution No. 6-31 (not added with the compounds)) was used, as the non-aqueous electrolytic solution, and battery evaluation was performed. Evaluation result of cycle characteristics at 25° C. of the same laminated battery is shown together in Table 24.

TABLE 24

| | | | Evaluation result for laminated battery | | | | |
|---|---|---|---|---|---|---|---|
| | | | Charge- | after storage at 85° C., 24 h | | | Capacity |
| | Non-aqueous electrolytic solution No. | positive electrode active material/separator/negative electrode active material | discharge efficiency at 1st cycle (%) | Capacity retention rate (%) | Capacity recovery rate (%) | Cell blister (%) | retention rate after 100 cycles at 25° C. (%) |
| Example 6-28 | 6-4 | LiCoO$_2$/Microporous Polyethylene separator/ Spherical Graphite GDR | 93.2 | 89.1 | 94.3 | 117.0 | 93.0 |
| Example 6-29 | 6-5 | | 93.5 | 89.3 | 94.8 | 116.9 | 93.3 |
| Example 6-30 | 6-6 | | 93.9 | 89.2 | 94.1 | 117.9 | 93.8 |
| Example 6-31 | 6-7 | | 94.1 | 89.0 | 94.0 | 117.8 | 94.1 |
| Example 6-32 | 6-8 | | 94.0 | 88.9 | 93.8 | 118.1 | 93.8 |
| Example 6-33 | 6-14 | | 92.9 | 89.0 | 94.2 | 117.6 | 92.9 |
| Example 6-34 | 6-15 | | 93.1 | 89.1 | 94.5 | 117.1 | 93.1 |
| Example 6-35 | 6-16 | | 93.4 | 89.0 | 94.0 | 117.9 | 93.5 |
| Example 6-36 | 6-17 | | 93.7 | 88.9 | 93.9 | 118.2 | 93.6 |
| Example 6-37 | 6-18 | | 93.6 | 88.8 | 93.8 | 118.5 | 93.2 |
| Example 6-38 | 6-24 | | 93.1 | 88.9 | 94.1 | 116.9 | 92.9 |
| Example 6-39 | 6-25 | | 93.4 | 89.2 | 94.6 | 116.8 | 93.1 |
| Example 6-40 | 6-26 | | 93.7 | 89.1 | 94.0 | 117.7 | 93.6 |
| Example 6-41 | 6-27 | | 94.0 | 88.9 | 93.8 | 117.9 | 94.0 |
| Example 6-42 | 6-28 | | 93.9 | 88.7 | 93.7 | 118.2 | 93.7 |
| Comparative Example 6-4 | 6-31 | | 90.4 | 75.4 | 82.1 | 148.2 | 71.5 |

As is clear from the results of Table 24, it is understood that the laminated batteries using the non-aqueous electrolytic solution of the present invention (Examples 6-28 to 6-42) show significant capacity retention rate after cycle respectively, as compared with the case of using the battery of Comparative Example 6-4.

It is understood that the non-aqueous electrolytic solution of the present invention shows good effect, even in the case of using the positive electrode containing lithium cobaltate as the positive electrode active material, and the negative electrode containing spherical graphite as the negative electrode active material.

Examples 6-43 to 6-48, and Comparative Example 6-5

A negative electrode was prepared using Sn powder as a raw material of a negative electrode active material, instead of the negative electrode active material used in Example 2-3. A negative electrode mixture slurry was prepared by mixing 78 parts by mass of Sn powder, 15 parts by mass of acetylene black as a conductive agent, which was added, uniformly dispersed and mixed into a solution, where 7 parts by mass of polyvinylidene fluoride (PVDF), as a binding agent, was dissolved in 1-methyl-2-pyroridone, in advance. A laminated battery was prepared and battery evaluation was performed (the non-aqueous electrolytic solutions used No. 6-9 to 6-10, 6-19 to 6-20, 6-29 to 6-30 are described in Table 22) by performing operation similarly as in Example 2-3, except that this negative electrode mixture slurry was coated onto a negative electrode collector made of a copper foil, dried, and then compression molded under pressure, cutting to a predetermined size to prepare a band-like negative electrode. It should be noted that battery evaluation was performed under similar evaluation condition as in Example 2-3, except that charging termination voltage was set at 4.2 V, and discharging termination voltage was set at 2.5 V. Cycle characteristics at 25° C. of the laminated battery are shown in Table 25.

Comparative Example 6-5

A laminated battery was prepared similarly as in Examples 6-28 to 6-42, except that the one not added with the methylenebissulfonate derivative relevant to the present invention, the negative electrode film forming agent and the blister inhibitor (the non-aqueous electrolytic solution No. 6-31 (not added with the compounds)) was used, as the non-aqueous electrolytic solution, and battery evaluation was performed. An evaluation result of cycle characteristics at 25° C. of the laminated battery is shown together in Table 25.

Examples 6-49 to 6-54

A positive electrode was prepared using Li[Mn$_{0.2}$Ni$_{0.6}$Co$_{0.2}$]O$_2$, instead of the positive electrode active material used in Examples 6-43 to 6-48. A positive electrode mixture slurry was prepared by mixing 92 parts by mass of Li[Mn$_{0.2}$Ni$_{0.6}$Co$_{0.2}$]O$_2$ powder, 4 parts by mass of acetylene black as a conductive agent, which was added, uniformly dispersed and mixed into a solution, where 4 parts by mass of polyvinylidene fluoride (PVDF), as a binding agent, was dissolved in 1-methyl-2-pyroridone, in advance. A laminated battery was prepared and battery evaluation was performed (the non-aqueous electrolytic solutions used No. 6-9 to 6-10, 6-19 to 6-20, 6-29 to 6-30 are described in Table 22) similarly as in Examples 6-43 to 6-48, except that this positive electrode mixture slurry was coated onto a positive electrode collector made of an aluminum foil, dried, and then compression molded under pressure, cut to a predetermined size to prepare a band-like positive electrode, and then, an electrode group was prepared by opposing the positive electrode and a negative electrode, via arrangement of the polypropylene side of a separator made of a microporous polypropylene-polyethylene two-layer film, at the positive electrode side. It should be noted that battery evaluation was performed under similar evaluation condition as in Examples 6-43 to 6-48, except that charging termination voltage was set at 4.25 V, and discharging termination voltage was set at 2.5 V. An evaluation result of cycle characteristics at 25° C. of the laminated battery is shown in Table 25.

Comparative Example 6-6

A laminated battery was prepared similarly as in Examples 6-49 to 6-54, except that the one not added with the methylenebissulfonate derivative relevant to the present invention, the negative electrode film forming agent and the blister inhibitor (the non-aqueous electrolytic solution No. 6-31 (not added with the compounds)) was used, as the non-aqueous electrolytic solution, and battery evaluation was performed. An evaluation result of cycle characteristics at 25° C. of the laminated battery is shown together in Table 25.

TABLE 25

| | Non-aqueous electrolytic solution No. | positive electrode active material/separator/negative electrode active material | Evaluation result in laminated battery (Capacity retention rate after 100 cycles at 25° C. (%)) |
| --- | --- | --- | --- |
| Example 6-43 | 6-9 | LiCoO$_2$/Microporous Polyethylene separator/Sn | 88.5 |
| Example 6-44 | 6-10 | | 88.8 |
| Example 6-45 | 6-19 | | 88.3 |
| Example 6-46 | 6-20 | | 88.4 |
| Example 6-47 | 6-29 | | 88.7 |
| Example 6-48 | 6-30 | | 88.9 |
| Comparative Example 6-5 | 6-31 | | 70.9 |
| Example 6-49 | 6-9 | Li[Mn$_{0.2}$Ni$_{0.6}$Co$_{0.2}$]O$_2$/ Microporous Polypropylene- Polyethylene two-layer separator/Sn | 87.5 |
| Example 6-50 | 6-10 | | 87.4 |
| Example 6-51 | 6-19 | | 87.1 |
| Example 6-52 | 6-20 | | 87.4 |
| Example 6-53 | 6-29 | | 87.7 |
| Example 6-54 | 6-30 | | 87.5 |
| Comparative Example 6-6 | 6-31 | | 69.8 |

As is clear from the result of Table 25, it is understood that the laminated batteries using the non-aqueous electrolytic solution of the present invention (Examples 6-43 to 6-54) show significant capacity retention rate after cycle, as compared with using the batteries of Comparative Examples 6-5 to 6-6. In addition, it is understood that the batteries using the non-aqueous electrolytic solution of the present invention provide high battery characteristics not depending on a kind of the positive electrode active material.

Examples 7-1 to 7-18 and Comparative Examples 7-1 to 7-3 i) Preparation of a Standard Electrolytic Solution 7

In a dry box having a dew point of −50° C. or lower, using ethylene carbonate (EC), propylene carbonate (PC) and γ-butyrolactone, heated and dissolved in advance, a mixed solvent (in a volume ratio of 1:1:4) was prepared, and then $LiBF_4$, and bis[oxalate-O,O']lithium borate, as lithium salts, were added so as to attain each concentration thereof of 2.0 mol/L and 0.01 mol/L, respectively, to prepare the standard electrolytic solution 7. It should be noted that, in this preparation, as for the addition of $LiBF_4$, so that liquid temperature does not exceed 30° C., firstly 30% by weight of the total $LiBF_4$ was added and dissolved in the mixed solvent, mixed in advance, and then an operation of adding and dissolving 30% by weight of the total $LiBF_4$ was repeated twice, and finally the remaining 10% by weight of $LiBF_4$ was added and dissolved. After that by still more adding and dissolving bis[oxalate-O,O']lithium borate, in a predetermined amount, the standard electrolytic solution 7 was prepared. Maximum liquid temperature at (A) the non-aqueous solvent mixing step and (B) the lithium salt dissolving step, in preparation of the standard electrolytic solution 7, was 22° C. and 26° C., respectively.

ii) Preparation of a Non-aqueous Electrolytic Solution 7

The non-aqueous electrolytic solutions 7-1 to 7-6 were prepared by adding predetermined amount of the methylenebissulfonate derivative relevant to the present invention, the negative electrode film forming agent and the blister inhibitor described in the following Table 26, into the above standard electrolytic solution 7, by similar operation, step and procedure as in the above non-aqueous electrolytic solution 2. In addition, the non-aqueous electrolytic solution 7-7 not added with the methylenebissulfonate derivative relevant to the present invention, the negative electrode film forming agent and the blister inhibitor (blank: the standard electrolytic solution 7) was used as Comparative Example.

under pressure, cutting to a predetermined size to prepare a band-like negative electrode. It should be noted that battery evaluation was performed under similar evaluation condition as in Example 2-3, except that charging termination voltage was set at 2.7 V, and discharging termination voltage was set at 1.5 V, and temperature of cycle characteristics evaluation was set at 45° C. Cycle characteristics at 45° C. of the laminated battery are shown in Table 27.

Comparative Example 7-1

A laminated battery was prepared similarly as in Examples 7-1 to 7-6, except that the one not added with the methylenebissulfonate derivative relevant to the present invention, the negative electrode film forming agent and the blister inhibitor (the non-aqueous electrolytic solution No. 7-7 (not added with the compounds)) was used, as the non-aqueous electrolytic solution, and battery evaluation was performed. An evaluation result of cycle characteristics at 45° C. of the laminated battery is shown together in Table 27.

Examples 7-7 to 7-12

A positive electrode was prepared using $LiMn_{1.95}Al_{0.05}O_4$, instead of the positive electrode active material used in Examples 7-7 to 7-6. A positive electrode mixture slurry was prepared by mixing 92 parts by mass of $LiMn_{1.95}Al_{0.05}O_4$ powder, 4 parts by mass of acetylene black as a conductive agent, which was added, uniformly dispersed and mixed into a solution, where 4 parts by mass of polyvinylidene fluoride

TABLE 26

| Non-aqueous electrolytic solution No. | Compound No. | Addition amount thereof (%) | Negative electrode film forming agent | Addition amount thereof (%) | Blister inhibitor 1 | Addition amount thereof (%) | Blister inhibitor 2 | Addition amount thereof (%) |
|---|---|---|---|---|---|---|---|---|
| 7-1 | Compound No. 1 | 0.2 | Fluoroethylene carbonate | 1.0 | Hexafluorocyclo-triphosphazene | 0.5 | Ethoxypentafluoro-cyclotriphosphazene | 0.5 |
| 7-2 | | | | 1.0 | Ethoxypentafluoro-cyclotriphosphazene | 0.5 | Phenoxypentafluoro-cyclotriphosphazene | 0.5 |
| 7-3 | Compound No. 4 | 0.2 | | 1.0 | Hexafluorocyclo-triphosphazene | 0.5 | Ethoxypentafluoro-cyclotriphosphazene | 0.5 |
| 7-4 | | | | 1.0 | Ethoxypentafluoro-cyclotriphosphazene | 0.5 | Phenoxypentafluoro-cyclotriphosphazene | 0.5 |
| 7-5 | Compound No. 12 | 0.2 | | 1.0 | Hexafluorocyclo-triphosphazene | 0.5 | Ethoxypentafluoro-cyclotriphosphazene | 0.5 |
| 7-6 | | | | 1.0 | Ethoxypentafluoro-cyclotriphosphazene | 0.5 | Phenoxypentafluoro-cyclotriphosphazene | 0.5 |
| 7-7 | None | — | None | — | None | — | None | — |

Examples 7-1 to 7-6

A negative electrode was prepared using $Li_4Ti_5O_{12}$ powder as a raw material of a negative electrode active material, instead of the negative electrode active material used in Example 2-3. A negative electrode mixture slurry was prepared by mixing 85 parts by mass of $Li_4Ti_5O_{12}$ (an average particle diameter of 0.90 μm), 5 parts by mass of $Li_4Ti_5O_{12}$ (an average particle diameter of 3.40 μm), which was added, uniformly dispersed and mixed into a solution, where 10 parts by mass of polyvinylidene fluoride (PVDF), as a binding agent, was dissolved in 1-methyl-2-pyoridone, in advance. A laminated battery was prepared and battery evaluation was performed (the non-aqueous electrolytic solutions used No. 7-1 to 7-6 are described in Table 26) by performing operation similarly as in Example 19, except that this negative electrode mixture slurry was coated onto a negative electrode collector made of a copper foil, dried, and then compression molded (PVDF), as a binding agent, was dissolved in 1-methyl-2-pyoridone, in advance. A laminated battery was prepared and battery evaluation was performed (the non-aqueous electrolytic solutions used No. 7-1 to 7-6 are described in Table 26) similarly as in Examples 7-1 to 7-6, except that this positive electrode mixture slurry was coated onto a positive electrode collector made of an aluminum foil, dried, and then compression molded under pressure, cutting to a predetermined size to prepare a band-like positive electrode.

Comparative Example 7-2

A laminated battery was prepared similarly as in Examples 7-1 to 7-12, except that the one not added with the methylenebissulfonate derivative relevant to the present invention, the negative electrode film forming agent and the blister inhibitor (the non-aqueous electrolytic solution No. 7-7 (not added with the compounds)) was used, as the non-aqueous electrolytic solution, and battery evaluation was performed. An evaluation result of cycle characteristics at 45° C. of the laminated battery is shown together in Table 27.

Examples 7-13 to 7-18

A positive electrode was prepared using Li[Mn$_{0.2}$Ni$_{0.6}$Co$_{0.2}$]O$_2$, instead of the positive electrode active material used in Examples 7-1 to 7-6. A positive electrode mixture slurry was prepared by mixing 92 parts by mass of Li[Mn$_{0.2}$Ni$_{0.6}$Co$_{0.2}$]O$_2$ powder, 4 parts by mass of acetylene black as an electron conductive agent, which was added, uniformly dispersed and mixed into a solution, where 4 parts by mass of polyvinylidene fluoride (PVDF), as a binding agent, was dissolved in 1-methyl-2-pyroridone, in advance. A laminated battery was prepared and battery evaluation was performed (the non-aqueous electrolytic solutions used No. 7-1 to 7-6 are described in Table 26) similarly as in Examples 7-1 to 7-6, except that this positive electrode mixture slurry was coated onto a positive electrode collector made of an aluminum foil, dried, and then compression molded under pressure, cutting to a predetermined size to prepare a band-like positive electrode, and then, an electrode group was prepared by opposing the positive electrode and a negative electrode, via arrangement of the polypropylene side of a separator made of a microporous polypropylene-polyethylene two-layer film, at the positive electrode side.

Comparative Example 7-3

A laminated battery was prepared similarly as in Examples 7-13 to 7-18, except that the one not added with the methylenebissulfonate derivative relevant to the present invention, the negative electrode film forming agent and the blister inhibitor (the non-aqueous electrolytic solution No. 7-7 (not added with the compounds)) was used, as the non-aqueous electrolytic solution, and battery evaluation was performed. An evaluation result of cycle characteristics at 45° C. of the same laminated battery is shown together in Table 27.

As is clear from the result of Table 27, it is understood that the laminated batteries using the non-aqueous electrolytic solution of the present invention (Examples 7-1 to 7-18) show significant capacity retention rate after cycle, as compared with using the batteries of Comparative Examples 7-1 to 7-3.

In addition, it is understood that a battery using the non-aqueous electrolytic solution of the present invention exhibits high battery characteristics without depending on kind of the positive electrode active material, even in the case where a lithium-titanium oxide is used as the negative electrode active material.

The non-aqueous electrolytic solution of the present invention is characterized by being added with the methylenebissulfonate derivative relevant to the present invention, and when used in a battery, it enhances cycle characteristics. This effect is significant in a long cycle, that is in the case where cycle number becomes several hundred or more, and it is suggested to result in high capacity retention rate of a battery.

What is claimed is:

1. A non-aqueous electrolytic solution comprising:
   (1) a non-aqueous solvent comprising at least one material selected from the group consisting of a cyclic carbonate ester, a straight chained carbonate ester and a cyclic carboxylic acid ester;
   (2) a lithium salt soluble in the non-aqueous solvent, as an electrolyte salt; and
   (3) a methylenebissulfonate derivative represented by formula [1],

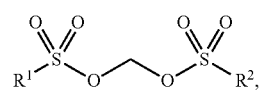

[1]

wherein R$^1$ and R$^2$ each independently represent an alkyl group having 1 to 6 carbon atoms, which may have a substitution group, a haloalkyl group having 1 to 6 car-

TABLE 27

| | Non-aqueous electrolytic solution No. | Ethylene bissulfonate/ EC + PC (wt. ratio) | Positive electrode active material/separator/negative electrode active material | Evaluation result in laminated battery (Capacity retention rate after 100 cycles at 45° C. (%)) |
|---|---|---|---|---|
| Example 7-1 | 7-1 | 0.007 | LiCoO$_2$/Microporous | 88.9 |
| Example 7-2 | 7-2 | 0.007 | Polyethylene separator/ | 89.1 |
| Example 7-3 | 7-3 | 0.007 | Li$_4$Ti$_5$O$_{12}$ | 89.0 |
| Example 7-4 | 7-4 | 0.007 | | 89.4 |
| Example 7-5 | 7-5 | 0.007 | | 89.5 |
| Example 7-6 | 7-6 | 0.007 | | 89.6 |
| Comparative Example 7-1 | 7-7 | — | | 72.9 |
| Example 7-7 | 7-1 | 0.007 | LiMn$_{1.95}$Al$_{0.05}$O$_4$/Microporous | 87.8 |
| Example 7-8 | 7-2 | 0.007 | Polyethylene separator/ | 88.1 |
| Example 7-9 | 7-3 | 0.007 | Li$_4$Ti$_5$O$_{12}$ | 88.0 |
| Example 7-10 | 7-4 | 0.007 | | 88.4 |
| Example 7-11 | 7-5 | 0.007 | | 88.2 |
| Example 7-12 | 7-6 | 0.007 | | 88.4 |
| Comparative Example 7-2 | 7-7 | — | | 71.8 |
| Example 7-13 | 7-1 | 0.007 | Li[Mn$_{0.2}$Ni$_{0.6}$Co$_{0.2}$]O$_2$/ | 87.9 |
| Example 7-14 | 7-2 | 0.007 | Microporous Polypropylene- | 88.1 |
| Example 7-15 | 7-3 | 0.007 | Polyethylene two-layer | 88.0 |
| Example 7-16 | 7-4 | 0.007 | separator/Li$_4$Ti$_5$O$_{12}$ | 88.4 |
| Example 7-17 | 7-5 | 0.007 | | 88.3 |
| Example 7-18 | 7-6 | 0.007 | | 88.5 |
| Comparative Example 7-3 | 7-7 | — | | 71.8 |

*EC = Ethylene carbonat, PC = Propylene carbonat bon atoms, an alkynyl group having 2 to 8 carbon atoms, an alkoxy group having 1 to 6 carbon atoms, an aralkyl group having 7 to 15 carbon atoms, or a hetero cycle group, which may have a substitution group.

2. The non-aqueous electrolytic solution according to claim 1, further comprising at least one material selected from the group consisting of a negative electrode film forming agent and a blister inhibitor.

3. The non-aqueous electrolytic solution according to claim 1, characterized by comprising the methylenebissulfonate derivative represented by the formula [1], in a range from 0.01 to 1% by weight, in the non-aqueous electrolytic solution.

4. The non-aqueous electrolytic solution according to claim 1,
wherein the non-aqueous solvent is a solvent comprising at least one cyclic carbonate ester selected from the group consisting of ethylene carbonate and propylene carbonate.

5. The non-aqueous electrolytic solution according to claim 4, wherein a weight ratio of the methylenebissulfonate derivative/the at least one cyclic carbonate ester is in a range from 0.001 to 0.05.

6. The non-aqueous electrolytic solution according to claim 1, wherein the lithium salt is at least one lithium salt selected from the group consisting of $LiPF_6$, $LiBF_4$, $LiN(CF_3SO_2)_2$, $LiN(C_2F_5SO_2)_2$, bis[oxalate-O,O']lithium borate, and difluoro[oxalate-O,O']lithium borate.

7. The non-aqueous electrolytic solution according to claim 2,
wherein the negative electrode film forming agent is at least one material selected from the group consisting of a vinylene carbonate derivative represented by formula [2], a cyclic carbonate ester represented by formula [3], a compound represented by formula [4], a compound represented by formula [4'], and a compound represented by formula [5];

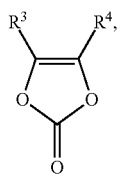

[2]

wherein $R^3$ and $R^4$ each independently represent a hydrogen atom, a halogen atom, an alkyl group having 1 to 12 carbon atoms, or a haloalkyl group having 1 to 12 carbon atoms,

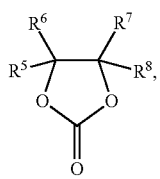

[3]

wherein $R^5$ to $R^8$ each independently represent a hydrogen atom, a halogen atom, an alkyl group having 1 to 12 carbon atoms, a haloalkyl group having 1 to 12 carbon atoms, or an alkenyl group having 2 to 12 carbon atoms, provided that at least one among $R^5$ to $R^8$ is a haloalkyl group,

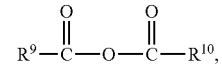

[4]

wherein $R^9$ and $R^{10}$ each independently represent a hydrogen atom, a halogen atom, an alkyl group having 1 to 12 carbon atoms, a haloalkyl group having 1 to 12 carbon atoms, or an alkenyl group having 2 to 12 carbon atoms, and either one of $R^9$ and $R^{10}$ represents a halogen atom, an alkyl group having 1 to 12 carbon atoms, or a haloalkyl group having 1 to 12 carbon atoms, provided that $R^9$ and $R^{10}$ together with a carbon atom to which they bind may form a cyclic aliphatic acid anhydride,

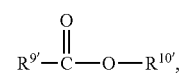

[4']

wherein $R^{9'}$ represents a halogen atom, an alkyl group having 1 to 12 carbon atoms, a haloalkyl group having 1 to 12 carbon atoms, or an alkenyl group having 2 to 12 carbon atoms, and $R_{10'}$ represents an alkyl group having 1 to 12 carbon atoms, a haloalkyl group having 1 to 12 carbon atoms, or an alkenyl group having 2 to 12 carbon atoms, and either one of $R^{9'}$ and $R^{10'}$ represents a halogen atom, an alkyl group having 1 to 12 carbon atoms, or a haloalkyl group having 1 to 12 carbon atoms, and

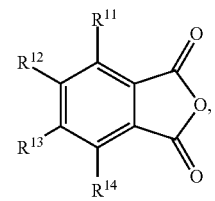

[5]

wherein $R^{11}$ to $R^{14}$ each independently represent a hydrogen atom, a halogen atom, an alkyl group having 1 to 12 carbon atoms, a haloalkyl group having 1 to 12 carbon atoms, or an alkenyl group having 2 to 12 carbon atoms, and at least one of $R^{11}$ to $R^{14}$ represents a halogen atom, an alkyl group having 1 to 12 carbon atoms, or a haloalkyl group having 1 to 12 carbon atoms.

8. The non-aqueous electrolytic solution according to claim 2, wherein the blister inhibitor is at least one material selected from the group consisting of γ-butyrolactone, γ-valerolactone, γ-caprolactone, ε-caprolactone, and a cyclic phosphazene derivative represented by formula [6];

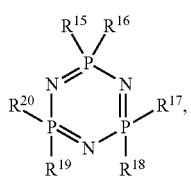

[6]

wherein $R^{15}$ to $R^{20}$ each independently represent a hydrogen atom, a halogen atom, an alkyl group having 1 to 10 carbon atoms, a haloalkyl group having 1 to 10 carbon atoms, an alkoxy group having 1 to 10 carbon atoms, a haloalkoxy group having 1 to 10 carbon atoms, or an aryl group having 6 to 12 carbon atoms, which may contain a halogen atom.

9. A method for producing a non-aqueous electrolytic solution, comprising steps of:

dissolving a lithium salt, as an electrolyte salt, in a non-aqueous solvent; and then dissolving in the resulting solution a methylenebissulfonate derivative represented by formula [1];

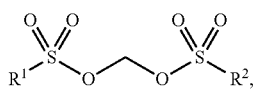

[1]

wherein $R^1$ and $R^2$ each independently represent an alkyl group having 1 to 6 carbon atoms, which may have a substitution group, a haloalkyl group having 1 to 6 carbon atoms, an alkynyl group having 2 to 8 carbon atoms, an alkoxy group having 1 to 6 carbon atoms, an aralkyl group having 7 to 15 carbon atoms, or a hetero cycle group, which may have a substitution group.

10. The method for producing the non-aqueous electrolytic solution according to claim 9, wherein the non-aqueous solvent is a combination of solvents comprising one or more cyclic carbonate esters and one or more non-aqueous solvents other than cyclic carbonate ester.

11. A non-aqueous electrolytic solution battery comprising:
(i) the non-aqueous electrolytic solution according to claim 1;
(ii) a negative electrode;
(iii) a positive electrode; and
(iv) a separator.

12. The non-aqueous electrolytic solution battery according to claim 11, comprising:
(i) the non-aqueous electrolytic solution according to claim 1;
(ii) the negative electrode that stores and discharges lithium, comprising at least one negative electrode active material selected from the group consisting of (a), (b), (c), and (d), as a main component,
(a) a carbon material having a d value of a lattice plane (002 plane) of 0.340 nm or smaller, in X-ray diffraction,
(b) an oxide of at least one metal selected from the group consisting of Sn, Si, Pb, and Al,
(c) an alloy of at least one metal selected from the group consisting of Sn, Si, Pb, and Al, and lithium, and
(d) a lithium-titanium oxide;
(iii) the positive electrode comprising at least one oxide selected from the group consisting of (e), (f), (g), and (h), or a polyanion compound, or a combination thereof, as a main component of a positive electrode active material,
(e) lithium cobaltate,
(f) a lithium-manganese complex oxide having a spinel structure,
(g) a lithium transition metal complex oxide having a lamella structure containing manganese, nickel, and cobalt, and
(h) a lithium-containing olivine-type phosphate salt; and
(iv) the separator having polyethylene as a main component.

* * * * *